(12) United States Patent
Senda

(10) Patent No.: US 7,318,083 B2
(45) Date of Patent: Jan. 8, 2008

(54) INFORMATION PROCESSING SYSTEM

(75) Inventor: Shigeya Senda, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 568 days.

(21) Appl. No.: 10/227,921

(22) Filed: Aug. 27, 2002

(65) Prior Publication Data

US 2003/0055890 A1 Mar. 20, 2003

(30) Foreign Application Priority Data

| Aug. 27, 2001 | (JP) | ............................. 2001-257042 |
| Aug. 27, 2001 | (JP) | ............................. 2001-257045 |
| Sep. 21, 2001 | (JP) | ............................. 2001-290168 |
| Aug. 23, 2002 | (JP) | ............................. 2002-244000 |
| Aug. 23, 2002 | (JP) | ............................. 2002-244001 |
| Aug. 23, 2002 | (JP) | ............................. 2002-244002 |

(51) Int. Cl.
G06F 15/16 (2006.01)
G06F 12/00 (2006.01)

(52) U.S. Cl. ........................ 709/203; 709/220; 719/330

(58) Field of Classification Search ........ 709/200–203, 709/220; 719/328–330, 318
See application file for complete search history.

(56) References Cited

U.S. PATENT DOCUMENTS

| 4,849,877 | A | * | 7/1989 | Bishop et al. ............... 709/226 |
| 5,307,490 | A | * | 4/1994 | Davidson et al. ........... 719/328 |
| 5,361,134 | A | | 11/1994 | Hu et al. |
| 5,724,503 | A | * | 3/1998 | Kleinman et al. .......... 719/318 |
| 5,793,965 | A | * | 8/1998 | Vanderbilt et al. .......... 709/203 |
| 5,822,585 | A | * | 10/1998 | Noble et al. ................. 719/316 |
| 5,884,316 | A | * | 3/1999 | Bernstein et al. ........ 707/103 R |
| 6,233,590 | B1 | | 5/2001 | Shaw et al. |
| 6,714,998 | B2 | * | 3/2004 | Hara et al. ..................... 710/10 |
| 2001/0014905 | A1 | * | 8/2001 | Onodera ..................... 709/102 |
| 2001/0034752 | A1 | * | 10/2001 | Kremien ..................... 709/105 |
| 2003/0055890 | A1 | | 3/2003 | Senda |

FOREIGN PATENT DOCUMENTS

| EP | 0 532 837 | 3/1993 |
| EP | 0 540 176 | 5/1993 |
| EP | 0 086 776 A1 * | 8/1998 |
| GB | 2 286 314 | 8/1995 |
| JP | 8-115224 | 5/1996 |
| JP | 8-123699 | 5/1996 |
| JP | 8-153078 | 6/1996 |

(Continued)

OTHER PUBLICATIONS

Hidehiko Masuhara, "Object-oriented Programming Techniques for Parallel and Distributed Environment", (CS-NG-2000-00627-029) Sep. 15, 1998, pp. 211-221.

(Continued)

Primary Examiner—Zarni Maung
(74) Attorney, Agent, or Firm—Oblon, Spivak, McClelland, Maier & Neustadt, P.C.

(57) ABSTRACT

Each of user services and control services includes a process acting as a server process or a client process; the server process has a function defining one or a plurality of services to be provided to the client process; and the client process performs a function call for requesting the server process to provide the service.

18 Claims, 39 Drawing Sheets

FOREIGN PATENT DOCUMENTS

| | | |
|---|---|---|
| JP | 8-293955 | 11/1996 |
| JP | 9-051398 | 2/1997 |
| JP | 9-091102 | 4/1997 |
| JP | 11-154064 | 6/1999 |
| JP | 11-205497 | 7/1999 |
| JP | 11-249919 | 9/1999 |
| JP | 11-282790 | 10/1999 |
| JP | 2000-20490 | 1/2000 |
| JP | 2000-112865 | 4/2000 |
| JP | 2000-151739 | 5/2000 |
| JP | 2000-227860 | 8/2000 |
| JP | 2000-339181 | 12/2000 |
| JP | 2001-154862 | 6/2001 |

OTHER PUBLICATIONS

U.S. Appl. No. 10/227,921, filed Aug. 27, 2002, Senda.
U.S. Appl. No. 10/429,865, filed May 6, 2003, Kobayashi et al.
U.S. Appl. No. 10/723,603, filed Nov. 26, 2003, Kobayashi.
U.S. Appl. No. 10/801,822, filed Mar. 17, 2004, Kimbara et al.
U.S. Appl. No. 10/859,358, filed Jun. 3, 2004, Mizukami.
U.S. Appl. No. 11/663,955, filed Mar. 28, 2007, Senda.

* cited by examiner

FIG.16

```
xcs.msg.

/* INCLUDE DECLARATION */
#include<ecs_2.msg>    /*MESSAGE FILE INCLUDE */         ⎫
#include"common.h"     /*C LANGUAGE DESCRIPTION */       ⎬ 2201
#include"xcs_def"                                        ⎭

/* MESSAGE DEFINITION */
message{
        name=END
        id=0x01
        dir=OUT
        content[[[
                ID id;
                u_char Dev;
                u_long EndStatus;
        ]]];
}:
message{
        name=STOP                                                2202
        id=0x02
        dir=INOUT
        content[[[
                ID jobid;
                u_char Dev;
                u_long StopStatus;
        ]]];
}:
        .
        .
        .
/* FUNCTION DECLARATION */
function[3]int Open(a,b,c)
function[4] int Close(a,b,c)                              2203
        .
        .
```

FIG.17 xcs_stub.c.

include <thread.h>
include <xcs.h>   /* HEADER INCLUDE */

/* FUNCTION CALL */
int Open(a,b,c)
{
 .
 .
get_function(...);        /* FUNCTION CALL MESSAGE GENERATION CALL */
ret=func_call(int Open_handler);   /* FUNCTION CALL HANDLER CALL */
free_ret(...);            /* RETURNED VALUE RELEASE CALL */
}
int Close(a,b,c)
{
 .
 .
get_function(...);        /* FUNCTION CALL MESSAGE GENERATION CALL */
ret=func_call(int CLOSE_handler);   /* FUNCTION CALL HANDLER CALL */
free_ret(...);            /* RETURNED VALUE RELEASE CALL */
}
 .
 .

FIG.18 xcs.skel.c

```
#include <thread.h>
include <xcs.h>    /* HEADER INCLUDE */ int Open_handler(a,b,c)
{
    .
    .
fc1=a;        /* ARGUMENT TRANSFER PART */
fc2=b
fc3=c
retalloc(...);  /* */
/* MOUNTING DESCRIPTION PART START */ ⎤
                                      ⎬ 2213
/* MOUNTING DESCRIPTION PART END */   ⎦
retfuntcion(...);   /* RETURNED VALUE TRANSMISSION CALL */
return;             /* RETURNED VALUE RELEASE CALL */
};

int Close/handler(e,f,g)
}
    .
    .
fc1=e;        /* ARGUMENT TRANSFER PART */
fc2=f
fc3=g
/* MOUNTING DESCRIPTION PART START */ ⎤
                                      ⎬ 2214
/* MOUNTING DESCRIPTION PART END */   ⎦
retfuntcion(...);   /* RETURNED VALUE TRANSMISSION CALL */
return;             /* RETURNED VALUE RELEASE CALL */
}
```

Right brace annotations: 2211 (Open_handler block), 2212 (Close/handler block)

FIG.19

```
xcs.h

/* INCLUDE DECLARATION */
#include"common.h"    /*C LANGUAGE DESCRIPTION */
#include"xcs_def"
```
}2201

```
/* MESSAGE ID */
#defme END     1
#define STOP   2
   .
   .
   .
/* MESSAGE STRUCTURE */
typedef struct msg_END{
              ID id;
              u_char Dev:
              u_long EndStatus;
}:
typedef struct msg_STOP{
              ID id;
              u_char Dev:
              u_long EndStatus;
}:
   .
   .
   .
```
}2231

```
/* FUNCTION DECLARATION */
int Open(a,b,c)
int Close(a,b,c)
   .
   .
```
}2203

```
/*FUNCTION HANDLER DECLARATION */
int Open_handler(a,b,c)
int Close_handler(a,b,c)
   .
   .
   .
```
}2232

FIG.20A

SERVER PROGRAM

·
·

ERROR HANDLER()

main(argc,argv)
{
SERVER INITIALIZATION(...):
HANDLER REGISTRATION(...);
DISPATCHER STARTING(...):
}
SERVER SKELETON
include <thread.h>
include <xcs.h> int Open_handler(a,b,c) ◄────────── S2702
}
·
·
fc1=a:     /* ARGUMENT TRANSFER PART */
fc2=b
fc3=c
retalloc(...):   /* * */

/* MOUNTING DESCRIPTION PART START */    S2704 ret=100 ◄────────────────── S2703

/* MOUNTING DESCRIPTION PART END */
retfunction(...);   /* RETURNED VALUE TRANSMISSION CALL */
return;        /* RETURNED VALUE RELEASE CALL */
};

intClose_handler(e,f,g)
{
·
·
fc1=e:     /* ARGUMENT TRANSFER PART */
fc2=f
fc3=g
/* MOUNTING DESCRIPTION PART START */ ret=fc1*fc2*fc3

/* MOUNTING DESCRIPTION PART END */
retfunction(...):   /* RETURNED VALUE TRANSMISSION CALL */
return;        /* RETURNED VALUE RELEASE CALL */
}

FIG.20B

CLIENT PROGRAM
main(argc,argv)
{
·
·
ERROR HANDLER()
ret=Open(a,b,c) ◄───┐
·                    │
·                    │
ret=Close(a,b,c)     │  S2701
}                    │
CLIENT STUB    S2705 │
Open (a,b,c) ◄───┐   │
}                │   │
·                │   │
·                │   │
/* FUNCTION HANDLER CALL */
re=func call(int Open_handler):─┘
·
·
}

Close(a,b,c)
}
·
·
/* FUNCTION HANDLER CALL */
ret=func_call(int Open/handler):
·
·
}

FIG.21 ecs.msg.

```
/* MESSAGE DEFINITION */
message{/* JOB HANDLING */
        name=JHDL
        id=0x01
        dir=OUT
        content[[[
     •
};
message{/* JOB EXECUTION ENABLE/DISABLE NOTIFICATION */
        name=JEXE
        id=0x02
        dir=OUT
        content[[[
};
message{/* JOB END NOTIFICATION */
        name=JEND
        id=0x03
        dir=OUT
        content[[[
     •
};
    •
    •
    •
```
⎬ 2241

```
/* FUNCTION DECLARATION */
function [3] int JOpen(...) /* JOB OPEN REQUEST */
function [4] int JMode(...) /* JOB OPERATION SETTING */
function [5] int JEntry(...) /* JOB ENTRY REQUEST */
function [6] int JStart(...) /* JOB START REQUEST */
function [7] int JClose(...) /* JOB CLOSE REQUEST */
    •
    •
```
⎬ 2242

FIG.22

```
ecs_stub.c  (CLIENT STUB)

#include <ecs.h>  /* HEADER INCLUDE */

/* FUNCTION CALL */
int JOpen(...)
{.
ret=func_call(int JOpen_handler); /* FUNCTION HANDLER CALL */     -2261
.}
int JMode(...)
{.
ret=func_call(int JMode_handler); /* FUNCTION HANDLER CALL */     -2262
.}
int JEntry(...)
{.
ret=func_call(int JEntry_handler); /* FUNCTION HANDLER CALL */    -2263
.}
int JStart(...)
{.
ret=func_call(int JStart_handler); /* FUNCTION HANDLER CALL */    -2264
.}
```
ST

```
xcs_skel.c  (SERVER SKELETON)

include <xcs.h>  /* HEADER INCLUDE */ int JOpen_handler(...)
{.
/* EXECUTION DESCRIPTION PART START */  } 2251
/* EXECUTION DESCRIPTION PART END */
.};

int JMode_handler(...)
{.
/* EXECUTION DESCRIPTION PART START */  } 2252
/* EXECUTION DESCRIPTION PART END */
.};

int JEntry_handler(...)
{.
/* EXECUTION DESCRIPTION PART START */  } 2253
/* EXECUTION DESCRIPTION PART END */
.};

int JStart_handler(...)
{.
/* EXECUTION DESCRIPTION PART START */  } 2254
/* EXECUTION DESCRIPTION PART END */
.};
```
SK

FIG.23 esc.h (HEADER)

/* MESSAGE ID*/
define JEND    1
define JEXE    2
define JHDL    3
   .
   .

/* FUNCTION DECLARATION */
int JOpen(...)
int JMode(...)
int JEntry(...)
int JStart(...)
   .
   .

/* FUNCTION HANDLER DECLARATION */
int JOpen_handler(...)
int JMode_handler(...)
int JEntry_handler(...)
int JStart_handler(...)

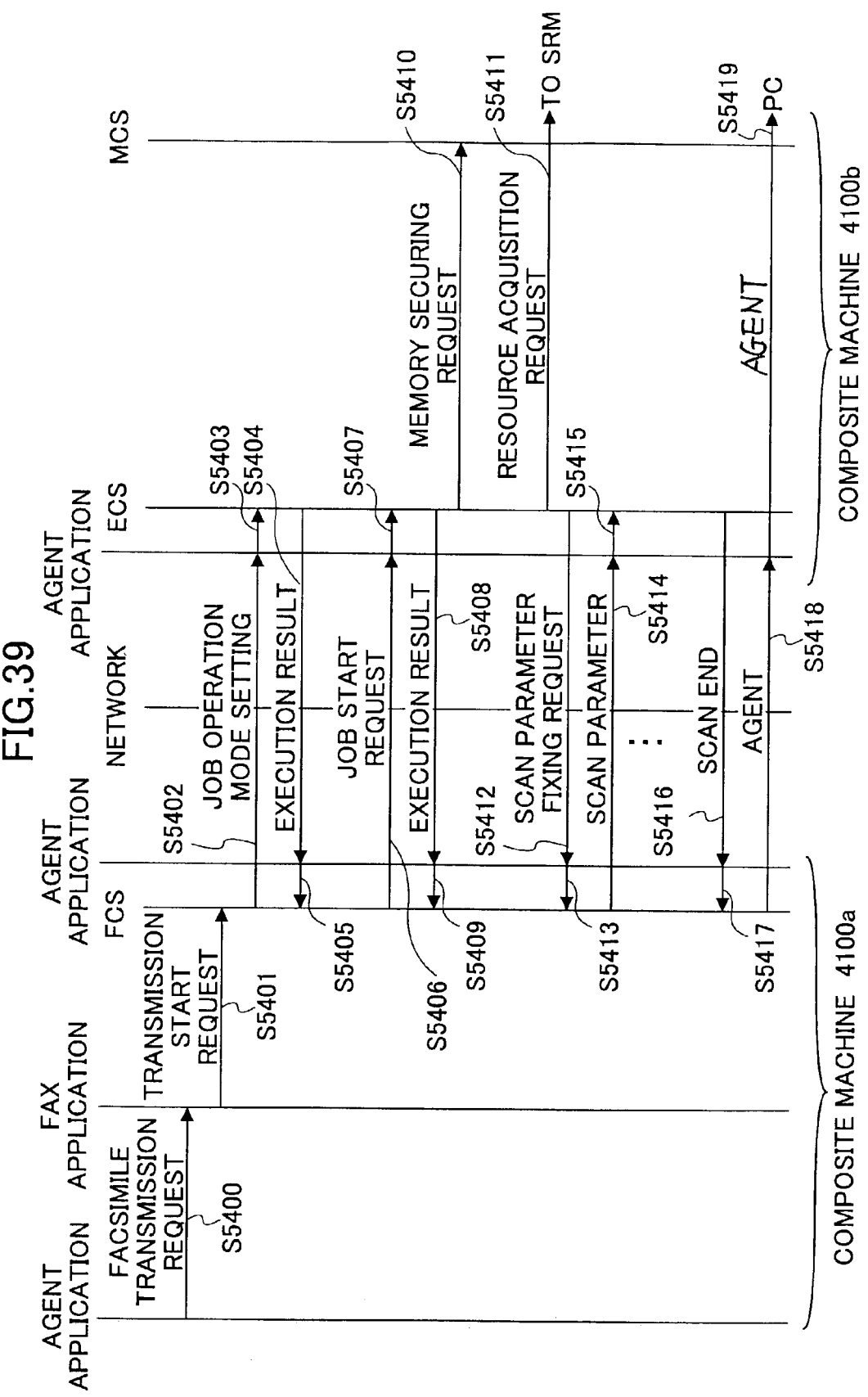

INFORMATION PROCESSING SYSTEM

BACKGROUND OF THE INVENTION

1. Field of the Invention

The present invention relates to an information processing system, in particular, an image data processing system performing multiple services such as those of a printer, a copier, and a facsimile machine by a single machine, and, in particular, to an information processing system performing inter-process communications among a plurality processes for this purpose.

2. Description of the Related Art

In recent years, an image forming apparatus which holds therein facilities of respective apparatuses such as a printer, a copier, a facsimile machine, a scanner in a housing thereof (referred to as a composite machine). It is known that such a composite machine includes a display device, a printing device and an image-pickup device in one housing, and three sets of software are provided for respective ones of the printer, copier and facsimile machine. Then, by appropriately switching of these sets of software, the apparatus operates as the printer, copier, scanner or facsimile machine.

SUMMARY OF THE INVENTION

In such a configuration, if the respective sets of software for the printer, copier, scanner and facsimile machine (including universal OS) are provided separately, development of each software needs a great time. In order to solve this problem, the applicant devises an information processing system which includes a platform for performing various types of control services each of which performs management/execution control of each hardware resource which may be used in common by a plurality of different applications which perform particular processes for respective services of the printer, copier and facsimile machine. Thereby, it is possible to improve efficiency of software development and also to improve productivity of the while composite machine.

In such a composite machine, it is preferable that modification of each application/control service may be made independently. Furthermore, it is preferable that data communication between respective ones of these applications/control services may be executed smoothly in providing such composite services. In other words, even in case one of the functions of the printer, copier, facsimile and scanner of the composite machine has a trouble, or is modified, the others may preferably operate properly. For this purpose, it is needed that each of the respective applications/control services operating in the composite machine maintains independency while services/data are timely provided between respective modules thereof.

That is, if each thereof does not have independency, it cannot be possible to provide necessary services solely, and, also, it is not possible to flexibly modify each of the applications/control services. Furthermore, if each thereof does not have independency, design/building of each of the applications/control services has difficulty in terms of interface thereamong, and it may not be possible to easily provide a large variety of services.

Further, in case a program development is ordered to a third vender, the third vender should fully understand the internal operation of the control services having direct communications with the relevant hardware resource, if each module does not have independency. On the other hand, for a main manufacturer of the image forming apparatus, it is not preferable in view of business matter to disclose details of the internal operation of the control services of its own even to such a third vendor.

The present invention has been devised in consideration of the above-described situation, and an object of the present invention is to provide an information processing system such as an image forming apparatus in which each module of applications/user services and control services is given independency so that each module may be freely modified/added/deleted. Thus, it becomes possible to archive flexible architecture and various functions in various manners in the image forming apparatus/information processing system.

An information processing system according to the present invention includes:

a hardware resource to be used for a predetermined process; and at least one program which performs a user service and a control service concerning the predetermined process;

wherein each of the user service and control service comprises a process acting as a server process or a client process;

the server process has a function defining one or a plurality of services to be provided to the client process; and the client process performs a function call for requesting the server process, to provide the service.

In this configuration, in the information processing system having the user services i.e., application software programs, and control services providing service entities in common to the plurality of user services, independency among the respective user services and control services is maintained, and, also, providing of services and data transfer thereamong are achieved by inter-process communications. Accordingly, it is possible to provide the information processing system with feasibility/variety in its function.

Further, even in a case where a module of only part of the user services/control services should be changed/added/deleted/modified, provision of services and data transfer among the processes are achievable as long as merely a necessary minimum interface is provided in which necessary functions are mounted in a module on the side of server process while the corresponding function call is made by a module on the side of client processes. Accordingly, modification of the user service/control service can be easily achieved independently.

Furthermore, as each of the user services/control services operates as a server process or a client process independently, a possible trouble occurring in one service may not give an adverse affect into another service. Accordingly, the reliability of the system can be improved.

There, the server process means a process for providing a specific service in response to a request from another process, and thus, may comprise either any user service/application or any control service.

The client process means a process for having a service provided thereto by the above-mentioned server process, and, thus, may comprise either any user service/application or any control service.

The function is one executing a process in the server process in response to a service processing request/a request for setting a predetermined setting value made by the client process.

It is preferable that each process of the user services/control services comprises a plurality of threads. That is, functions which should not necessarily operate independently may be assigned to a plurality of threads in a single process, and may be made to operate in parallel. In fact, switching of execution control in thread units does not need switching of main storage space, and may be achieved merely by means of a reduced overhead, i.e., switching of counters/registrars, or the like. Accordingly, high-speed processing can be achieved in a condition in which various service operations, i.e., printer service, copy service and so forth, are performed in parallel.

Furthermore, it is preferable that the server process has a monitoring part or dispatcher for monitoring for reception of a function call, and, also, the monitoring part has a function handler which executes a process corresponding to a received function call. By employing such a configuration, the server process should merely have function handlers corresponding to the functions needed. Thereby, in case it becomes necessary to modify the functions/processes to be provided to the client process, it can be achieved merely by adding/deleting the relevant function handler. Thus, it becomes not necessary to substantially change the functions of the monitoring part itself. Such a function handler may be provided for different functions, respectively, or may be provide for each thereof. By providing a particular handler for each function, it is possible to further improve the flexibility of the system.

A similar configuration for achieving inter-process communications such that each of the user services/applications and control services is made to operate as an object having one or a plurality of methods by which independency among the particular service programs is maintained, and, thereby, variety/flexibility in functions of the system is improved. Specifically in this configuration, in case a client process such as a user service/control service requests a control service/server process to provide a service, the client process executes a method for issuing a service request message to the relevant server process. The server process responds to this message and executes a method defining one of a plurality of services. Thus., the inter-process communications are achievable by means of the message. Accordingly, substantially the same effects/advantages can be obtained as in the case where the inter-process communications are achieved by means of the above-described function call and function execution scheme.

In fact, also in this configuration, even in a case where a module of only part of the user services/control services should be changed/added/deleted/modified, provision of services and data transfer among the processes are achieved as long as merely a necessary minimum interface is provided in which a method is mounted for performing necessary service processing in a module on the side of server process while a method for issuing a corresponding service request message is executed by a module on the side of client process. Accordingly, modification of the user service/control service can be easily achieved independently.

Furthermore, as each of the user services/control services operates as a server process or a client process independently, a possible trouble occurring in one service may not give an adverse affect in another service. Accordingly, the reliability of the system can be improved.

It is preferable also in this configuration that each process of the user services/control services comprises a plurality of threads. That is, functions which should not necessarily operate independently may be assigned to a plurality of threads in a single process, and may be made to operate in parallel. In fact, switching of execution control in thread units does not need switching of main storage space, and may be achieved merely by means of a reduced overhead, i.e., switching of counters/registrars or the like. Accordingly, high-speed processing can be achieved in a condition in which various service operations, i.e., printer service, copy service and so forth, are performed in parallel.

Furthermore, it is preferable that the thread having performed the function call from the client process waits the instruction execution until receiving the function returned value via the client monitoring part. Thereby, another thread in the process can have an execution right, and, thus, parallel operation can be achieved.

Thereby, in the process, a plurality of threads can be made to start in paralell, to perform inter-process communications therebetwee, and, thus, by means of applying a scheme of waiting for the function returned call in response to function call, any other thread in the same process can operate in parallel.

The function of the above-mentioned client monitoring part may be achieved by one or a plurality of threads.

It is also preferable that the above-mentioned client monitoring part has a function waiting queue which temporarily stores identifiers of threads each of which waits for the function returned value, and transfers the function returned value received from the server process to the thread having the relevant identifier stored therein.

Thereby, it is possible that a plurality of threads in the process can perform function calls to a single server, and, then, wait for the function returned values independently. Then, by positively transferring the function retuned value to the relevant thread, it is possible to easily achieve parallel operation among the threads positively.

Other objects and further features of the present invention will become more apparent from the following detailed description when read in conjunction with the accompanying drawings.

BRIEF DESCRIPTION OF THE DRAWINGS

FIG. 16 shows a description example of a message file input into the stub generator shown in FIG. 14;

FIG. 17 shows a description example of a client stub generated by the stub generator shown in FIG. 14;

FIG. 18 shows a description example of a server skeleton generated by the stub generator shown in FIG. 14;

FIG. 19 shows a description example of a header generated by the stub generator shown in FIG. 14;

FIGS. 20A and 20B illustrate a data communications sequence performed between a client program and a server program produced according to the second embodiment of the present invention;

FIG. 21 illustrates one example of the message file produced according to the second embodiment of the present invention applicable to the composite machine according to the first embodiment of the present invention shown in FIG. 1;

FIG. 22 illustrates the client stub and server skeleton produced from the message file shown in FIG. 21 according to the second embodiment of the present invention;

FIG. 23 illustrates the header produced from the message file shown in FIG. 21 according to the second embodiment of the present invention;

FIG. 39 shows a data communications sequence performed between different composite machines according to the sixth embodiment of the present invention.

DETAILED DESCRIPTION OF THE PREFERRED EMBODIMENTS

Preferred embodiments of the present invention will now be described with reference to drawings.

Figure 1:
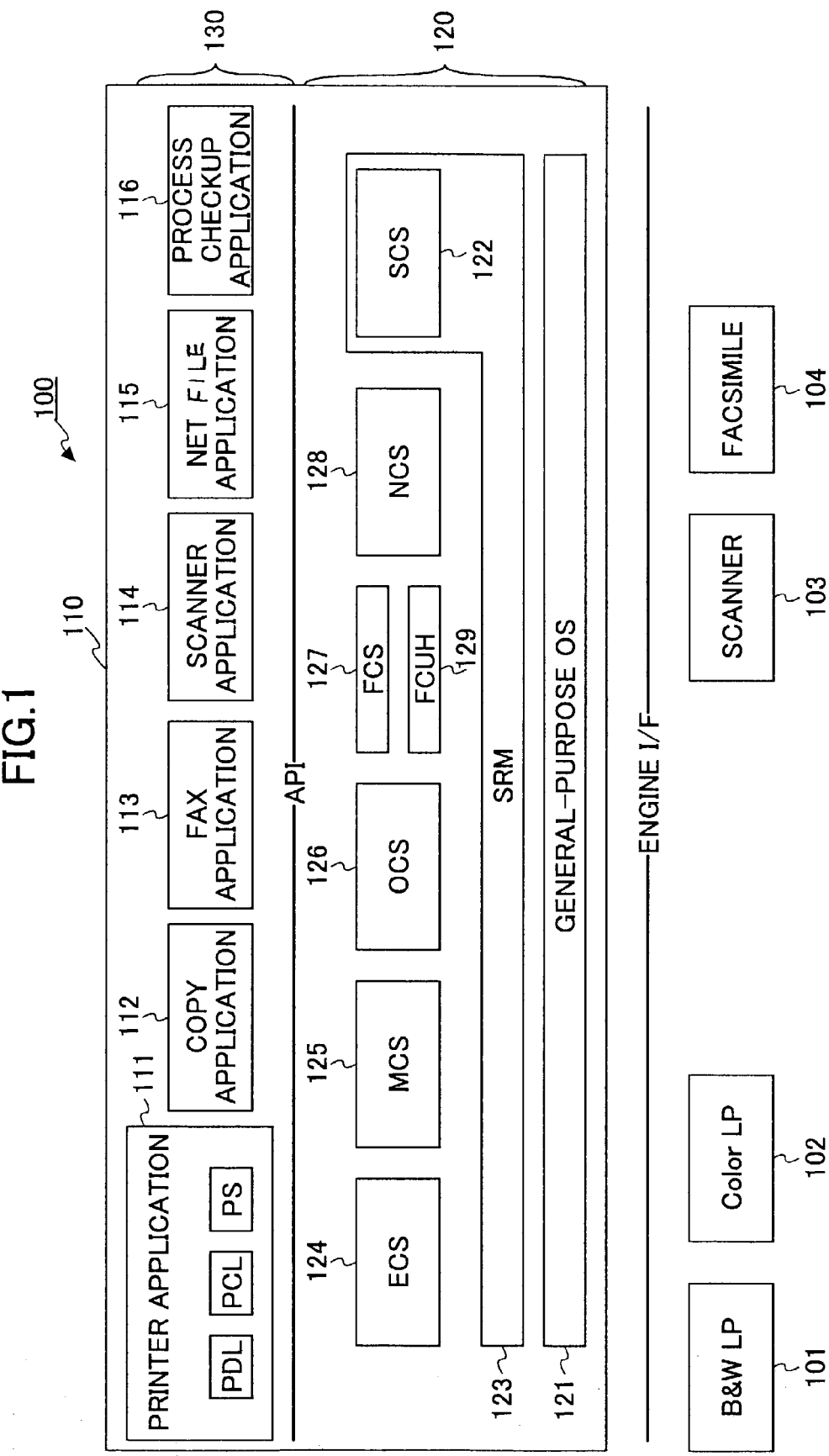
FIG. 1 shows a block diagram illustrating an image forming apparatus or composite machine according to a first embodiment of the present invention.

A first embodiment of the present invention will now be described. FIG. 1 is a block diagram to show a configuration of an image forming apparatus (refereed to as a composite machine, hereinafter) in the first embodiment of the present invention. As shown in FIG. 1:, the composite machine has hardware resources such as a monochrome line printer 101, a collar line printer 102, a scanner 103 and a facsimile machine 104, and a software configuration group 110 including a platform 120 and applications 130.

The platform 120 includes control services each of which interprets an processing request from an application, and generates a request for a hardware resource acquisition; a system resource manager (SRM) 123 which manages one or a plurality of hardware resources, and performs arbitration of the acquisition requests given by the control services; and a general-purpose OS 121.

The control services include a plurality of services modules, and include an SCS (system control service) 122, an ECS (engine control service) 124, an MCS (memory control service) 125, an OCS (operation panel control service) 126, an FCS (facsimile control service) 127, and an NCS (network control service) 128. In addition, the platform 120 includes an API (application program interface) which enables reception of processing requests from the applications 130 by means of previously defined functions.

The general-purpose OS 121 is a general-purpose operating system of UNIX, and performs parallel execution of respective sets of software of the applications 130 regarding them as respective processes.

The SRM 123 performs control of the system and management of the resources in cooperation with the SCS 122, performs arbitration according to requests from an upper layer which uses hardware resources such as engines such as a scanner part and a printer part, a memory, a HDD file, a host I/O (centronics I/F, network I/F, IEEE1394 I/F, RS232C I/F, and so forth), and so forth.

Specifically, the SRM 123 determines whether or not a requested hardware recourse can be used now (not used for any other request yet), and, sends information to the upper layer when it can be used now. Further, in response to a request from the upper layer, the SRM 123 produces a usage scheduling for hardware resources, and, according thereto, executes directly requested tasks (for example, paper transportation operation, image formation operation, memory acquisition operation, file generation operation and so forth by the printer engine).

The SCS 122 performs application management, operation device control, system data display, LED display, resource management, and interrupt application control. The ECS 124 controls engines of hardware resources, i.e., the monochrome line printer (B & W LP) 101; color line printer (Color LP) 102, scanner 103, and facsimile machine 104.

The MCS 125 performs acquisition/release of image memory, usage of hard disk drive (HDD), compressing/decompressing of image data, and so forth. The OCS 126 is a module controlling a control panel by which information is communicated between an operator of the image forming apparatus and the main frame control unit of the apparatus.

The FCS 127 provides API from each application layer of system controller to perform facsimile transmission/reception operation by means of PSTN/ISDN network, registration of/reference to various sets of facsimile data managed in a BKM (backup SRAM), facsimile reading operation, facsimile reception printing operation, composite transmission/reception operation, and so forth. In the FCS 127, an FCU handler 129 that is a sub-process (FCUH) is started. This FCUH 129 controls a device driver of the facsimile engine in a case of facsimile transmission/reception according to instructions from the FCS 127.

The NCS 128 includes a group of modules providing services which can be in common used by the applications which need the network I/O, performs distribution of various data received from the network through respective protocols into the corresponding applications, and performs intermediate processing for transmission of data into the network.

The applications 130 include a printer application 111 for the printers applying page description language (PDL), PCL and Post Script (PS), a copy application 112 for a copy operation, a facsimile application 113 for facsimile transmission operation, a scanner application 114 for scanning operation, a net file application 115 for a network file, and a process checkup application 116 for process checkup.

These respective control services, SRM 123 and respective applications are generated and operate on the general-purpose OS 121 as the respective processes. In each process, a plurality of threads are started, under control of the general-purpose OS, CPU occupation times of these threads are switched, and thereby, parallel execution thereof is achieved. Between each application process and each control service process, various messages and data transmission/reception, and function call are performed by means of the inter-process communications.

Figure 2:
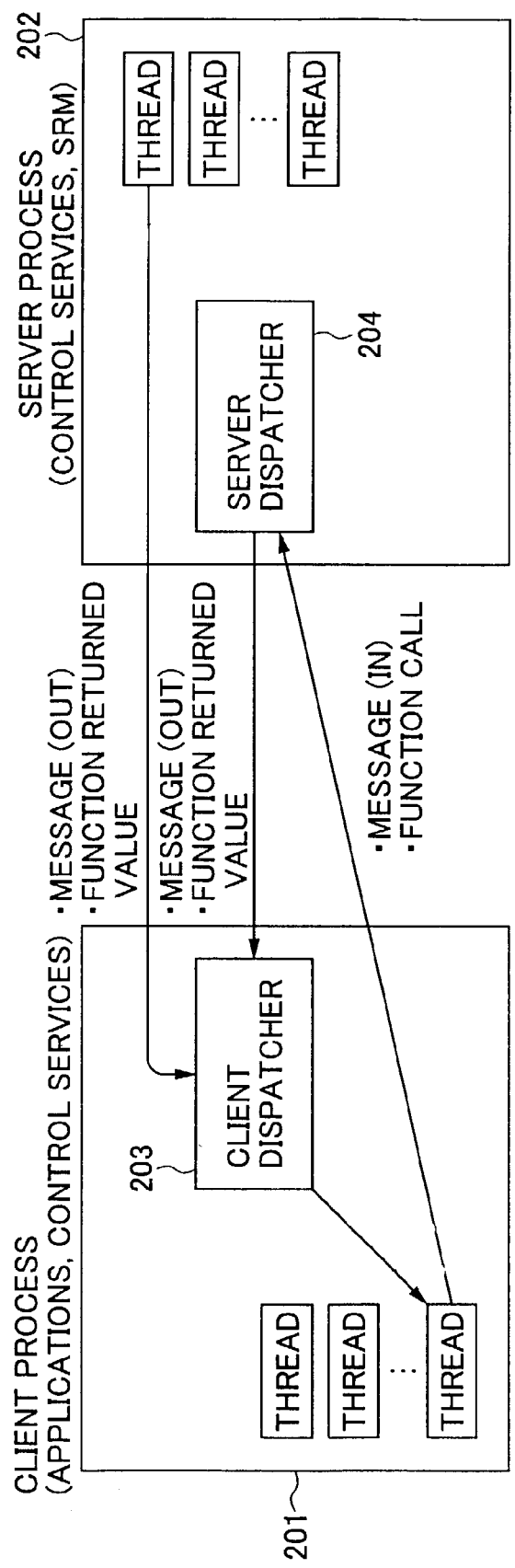
FIG. 2 shows a block diagram illustrating a relationship between a client process and a server process according to the composite machine shown in FIG. 1.

FIG. 2 is a block diagram which shows a relationship between server process and client process both operate in the composite machine shown in FIG. 1. The server process 202 means a process which provides a service to the client process 201 in response to a request therefor. The client process 201 is a process which has a service provided by the server process by sending a request therefor to the server process.

In the above-described composite machine in the first embodiment of the present invention shown in FIG. 1, each of the application processes of the above-mentioned copy application 112, printer application 111, scanner application 114, facsimile application 113 and so forth, processes of control services such as the ECS 124, MCS 125, FCS 127, NCS 128 and so forth acts as the above-mentioned client process. On the other hand, also each of the processes of these control services, and a process of the SRM 123 acts as the above-mentioned server process 202. In other words, the process of the application acts as the client process 201 when each application has a service provided by the respective control service, and the control service acts as the server process 202.

In addition, in case requesting and providing are performed between these control services, the control service requesting a provision of a service acts as the client process, while the control service having the request given and providing the service in response thereto acts as the server process 202. Similarly, the process of any application, the process of any control service, and SRM process may act either as the server process 202 or as the client process 201. Thus, in case any of these process requests another to provide a service, the former one acts as the client process while the latter one acts as the server process.

As shown in FIG. 2, each of the processes of the applications, control services and SRM 123 has a plurality of threads operate therein. As each process has the plurality of threads which can operate independently from each other, the process can act as the client process when it requests one process to provide a service for one thread, while, at the same time, the same process can act as the server process when it has a request to provide a service made by a process for another thread. Similarly, each process can act simultaneously as server processes respectively treating a plurality of processes for client processes, while it can act simultaneously as client processes respectively having services provided by a plurality of server processes.

Further, as shown in FIG. 2, the client process 201 performs a function call from a thread therein in order to request the server process 202 to provide a service, and, then, by receiving a function returned value thereof, it thus performs inter-process communications. Furthermore, each thread of the client process 201 sends a message to the server process 202, and, thus, it performs the inter-process communications. On the other hand, as to the inter-process communications from the server process 202 to the client process 201, it includes only transmission of message, but does not include a function call.

For this purpose, in each of the control service processes, which can act as the server process, i.e., ECS 124, MCS 125, FCS, 127, NCS 128, and so forth, and SRM, each process to provide a service to the client process 201 is previously mounted as a function handler 403, which will be described later, for each service to be provided. Accordingly, when requests for these services are sent from the client process 201 to the server process 202, corresponding functions on the server process 202 should be called (function call should be performed) for the respective services.

The above-mentioned "message" is used for sending/receiving information for the purpose of an event or a notice between the server process 202 and client process 201, and is data including unique message ID, message direction, and message contents. The message direction may have a value as 'IN', 'OUT', or 'SELF'. 'IN' means a message direction of a message toward the server process 202 from th client process 201. 'OUT' means a message direction toward the client process 201 from the server process 202. 'SELF' means a message direction toward the own process.

The above-mentioned 'function' operates in requesting a predetermined process or sending a predetermined setting request to the server process 202 from the client process 201, and returns a returned value in response to the function call. From a thread of the client process 201, a function previously provided on the server process 202 is called; the server process having the function call made thereto executes the process corresponding to the thus-called function, and, then, it returns the execution result in a form of the returned value to a client dispatcher 203 of the client process 201. The returned value has a form of a structure, which includes a function ID as well as the returned value itself. The function ID is used for identifying the respective function.

The client dispatcher is a thread which monitors reception of a message or a function returned value in the OUT direction from the server process 202, and the single dispatcher 203 operates for each server process 202. In case the client process 201 performs communications with a plurality of server processes 202, the single dispatcher operates for each server process 202 therein.

Figure 3:
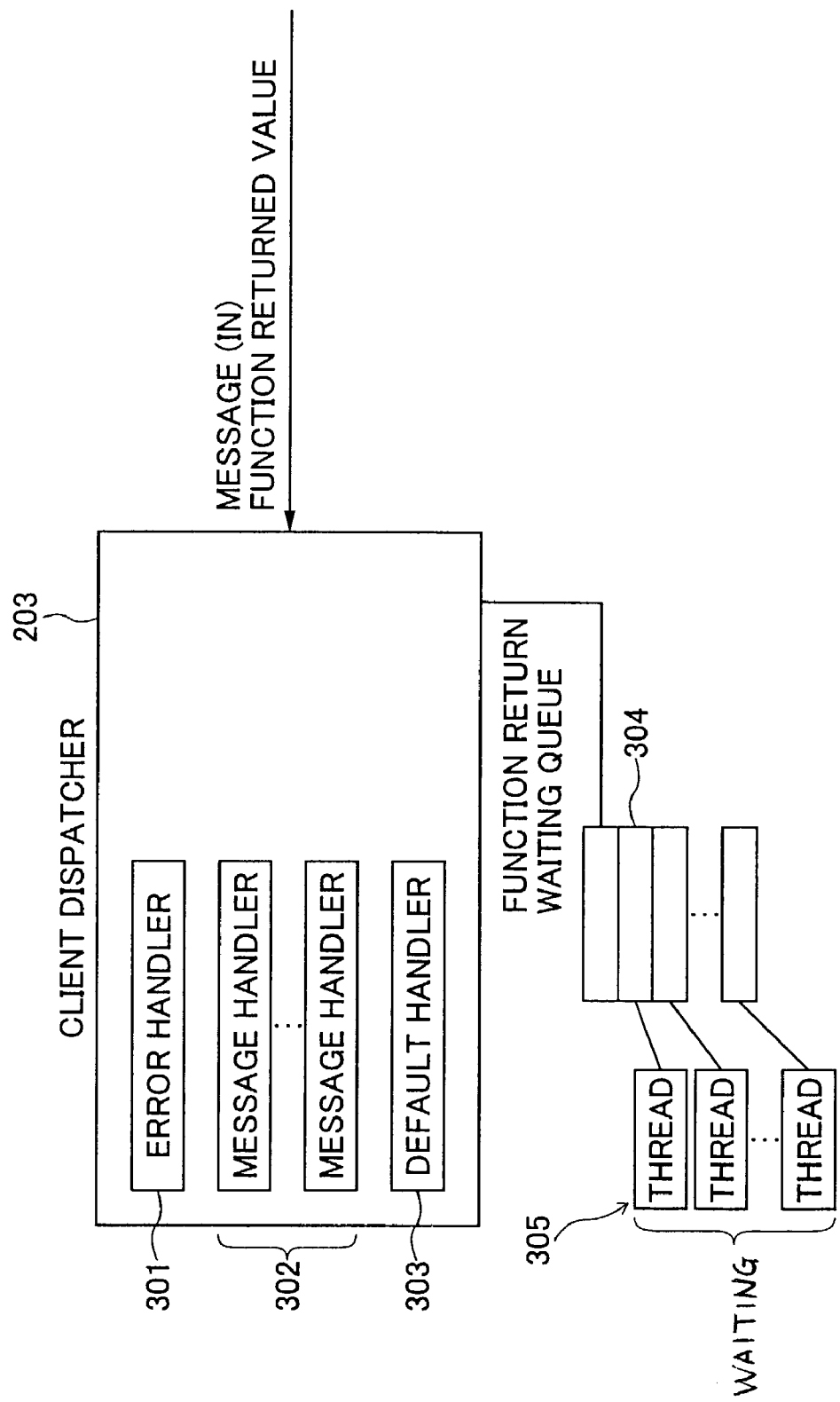
FIG. 3 shows a block diagram illustrating the client process shown in FIG. 2.

FIG. 3 shows details of the client dispatcher 203. As shown, the client dispatcher 203 has message handlers 302, an error handler 301 and a default handler 303 operate on the thread thereof. The message handler 302 performs a process for a received message, and the plurality of different message handlers 302 are provided for respective message IDs. Accordingly, when the client dispatcher 203 receives a message, the message ID thereof is determined, and the corresponding message handler is called. As the contents of the process performed by the message handler 302, the contents of the message is informed of to the thread which made the function call, for example. Thus, a different process is defined for each message.

The error handler 301 is called when an error occurs during execution of a process in the client dispatcher 203, and, performs error process such as informing a user of the error, and so forth. The default handler 303 is called when the relevant message handler 302 has received a message which is not registered yet, and performs a process of informing a thread of the message, and so forth.

Further, the client dispatcher 203 has a function return waiting queue 304, and manages, by using the function return waiting queue 304, the function returned values and threads 305 which are waiting for the function returned values. Thus, although the thread in the client process 201 performs function call to the server process 202, it enters a function return waiting state after the function call, and thus the subsequent process is aborted until the function returned value is received. When function call is performed from the thread, the client dispatcher 203 registers into the function return waiting queue 304 the identifier (thread ID or the like) of the thread. Then, when receiving the function returned value from the server process 202, it searches the function return waiting queue 304 by using the function ID as a key, and thus, detects the identifier (thread ID) of the thread which has entered the function return waiting state, waiting for the function returned value for the relevant function and thus has the subsequent process aborted in the client process 201. Then, the client dispatcher 203 sends the thus-received returned value to the thread having the thus-detected identifier (thread ID). The thread thus receiving the function returned value exits from the function return waiting state, and can perform the aborted subsequent process. The client dispatcher 203 performs such a process of informing the returned value each time the function returned value is received.

The server dispatcher 204 is also a thread which monitors function call made by the client process 201 and manages it coming in the IN direction. Different from the client dispatcher 203, the single server dispatcher 204 can receives function calls and messages provided from a plurality of client processes 201.

Figure 4:
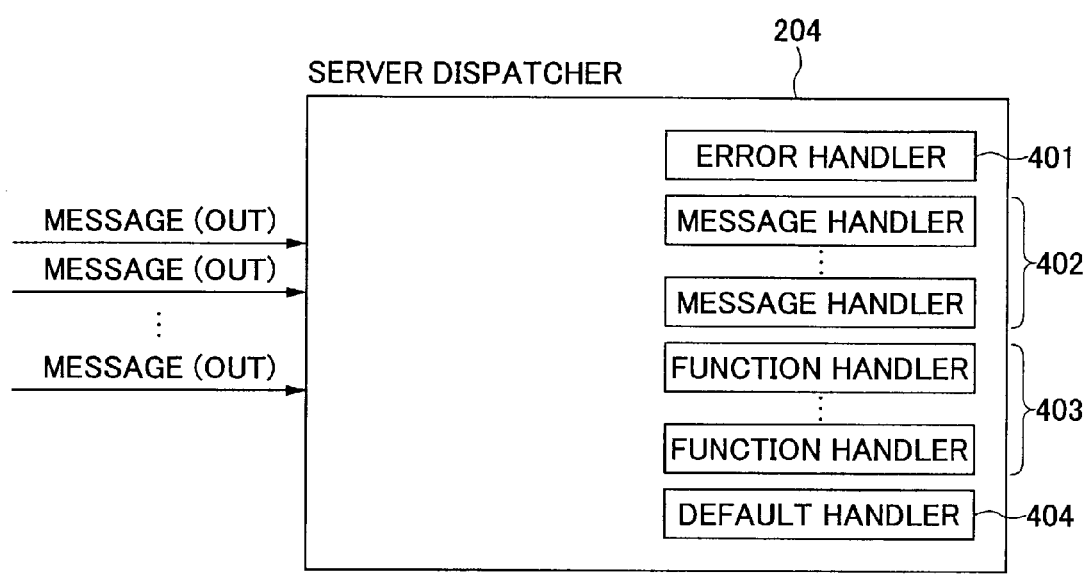
FIG. 4 shows a block diagram illustrating the server process shown in FIG. 2.

FIG. 4 shows details of the server dispatcher 204. The server dispatcher 204 has the function handlers 403, message handlers 402, an error handler 404 and a default handler 405 operate on the thread thereof. The function handler 403 executes a specific process of the function, and the plurality of function handlers 403 are provided for the respective functions. When receiving a function call from the client process 201, the server dispatcher 204 starts the function handler 402 corresponding to the received function, the thus-started function handler executes the process requested by the client process 201, and sends the function returned value thereof to the client dispatcher 203 of the relevant client process 201.

The message handler 402 performs a process for a received message, and the plurality of different message handlers 402 are provided for respective message IDs. Accordingly, when the client dispatcher 204 receives a message, the message ID thereof is determined, and the corresponding message handler is called thereby. As the contents of the process performed by the message handler 402, the contents of the message is informed of to the thread, for example. Thus, a different process is defined for each message.

The error handler 401 is called when an error occurs during execution of a process in the server dispatcher 204, and, performs error process such as informing of the error, and so forth. The default handler 404 is called when the relevant message handler 402 has received a message which is not registered yet, and performs a process of informing a thread of the message, and so forth.

Figure 5:
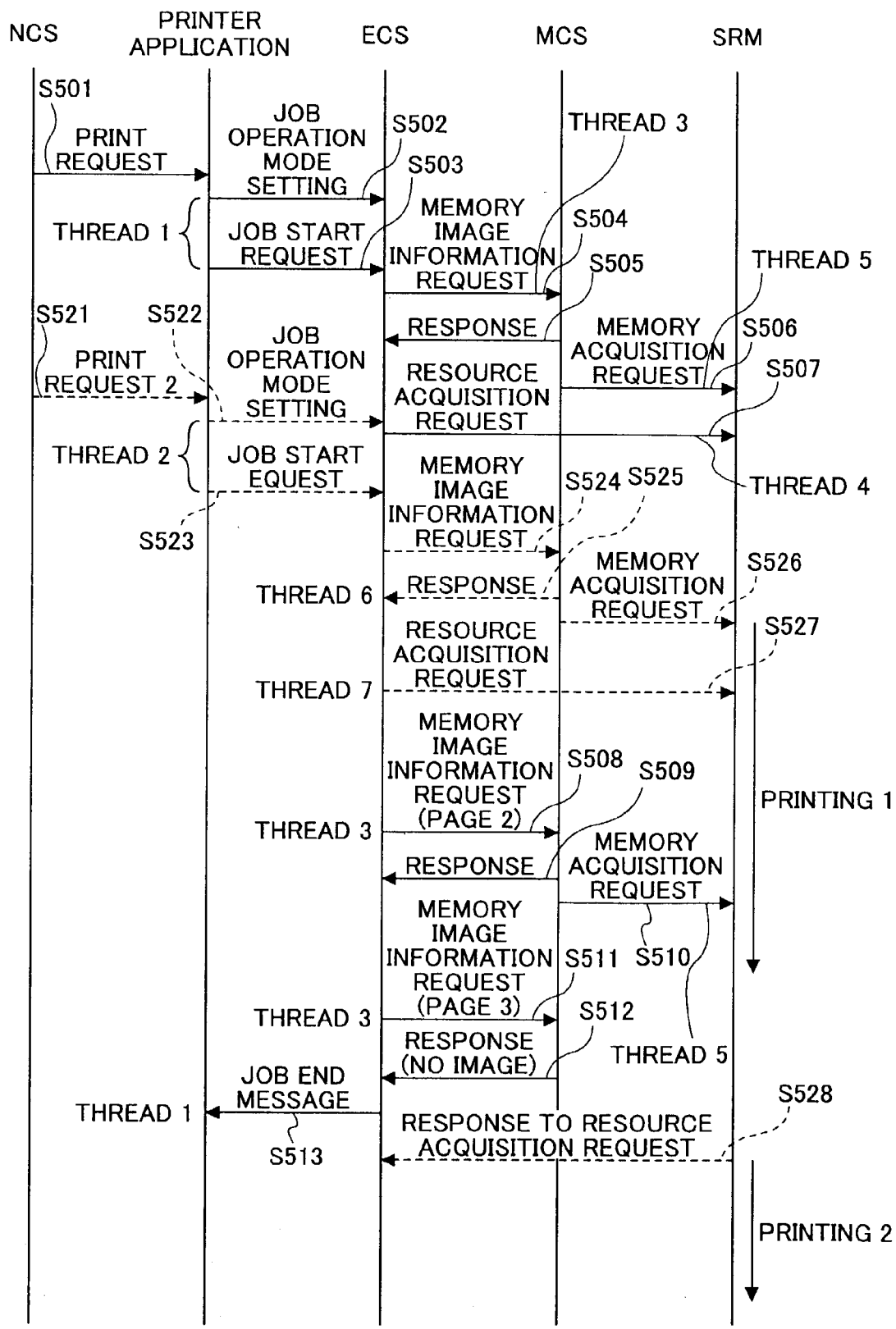
FIG. 5 shows a data communications sequence in printing operation performed in the composite machine shown in FIG. 1.
Figure 6:
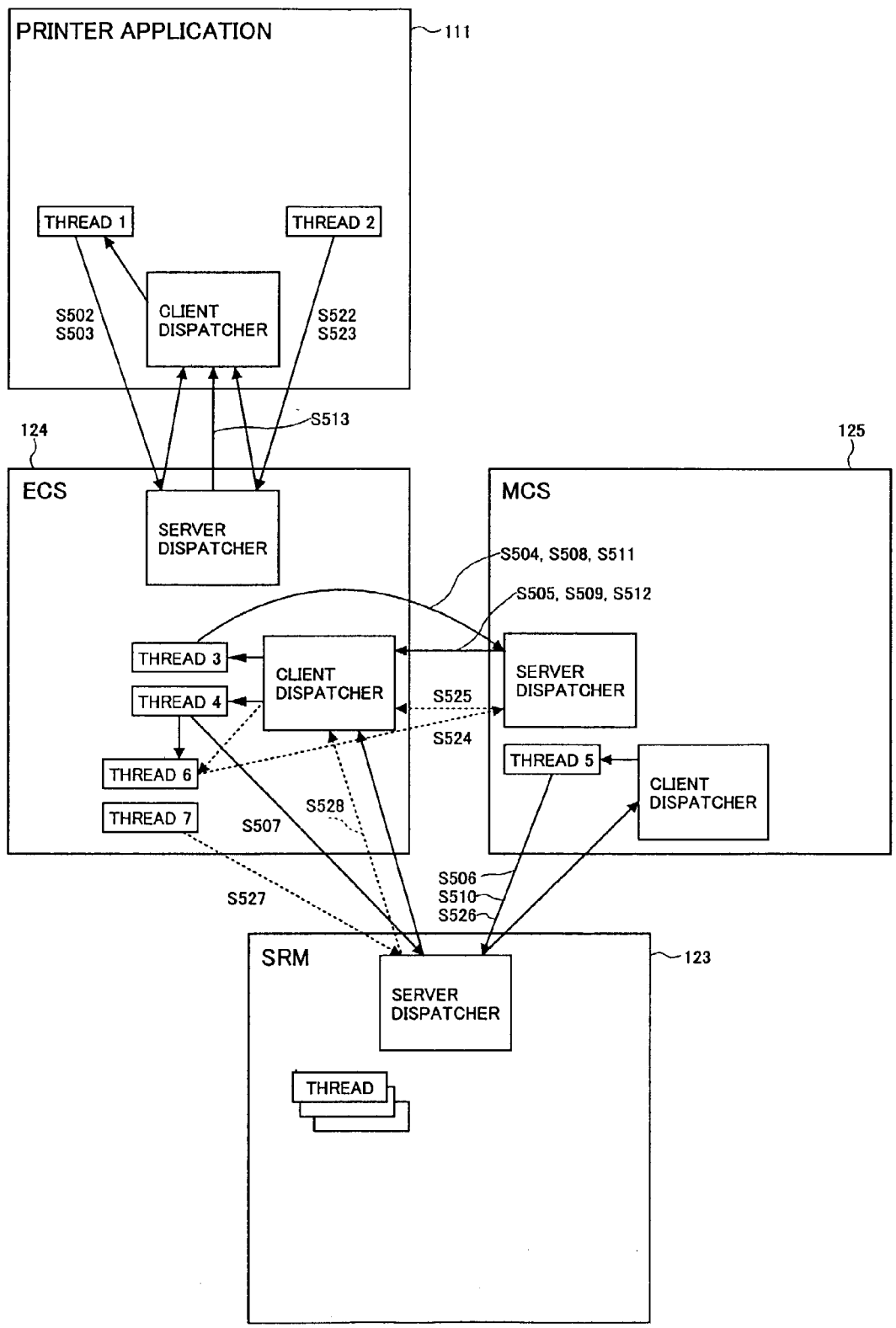
FIG. 6 illustrates a relationship between respective services in the printing operation in the composite machine shown in FIG. 1.

The above-mentioned inter-process communications in the printer operation, scanner operation, copy operation and facsimile operation actually performed in the composite machine according to the first embodiment of the present invention will now be described specifically. At first, the inter-process communications on the printer application 111, ECS 124, MCS 125, and SRM 123 in the printer operation will now be described. FIG. 5 illustrates data communications sequence between respective process of the printer application 111, ECS 124, MCS 125, and SRM 123 performed when the printer operation is done in the composite machine according to the first embodiment of the present invention. FIG. 6 illustrates paths of transmission of functions and messages between the respective processes.

As shown in FIG. 6, the printer application process 111, ECS process 124, MCS process 125 and SRM process 123 operate in the composite machine, and these processes are generated at the starting of the composite machine. Although only processes used in the printer operation are shown, actually other application processes and other control service processes are also generated at the starting of the composite machine.

The printer application process 111 is started at the starting of the composite machine, and, a plurality of threads start in this process as shown in FIG. 6. The printer application process 111 acts as a server process with respect to the ECS process 124 regarding it as the client process. Accordingly, the client dispatcher is started therein for receiving a message or a function returned value from the ECS process 124, and transferring it to a relevant thread in the process.

In the printer operation, the ECS process 124 acts as the server process with respect to the printer application process 111 regarding it as the client process, and also, it acts as a client process with respect to the MCS process 125 and SRM process 123 regarding them as server processes, respectively. Accordingly, in the ESC process, a thread of server dispatcher performing reception of function call and message from the printer application process 111 and transmission of function returned value and message thereto; and also, a thread of client dispatcher performing reception of message and function retuned value from the MCS process 125 or SRM process 123 and performing returned value management; and a plurality of other threads performing control of other jobs and performing engine control operate.

The MCS process 125 acts as a server process with respect to the ECS process 124 regarding as a client process in the printer operation, and also, it acts as a client process with respect to the SRM process 123 regarding as a server process. Accordingly, in the MCS process 125, a thread of server dispatcher receiving function call and message from the ECS process 124 and transmission of message and function returnee value thereto; a thread of a client dispatcher receiving message and function returned value from the SRM process 123 and performing returned value management; and a plurality of other threads performing memory control and hard disk control operate.

In the printer operation, the SRM process 123 acts as a server process with respect to the ESC process 124 or MCS process 125 regarding as a client process. Accordingly, in the SRM process, a thread of server dispatcher performing reception of function call and message from the ESC process 124 or MCS process 125 and transmission of function returned value and message thereto; and a plurality of other threads performing various process concerning engine resource control operates.

According to the first embodiment, the printer application process 111 has a thread for performing a process of each function call for job operation mode setting and job start request. The ESC process 124 has a thread for performing a process of memory image information request function call repeatedly for the number of printing pages, and, also, as a thread of a process performing a resource acquisition request function call. The MCS process 125 has a thread of a process for performing a memory acquisition request function call. However, these processes of respective threads are merely for examples, and, may be determined arbitrarily for a particular program.

As shown in FIG. 5, when a print request is given by a host such as a PC via the centronics I/F, USB I/F, network I/F, or the like, this print request is received by the NCS process, and is transferred to the printer application process in a step S501. The printer application process generates a new print job in response thereto, and performs a job operation mode setting request function call to the ESC process 124 in a thread 1 in a step S502. Then, this thread 1 waits for a function returned value, and the identifier (thread ID) of this thread is registered in the function return waiting queue by the client dispatcher. The above-mentioned job operation mode is a mode including a group of parameters required for operating the scanner, plotter, finisher and so forth, and defining job operation conditions generated according to printer conditions such as printing paper size, printing number of pages, a paper feeding tray number, and so forth.

For the purpose of simplification, hereinafter, such an operation in that the identifier (thread ID) of a thread which has entered a function return waiting state after performing a function call to a server process is registered into the function return waiting queue together with the function ID is referred simply to as 'a thread enter a function return waiting state'.

In the ECS process 124, the server dispatcher receives the job operation mode setting function call from the printer application process, and starts a job operation mode setting function handler on the thread of the server dispatcher. Then, the above-mentioned job operation mode is set on the printer job generated by the job operation mode setting function handler, and then, the function returned value (indicating, for example, proper processing or error occurrence) is sent to the client dispatcher of the printer application process 111.

The client dispatcher of the printer application process 111 receives the function returned value from the ECS process 124, searches the function return waiting queue for the thread 1 waiting for the function retuned value, extracts the job operation mode setting function returned value and sends it to the thread 1.

For the sake of simplification, hereinafter, such an operation in that a client dispatcher searches the function return waiting queue for the identifier (thread ID) of a thread waiting for a function returned value, and, thus, the thread of the thus-searched identifier receives the function returned value from the client dispatcher is referred to simply as 'a thread receives a function returned value via the client dispatcher'.

Receiving the job operation mode setting function call from the client dispatcher, the thread 1 exits from the return waiting state, and, then, in order to make a job starting request, makes job start request function call to the ECS process 124 in a step S503, then, entering a function return waiting state.

In the ECS process 124, the server dispatcher receives the job start request function call from the printer application process, starts a job start request function handler on the thread of the server dispatcher, performs through the job start request function handler a job start process, and sends the function returned value thereof to the client dispatcher of the printer application process 111.

The client dispatcher of the printer application process 111 thus receives the job start request function returned value from the ECS process 124, and the thread 1 thus receives the job start request function returned value via the client dispatcher.

Then, the ECS process 124 transmits a memory image information request message to the MCS process 125 in a thread 3 so as to obtain printing data stored in the memory in a step S504. In the MCS process 124, the server dispatcher receives the memory image information request message from the ECS process 124, and then starts a memory image information request message handler. Then, by the memory image information request message handler, the image data stored in the memory is obtained, and the image data is sent to the ECS process 124 in a step S505. The client dispatcher of the ECS process 124 receives the image data from the MCS process 125, and transfers it to the thread 3. The processes of transmission of the memory image information request message and reception of the image data in response thereto are repeated until the printing page is completely processed in steps S508 and S509.

On the other hand, in the MCS process 125, after transmission of the image data to the ECS process 124, a memory acquisition request function call is made in a thread 5 so as to secure the image memory in a step S506, and enters a return waiting state. In the SRM process 123, the server dispatcher receives the memory acquisition request function call from the MCS process 125, thus starts a memory acquisition request function handler, reserves through the memory acquisition request function handler the image memory for the printing operation, and then, transmits the function returned value to the MCS process 125. The client dispatcher of the MCS process 125 receives the function returned value of the memory acquisition function, and the thread 5 receives this function returned value from via the client dispatcher.

In the ECS process 124, after receiving the printing data for the first page from the MCS process 125, a thread 4 makes a resource acquisition request function call to the SRM process so as to acquire the printer engine resource in a step S507, and then, the thread 4 enters a function return waiting state. In the SRM process 123, the server dispatcher receives the resource acquisition request function call from the ECS process 124, starts a resource acquisition request function handler, secures by means of the resource acquisition request function handler the printer engine, and then transmits the function returned value to the ECS process 124. The client dispatcher of the ECS process 124 receives the returned value on the resource acquisition request function call, and the thread 4 receives this returned value via the client dispatcher.

When a thread 3 of the ECS process 124 receives in a step S512 a reply of 'no image' as a message in response to the memory image information request message in a step S511, it determines that printing of all the printing data has been completed, and thus transmits a job end message to the printer application process 111 in a step S513. The client dispatcher of the printer application process receives this message, and the client dispatcher sends this message to the thread 1.

Thus, the inter-process communications are performed. Then, it is assumed that, during the printing operation on the print request, as shown in FIG. 5, another print request 2 is transmitted from the NCS to the printer application process 111 in a step S521. In this case, the inter-process communications the same as those described above are performed among the printer application process 111, ECS process 124, MCS process 125 and SRM process 123 in steps S522, S523 and S524. However, when a thread 7 of the ECS process 124 makes a resource acquisition request function call to the SRM process 123 in a step S527, as the printer engine is currently used by the printing operation on the first print request, the SRM process 123 does not returns a function returned value immediately. Thereby, the thread 7 enters a function return wait state, and is kept being registered in the function return waiting queue. Then, after the printer engine is released from the printing operation on the first print request, the SRM process returns the function returned value in a step S528, and, thereby, the thread 7 of the ECS process starts continuation of the operation on the print request 2.

The above-described situation thus occurs as the printer engine cannot be used for the printer job on the print request 2. However, other than this, there may occur a situation in which, upon the memory acquisition request function call made from the ECS process 124 to the SRM process, memory shortage occurs because of the printer job on the first print request, and thus, the necessary memory cannot be acquired for the printer job on the print request 2. In such a case, the thread makes this memory acquisition request function call continues to wait for function returned value until the printer operation on the first print request is finished. Accordingly, also in this case, the printer operation on the print request 2 is halted.

Figure 7:
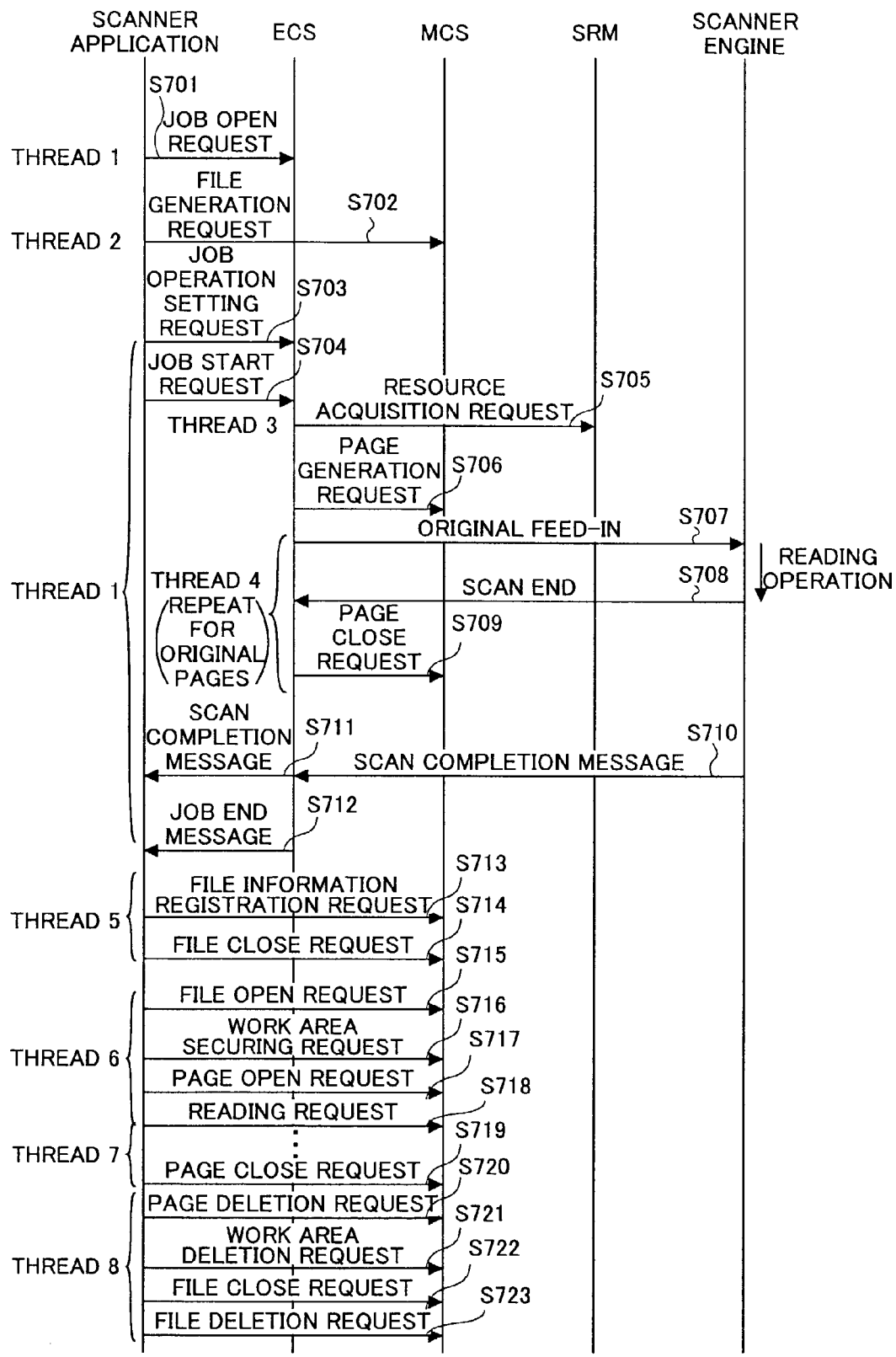
FIG. 7 shows a data communications sequence in scanner operation performed in the composite machine shown in FIG. 1.

Concerning the scanner operation performed in the composite machine in the first embodiment of the present invention, the inter-process communications performed among the scanner application process, ECS process, MCS process and SRM process will now be described. FIG. 7 illustrates data communications sequence performed in the composite machine when the scanner operation is performed between the respective processes of the scanner application, ECS, MCS and SRM. Further, FIG. 8 illustrates paths of transmitting function calls and messages between the respective processes.

Figure 8:
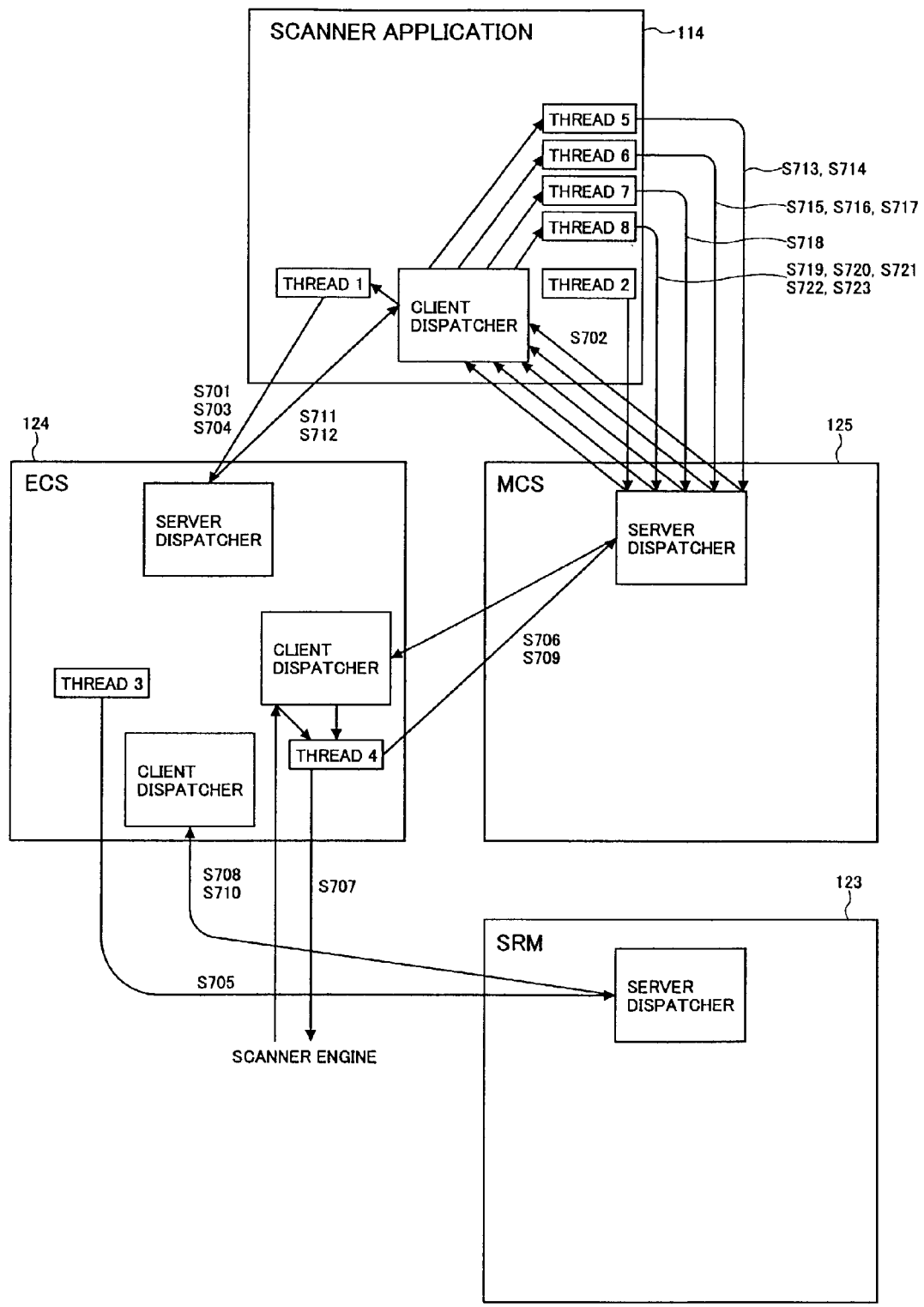
FIG. 8 illustrates a relationship between respective services in the scanner operation in the composite machine shown in FIG. 1.

As shown in FIG. 8, in the composite machine, the scanner application process 114, ECS process 124, MCS process 125 and SRM process 123 operate, and these processes are generated at a time the composite machine is started. Although only the processes used in the scanner operation are shown, other application processes/control service processes may also be generated at the time of starting of the composite machine.

The scanner application process 114 is started at the time of starting of the composite machine, and, as shown in FIG. 8, a plurality of threads operate in the process. The scanner application process 114 acts as a client process with respect to the ECS process 124 regarding it as a server process. Therefore, a thread of a client dispatcher operates for the ECS process 124.

The ECS process 124 acts as a server process with respect to the scanner application process 114 regarding it as a client process at a time of scanner operation. Also, it acts as a client process with respect to the MCS process 125 and SRM process 124 regarding them as server processes, respectively. Therefore, in the ECS process, a thread of a server dispatcher for the scanner application process 114, a thread of a client dispatcher for the MCS process 125, a thread of a client dispatcher for the SRM process 124, and a plurality of other threads concerning processes of job control and engine control operate.

The MCS process 125 acts as a server process with respect to the scanner application process 114 and ECS process 124 regarding them as client processes, respectively, during the scanner operation. Therefore, the MCS process has threads of server dispatchers for the scanner application process 114 and ECS process 124, and a plurality of other processes of memory control and hard disk control operate therein.

The SRM process 123 acts as a server process with respect to the ECS process 124 regarding it as a client process. Therefore, the SRM process 123 has a thread of a server dispatcher for the ECS process 124 and a plurality of other threads of other processes on engine resource control operate therein.

According to the first embodiment of the present invention, during the scanner operation, the scanner application process has a thread for each of a series of processes of respective function calls on job open request, job operation mode setting request and job start request, for a process of file generation request function call, for a process of file information registration function call and file close request function call. Further, during operation of reading a scanned image, the scanner application process 114 has a thread for each of processes of a file open request function call, a work area securing request function call, and a page open request function call, process of making a reading request, and a series of processes of performing a page close request function call, a page deleting request function call, a work area deleting request function call, a file close request function call, a file close function request call and a file deleting request function call.

The ECS process 124 has a thread for each of processes of performing a resource acquisition request function call, and a series of processes of performing repeatedly for the number of pages of an original document a page generation request function call, an original feed-in and page close request function call.

However, these processes on respective threads are only for example, and may be determined in another way for each particular program.

As shown in FIG. 7, when a scan request is given to the scanner application process 114, the scanner application process 114 generates a new scanner job, and, in a thread 1, performs a job open request function call in a step S701 to the ECS process 124. Then, this thread 1 enters a function return waiting state, and the identifier of the thread 1 is registered by the client dispatcher into the function return waiting queue together with the function ID of the above-mentioned function call. Further, in the scanner application process, simultaneously, a thread 2 performs a file generation request function call in a step S702 to the MCS process 125, enters a function return waiting state, and similarly, the identifier of the thread 2 is registered into the function return waiting queue.

In the ECS process 124, the server dispatcher receives the job open request function call from the scanner application process 114, and starts a job open function handler on the thread of the server dispatcher. Then, the job open function handler opens the job, and, then, sends the function returned value to the client dispatcher of the scanner application process 114.

On the other hand, in the MCS process 125, the server dispatcher receives the file generation request function call from the scanner application process 114, and, by means of a file generation request function handler, generates a file for temporarily storing scanned image data in the hard disk. Then, the MCS process 125 sends the function retuned vale to the client dispatcher of the scanner application process 114.

The client dispatcher of the scanner application process 114 receives the function returned value on the job open function from the ECS process 124, and, also, receives the function returned value on the file generation request function simultaneously. Then, it detects the thread 1 waiting for the function returned value on the job open request function and the thread 2 waiting for the function returned value on the file generation request function, by means of the relevant function returned values. Then, the client dispatcher of the scanner application process 114 sends the retuned value on the job open request function to the thread 1 while sends the returned value on the file generation request function to the thread 2.

The thread 1 receiving the function returned value thus exits from the return waiting state, and, in order to set a job operation mode, performs a job operation mode request function call to the ECS 124 in a step S703, and then, enters a function return waiting state.

In the ECS process 124, the server dispatcher, receiving the job operation mode setting request function call from the scanner application process, sets, by means of a job operation mode setting request function handler, the above-described job operation mode on the scanner job. Then it sends the function retuned value to the client dispatcher of the scanner application process 114.

The client dispatcher of the scanner application process 114 receives the job operation mode setting request function returned value, the thread 1 receives the job operation mode setting request function returned value via the client dispatcher, and, thus, the thread 1 exits from the return waiting sate. The thread 1 thus exiting from the waiting state makes a job state request function call to the ECS process 124 in a step S704, and enters a function return waiting state again. The server dispatcher of the ECS process 124 receives this call, performs a predetermined job start process by means of a job start request function handler, and sends the function returned value to the client dispatcher of the scanner application process 114. The client dispatcher of the scanner application process 114 receives the job start request function returned value, and the thread 1 receives the same retuned value via the client dispatcher.

At this time, in the in the ECS process 124, in order to acquire the resource of scanner engine, a thread 3 performs a resource acquisition request function call to the SRM process 123, in a step S705, and enters a function return waiting state. In parallel, in the ECS process 124, in order to secure a memory area for storing a scanned image for each page, a thread 4 performs a page generation request function call in a step S706, and enters a function return waiting state. At this time, in the function return waiting queue, the identifiers of the threads 3 and 4 are stored together with the function IDs of the respective functions called.

In the SRM process 123, the server dispatcher receives the resource acquisition request function call, and thus, a resource acquisition request function handler acquires the scanner engine, and then, sends the function returned value to the ECS process 124. In the MCS process 125, the server dispatcher receives the page generation request function call, and a page generation request function handler secures a memory area for one page, opens the page, and then, sends the function retuned value to the ECS process 124.

The client dispatcher of the ECS process 124 receives these respective function retuned values on the page generation request function and resource acquisition request function. Then, the thread 3 receives the returned value on the resource acquisition request function via the client dispatcher while the thread 4 receives the returned value on the page generation request function call via the client dispatcher. Thus, the thread 4 exits from the function return waiting state, transmits an original feed-in instruction message to the scanner engine in a step S707, and, thereby, reading of the original document by the scanner is started. After a page of original document is thus read, the scanner engine sends a scan completion message to the ECS process 124, in a step S708. The thread 4 receives this message, performs a page close request function call to the MCS process 124 in a step S709, and enters a return waiting state.

In the MCS process 125, receiving the page close request function call, a page close request function handler closes the page of image opened on the memory, and sends the function returned value to the client dispatcher of the ECS process 124.

The client dispatcher of the ECS process 124 receives the page close request function returned value, and thus, the thread 4 waiting for the returned value receives this returned value via the client dispatcher. Thereby, the thread 4 exits from the return waiting state, and repeats the above-described processes in the steps S706 through S709 from the page generation request function call through the page close request function call. When the scan of the final page of the original document is finished, the thread 4 has a scan process completion message sent from the scanner engine in a step S710. Accordingly, the thread 4 transfers this scan completion message to the scanner application process 114 in a step S711, and also, sends a job end message thereto in a step S712.

The client dispatcher of the scanner application process 114 receives the scan completion message and job end message from the ECS process 124, and sends them to the thread 1. On the other hand, in the scanner application process 114, a thread 5 performs a file information registration request function call to the MCS process 125 in a step S713, and enters a function return waiting state.

In the MCS process 125, when the server dispatcher receives the file information registration request function call, a file information registration request function handler registers, with respect to the temporarily generated file storing all the scanned image, file information such as a file name, storage address, and so forth, and sends the function returned value to the client dispatcher.

When receiving the returned value on the file information registration request function call via the client dispatcher, the thread 5 in the scanner application process 114 performs a file close request function call to the MCS process 125 in a step S714, and enters a function return waiting state. In the MCS process 125, the server dispatcher receives this file close request function call, and a file close request function handler closes the file of the scanned image, and sends the function returned value to the scanner application process 114. By receiving this returned value, the scanner application process 114 finishes the present scan process.

Then, the scanner application process 114 performs the following process so as to read out the thus-stored scanned image. First, a thread 6 performs, to the MCS process 125, a file open request function call for opening the file of the scanned image, a work area securing request function call for securing a work area, and a page open request call, in sequence in steps S715 through S717. The thread 6 enters a function return waiting state after performing each of these function calls, and, then, after receiving a relevant function returned value, it exits from the return waiting state and performs the next function call in sequence.

The server dispatcher in the MCS process 125 receives the above-mentioned file open request function call, work area securing request function call and page open request function call in sequence, and thus, respective function handlers perform a scanned image file opening process, a work area securing process, and a page opening process, thus returning the relevant function returned values to the scanner application process. The client dispatcher in the scanner application process then receives these function returned values in sequence, and the thread 6 receives the same via the client dispatcher.

In the scanner application process 114, a thread 7 performs a reading request function call for reading the image data from the scanned image file in a step S718, and enters a function return waiting state. Then, a thread 8 performs, to the MCS process, a page close request function call in a step S719, and enters a function return waiting state.

In the MCS process 125, after the page opening process required by the thread 6 is finished, with reception of the reading request function call from the thread 7 of the scanner application process 114, a reading request function handler reads image data from the scanned image file, and, sends the function returned value to the scanner application process together with the image data. In the scanner application process 114, the thread 7 receives the returned value on the reading request function call, exits from the return waiting state, performs the next function call, and then, receives the function returned call in the same manner.

In the MCS process 125, after the last reading request process requested by the thread 7 is finished, a page close request function handler starts in response to the function call received from a thread 8, and closes the opened page data, thus returning the function returned value to the scanner application process. Thereby, the thread 8 in the scanner application process 114 exits from the return waiting state by receiving this function returned value via the client dispatcher. Thereby, the thread 8 performs a page deleting function call, a work area deleting request function call, a file close request function call, and a file deleting request function call, in sequence in steps S720 through S723. By receiving these function calls, respective function handlers perform a page data deletion process, a work area deletion process, a scanned image file closing process, a scanned image file deletion process, respectively, and return the respective function returned values to the scanner application process 114.

In the scanner application process 114, the thread 8 receives these function returned values via the client dispatcher, and thus, finishes the scanned image reading process.

Copy operation performed in the composite machine in the first embodiment of the present invention will now be described with reference to FIGS. 9 and 10.

Figure 10:
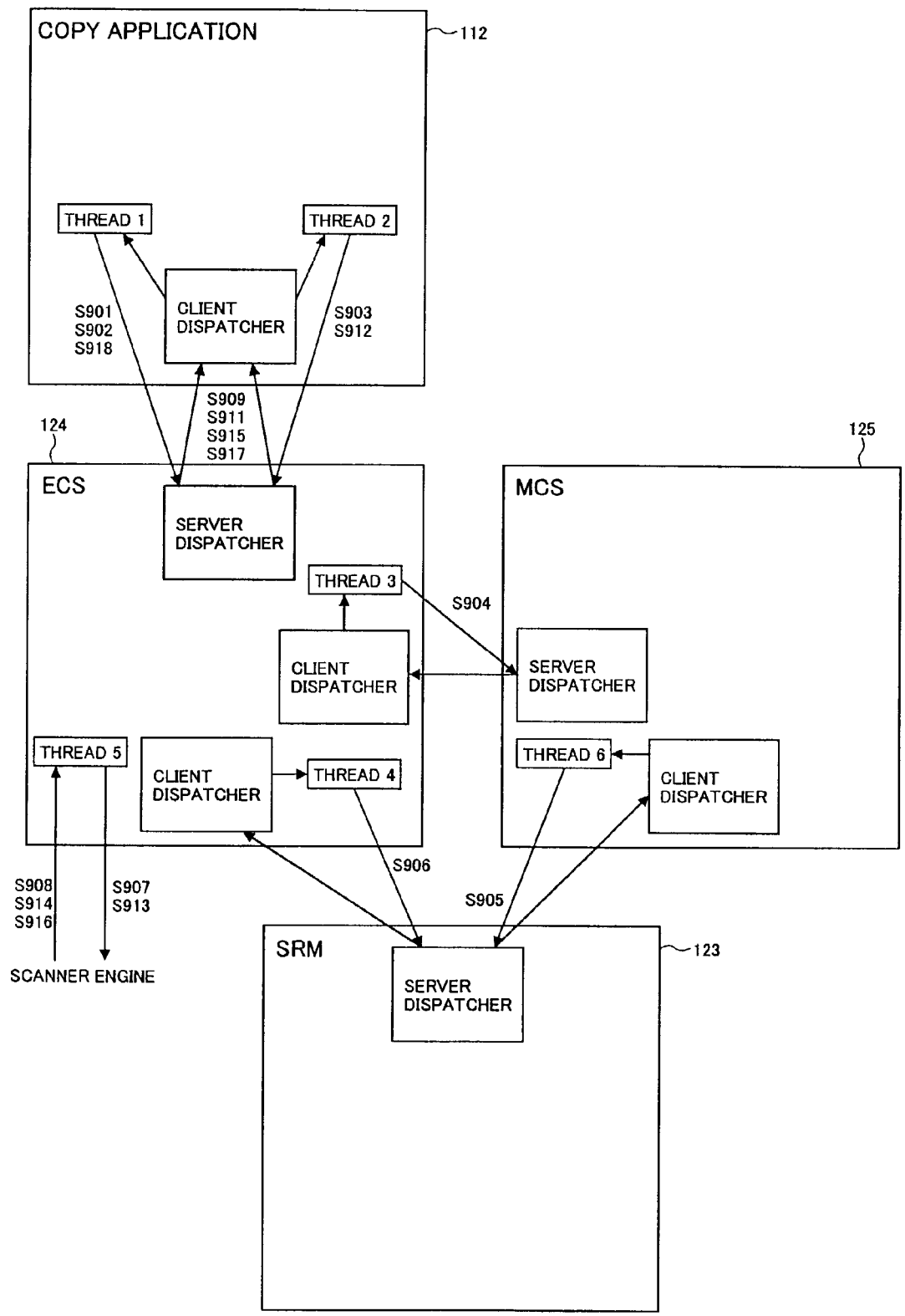
FIG. 10 illustrates a relationship between respective services in the copy operation in the composite machine shown in FIG. 1.

As shown in FIG. 10, the copy application process 112, ECS process 124, MCS process 125 and SRM process 123 operate, and are generated at a time of starting of the composite machine. Although FIG. 10 shows only processes used in the copy operation, other application processes and control service processes may also operate and are started at the time of starting of the composite machine, actually, there.

In the copy application process 112, a plurality of threads are started there as shown. As the copy application process 112 acts as a client process with respect to the ECS process 124 regarding it as a server process, a thread of a client dispatcher for the ECS process 124 is started in the copy application process 112.

The ECS process 124 acts as a server process with respect to the copy application process 112 regarding as a client process, and also, acts as a client process with respect to each of the MCS process 125 and SRM process 123 regarding as a server process. Accordingly, a thread of a server dispatcher for the copy application process 112, a thread of a client dispatcher for each of the MCS process 125 and SRM process 123, and a plurality of threads for other processes performing job control and engine control operate.

The MCS process 125 acts as a server process with respect to the ECS process 124 regarding as a client process during the copy operation, and, also, acts as a client process with respect to the SRM process regarding as a server process. Therefore, in the MCS process 125, a thread of a server dispatcher for the ECS process 125, a thread of a client dispatcher for the MCS process 125, and a plurality of threads of other processes for performing memory control sand hard disk control operate.

The SRM process 123 acts as a server process with respect to each of the ECS process and MCS process regarding it as a client process. Therefore, in the SRM process 123, a server dispatcher for both the ECS process and MCS process, and a plurality of threads of other processes for performing engine resource control operate.

In the copy application process 112, a thread 1 performs a series of processes such as a job open request function call, a job operation mode setting function call and a job close request function call; and a thread 2 performs a file close request function call.

In the ECS process, a thread 3 performs a memory securing request function call; a thread 4 performs a resource acquisition request function call; and a thread 5 performs an original feed-in process.

In the MCS process, a thread 6 performs a memory acquisition request function call.

However, such a role of each thread is only for example, and, may be determined in another way for each particular program.

Figure 9:
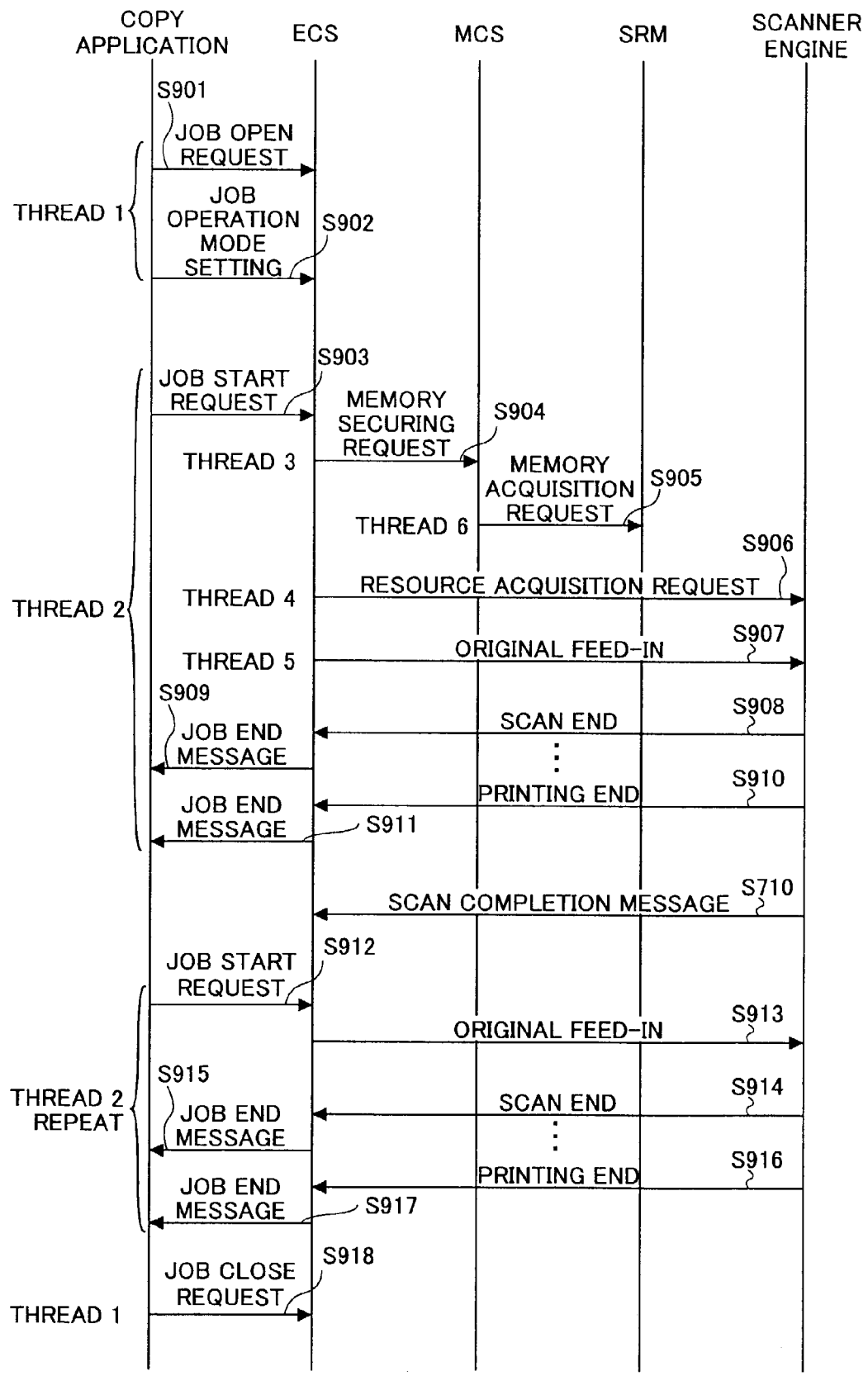
FIG. 9 shows a data communications sequence in copy operation performed in the composite machine shown in FIG. 1.

As shown in FIG. 9, when a copy request is given, the copy application process 112 generates a new job, and the thread 1 performs the job open function call in a step S901. Thereby, the thread 1 enters a function return waiting state, and the identifier (thread ID) thereof is registered into a function return waiting queue by the client dispatcher together with the function ID of the relevant job open request function.

In the ECS process 124, the server dispatcher receives this job open request function call from the copy application process 112, and thereby, a job open request function handler is started on the thread of the server dispatcher. Then, the job open request function handler opens the copy job, and then, sends the function returned value to the client dispatcher of the copy application process 112.

The client dispatcher of the copy application process 112 receives this function returned value, and searches the function return waiting queue for the thread waiting for the function returned value. Then, to the thus-searched-for thread 1, the job open request function returned value is given via the client dispatcher.

The thread 1 receiving the job open request function returned value, thus exits from the returned value waiting state, performs the job operation setting request function call to the ECS process 124, and enters a function returned value waiting state again in a step S902. On the other hand, the thread 2 performs the job start request function call to the ECS process 124 in a step S903, and enters a function returned value waiting state. At this time, in the function return waiting queue, the identifier of the thread 1 together with the function ID of the job operation mode setting request function, and also, the identifier of the thread 2 with the function ID of the job start request function are registered by the client dispatcher.

In the ECS process 124, the server dispatcher receives the job operating mode setting request function call from the copy application process 112, the job operation mode setting request function handler sets the above-described operation mode on the copy job, and sends the function returned value to the client dispatcher of the copy application process 112. On the other hand, the server dispatcher also receives the job start request function call; the job start request function handler thereof performs a predetermined job start process, and sends the function returned value to the client dispatcher of the copy application process 112.

The client dispatcher in the copy application process 112 receives the function returned values on the job operation mode setting request function and job start request function, from the ECS process 124, the thread 1 thereof thus receives this job operation mode setting request function returned value while the thread 2 thereof thus receives the job start request function returned value.

The ECS process 124 then has the thread 3 thereof performs a memory securing request function call in a step S904 indicating a required memory size to the MCS process 125 so as to secure the memory to store a scanned image, and enters a function retune waiting state. In parallel, the thread 4 thereof performs a resource acquisition request function call in a step S906 for acquiring the resources of scanner engine and printer engine to the SRM process 123, and enters a function return waiting state.

After receiving the memory securing request function call, the server dispatcher of the MCS process 125 has a memory securing request function handler thereof secure the required size of area in the memory, and send the function returned value to the ECS process 124. On the other hand, the SRM process 123 receiving the resource acquisition request function call, thus has a resource acquisition function handler thereof acquire the scanner engine and printer engine, and sends the function retuned value to the ECS process 124.

The client dispatcher in the ECS process 124 receives the memory securing request function retuned value from the MCS process 125 and also receives the resource acquisition request function returned value from the SRM process 123. Then, the thread 3 thereof receives the memory securing request function returned value via the client dispatcher and exits from the function return waiting state. Similarly, the thread 4 receives the resource acquisition request function returned value via the client dispatcher and exits from the function return waiting state.

As the ECS process 124 thus acquires the printer engine and scanner engine on the copy job, the thread 5 thereof performs a predetermined original feed-in process by the scanner engine in a step S907, and, thus, an original scanning process in the copy operation starts.

When finishing the original scanning process, the scanner engine sends a scanning end message to the thread 5 of the ECS process 124 in a step S908, and the printer engine starts printing of the scanned image. Then, after finishing the printing of the scanned image, the printer engine sends a printing end message to the thread 5 of the ECS process 124 in a step S910.

When the thread 5 of the ECS process 124 receives the scanning end message, it sends a job end message indicating the scanning end to the copy application process 112, in a step S909. Similarly, when the thread 5 receives the printing end message from the printer engine, it sends the job end message indicating printing end to the copy application process 112 in a step S911.

The client dispatcher of the copy application process 112 receives these two kinds of job end messages, and thus, starts message handlers, and thereby, sends the respective job end messages to the thread 2. Thereby, copy process on one page of the original is finished.

In case a plurality of pages of original are copied, the ECS process 124 further performs the job start request function call in a step S912, and, thereby, the ECS process 124, MCS process 125, SRM process 123, scanner engine and printer engine perform processes the same as those described above in steps S913 through S916. After all the pages of original are copied, and the last job end message is received by the copy application process 112 in a step S917, the thread 1 performs the job close request function call to the ECS process 124 in a step S918.

The server dispatcher of the ECS process 124 receives this job close request function call, and a job close request function handler thereof closes the opened copy job, and sends the function returned value to the copy application process 112.

The client dispatcher of the copy application process 112 receives this returned value, and the thread 2 waiting for it exits from the waiting state after receiving this returned value via the client dispatcher. Thus, the copy operation finishes.

In case a scan request is received by the scanner application process 114 during the above-described operation, the following process is performed. For example, it is assumed that the scan request is made to the scanner application process 112 after the ECS process 124 makes the resource acquisition request function call to the SRM process for the scanner engine and printer engine in the copy operation. In this case, in the scanner operation shown in FIG. 7, the resource acquisition request call is made to the SRM process 123 from the ECS process 124 for the scanner engine. However, the scanner engine is already acquired by the copy job. Accordingly, the scanner job cannot acquire the same. Therefore, on the scanner job, the resource acquisition request function returned value is sent to the ECS process 124 after the copy job is finished and then the scanner engine is released. During the period, the thread having made the function call on the scanner job waits for the returned value, and, thus, the scanner job is halted until the copy job is finished. Similarly, in case a print request is made to the printer application process 111 after the printer engine is acquired by the copy job on the copy operation, the print job is halted until the copy operation is finished.

Other than such a case, it may also be assumed that, when page generation request function call is made to the MCS process 125 by the ECS process 134 on a scanner job, the copy job has already acquired the memory, and, thereby, the page generation cannot be achieved due to memory shortage. Also in this case, the thread having made the page generation request function call enters a function return waiting state, and, thus, the scanner operation is halted until the copy operation is finished.

Figure 11:
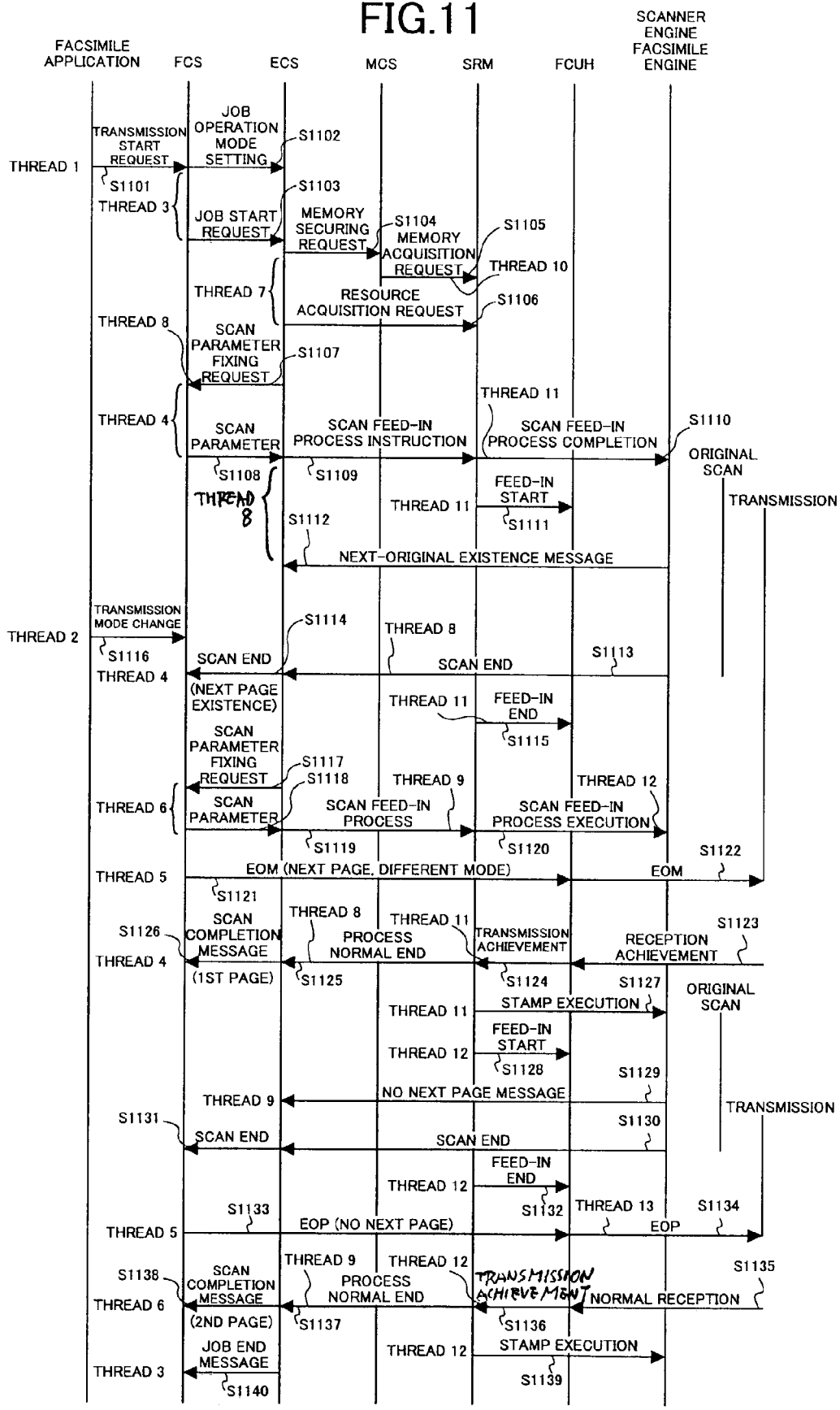
FIG. 11 shows a data communications sequence in facsimile transmission operation performed in the composite machine shown in FIG. 1.
Figure 12:
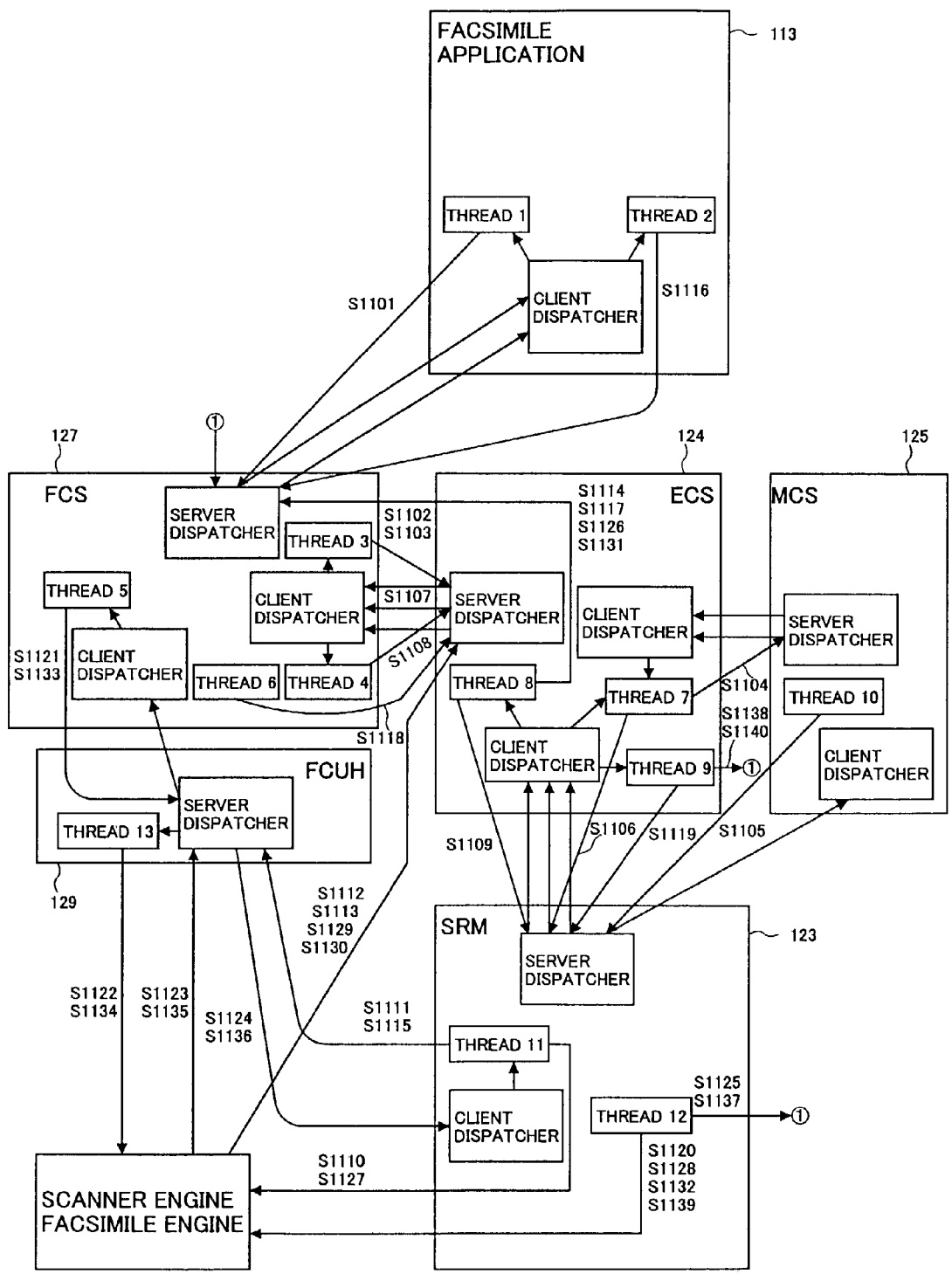
FIG. 12 illustrates a relationship between respective services in the facsimile transmission operation in the composite machine shown in FIG. 1.

With reference to FIGS. 11 and 12, facsimile transmission operation performed in the composite machine in the first embodiment of the present invention will now be described.

As shown in FIG. 12, in the composite machine, the facsimile application process 113, FCS process 127, ECS process 124, MCS process 125, SRM process 123 and FCUH process 128 operate, and are started at a time of the composite machine is started. However, other than these processes, other application processes and control service processes may also be started at the same time.

The facsimile application process 113 acts as a client process with respect to FCS process 127 regarding it as a server process, and, thus, has a thread of a client dispatcher for the FCS process 127 started therein.

The FCS process 127 acts as a server process with respect to the facsimile application process 113 regarding it as a client process, and, also, acts as a client process with respect to the ECS process 124 and FCUH process 129 regarding them as server processes. Accordingly, the FCS process 127 has a thread of a server dispatcher for the facsimile application process 113, a thread of a client dispatcher for the ECS process, thread of a client dispatcher for the FCUH process 129, and a plurality of threads of other processes for performing facsimile communications control operate therein.

The FCUH process 129 is a sub-process of the FCS process 127, and acts as a server process with respect to the SRM process 123 and FCS process 127 regarding them as client processes. Accordingly, it has a thread of a server dispatcher for the SRM process and FCS process, and a plurality of threads of other processes providing instructions for facsimile device driver and so forth operate therein.

The ECS process 124 acts as a server process with respect to the FCS process 127 regarding as a client process, and also, acts as a client process with respect to the MCS process 125 and SRM process 123 regarding them as server processes. Accordingly, the ECS process 124 has a thread of a server dispatcher for the FCS process, a thread of a client dispatcher for the MCS process, a thread of a client dispatcher for the SRM process, and a plurality of threads of other processes performing job control and engine control operate therein.

The MCS process 125 acts as a server process with respect to the ECS process 124 regarding it as a client process, and, also, acts as a client process with respect to the SRM process regarding it as a server process. Accordingly, it has a thread of a server dispatcher for the ECS process, a thread of a client dispatcher for the SRM process and a plurality of threads of other processes performing memory control and hard disk control operate therein.

The SRM process 123 acts as a server process with respect to the ECS process and MCS process regarding them as client processes, and, also, acts as a client process with respect to the FCUH process 129 regarding it as a server process. Therefore, it has a thread of a server dispatcher for the ECS process and MCS process, a thread of a client dispatcher for the FCUH process 129, and a thread of a process concerning engine resource control operate therein.

The facsimile application process 113 has a thread 1 for a transmission start request function call, and a thread 2 of a transmission mode change request function call. The FCS process has a thread 3 for a job operation mode setting function call and a job start request function call, a thread 4 or 6 for receiving a scan parameter request message and transmitting a scan parameter, and a thread 5 of sending next page information such as EOM, EOF or the like. The ECS process 124 has a thread 7 for a memory securing request function call and a resource acquisition request function call, and a thread 8 for sending a scan feed-in process generation instruction message. The MCS process 125 has a thread 10 for a memory securing request function call, and a thread for sending messages. The SRM process 123 has a thread 11 for sending a feed start message, a feed-in end message and a stamp execution instruction message, and a thread 12 for a scan feed-in process execution process. The FCUH process 129 has a thread 13 for sending a next-page information message i.e., EOM, EOF or the like. However, the operation on each thread mentioned above is merely for example, and, may be determined in another way for each particular program arbitrarily.

As shown in FIG. 11, when a facsimile transmission request is given, the facsimile application process 113 generates a new facsimile transmission job, and the thread 1 performs the transmission start request function call to the FCS process 127 in a step S1101, and it enters a function return waiting state. In the FCS process, the server dispatcher receives this call, and starts a transmission start request function handler, which has then the thread 3 thereof perform the job operation mode setting request function call to the ECS process 124 in a step S1102, and enter a function return waiting state.

The server dispatcher in the ECS process 124 receives the job operation mode setting request function call from the FCS process 127, and a job operation mode setting request function handler thereof sets on the facsimile transmission job the above-described operation mode, and sends the function retuned value to the client dispatcher in the FCS process 127.

The client dispatcher in the FCS process 127 receives this returned value, and thus, the thread 3 receives this function returned value via the client dispatcher. Thereby, the thread 3 exits from the return waiting state, performs the job start request function call to the ECS process 124 in a step S1103, and then, enters a function return waiting state again. The MCS 125 receives this job start request function call, a job start request function handler thereof performs the memory securing request function call to the MCS 125 in a step S1104, and also, performs the recourse acquisition request function call to the SRM 123 in a step S1106. Processes performed by the MCS process 125 and SRM process 123 in response to these function calls, and processes performed by the ECS process 124 in response to receiving the respective function returned calls are the same as those described above on the copy operation, and duplicate description thereof is omitted.

The thread 7 in the ECS process 124 receives the resource acquisition request function retuned value, and then, sends a scanner parameter fixing request message to the FCS process 127 in a step S1107. The scanner parameter indicates a scanning resolution, i.e., fine, normal or the like, original size, and so forth. The thread 4 in the FCS process 127 receives this scanner parameter fixing request message and sends a predetermined scanner parameter to the ECS process 124 as a message in a step S1108.

The server dispatcher in the ECS process 124 receives the scanner parameter, and reports this reception to the thread 7 which sent the same. Then, the thread 7 sends a scan feed-in process generation instruction message to the SRM process 123 in a step S1109. The thread 11 in the SRM process 123 responds to this scan feed-in process generation instruction message and generates a scan feed-in process, and executes it in a step S1110. Then, it sends an original feed-in start message to the FCUH process 129 in a step S1111. The FCUH process 129 receives this message, and thereby, an original feed-in process is started, and, thus, scanning of the original and transmission of the thus-scanned image to a predetermined destination are started.

Upon the start of scanning of the original, a next-page original detection message indicating whether or not a next page of the original exists is sent to the ECS process from the scanner engine. In the example of FIG. 11, a next-page existence message is sent at this time in a step S1112. Then, when scanning of the current page of the original is completed, the scanning end message is sent to the ECS process 124 from the scanner engine in a step S1113. The ECS process 124 sends the received scanning end message to the FCS process 127 together with the indication of the next-page original existence in a step S1114. On the other hand, after the scanning of the current page of the original is finished, the SRM process 123 gives a feed-in termination instruction to the FCUH process 129 in a step S1115, and then, the original feed-in operation is terminated.

At this time, if the facsimile application process 113 performs the transmission mode change request function call to the FCS process 127 in a step S1116, the thread 6 in the ECS process 124 sends the scanner parameter fixing request message to the FCS process 127. In response thereto, as described above, the FCS process 127 sends the scanner parameter to the ECS process 124 in a step S1118. The ECS process 124 receives this message, gives an instruction for execution of a next-page scan feed-in process to the SRM process 123, which then executes the same in steps S1119 and S1120.

After facsimile transmission to the predetermined destination on the first page is finished, the thread 5 of the FCS process 127 sends the EOM message indicating that a next page exists in a different transmission mode to the FCUH process 129 in a step S1121. The FCUH process 129 receiving this message transmits the EOM message to the predetermined destination by means of the thread 13 in a step S1122.

When the FCUH process 129 receives a message indicating normal reception from the destination in a step S1123, it sends to the SRM process 123 a transmission achievement message in a step S1124. The SRM process 123 receiving this message sends a normal end message to the ECS process 124 in a step S1125. Then, the ECS process 124 receiving this message sends a first page scan process completion message to the FCS process 127 in a step S1126. Then, the SRM process 123 receiving the transmission achievement message gives an instruction, according to instructions given, indicating that a stamp indicating transmission date/time, transmission source and so forth is sent to the destination, to the facsimile engine in a step S1127.

The SRM process 123 sends an original feed-in start message to the FCUH process 129 for start of feed-in of the second page in a step S1128. The FCUH process 129 receives this message, and thereby, the original feed-in process is started, and, thereby, scanning of the second page of original and transmission thereof are started.

Upon the start of scanning of the original, a next-page original detection message indicating whether or not a further next page of the original exists is sent to the ECS process from the scanner engine. In the example of FIG. 11, a next-page absence message is sent to the thread 9 at this time in a step S1129. Then, when scanning of the current page of the original is completed, the scanning end message is sent to the ECS process 124 from the scanner engine in a step S1130. The ECS process 124 sends the received scanning end message to the FCS process 127 together with the indication of the next-page original absence in a step S1131. On the other hand, after the scanning of the current page of the original is finished, the SRM process 123 gives a feed-in termination instruction to the FCUH process 129 in a step S1132, and then, the original feed-in operation is terminated.

After facsimile transmission to the predetermined destination on the second page is finished, the thread 5 of the FCS process 127 sends the EOM message indicating that no next page exits in a different transmission mode to the FCUH process 129 in a step S1133. The FCUH process 129 receiving this message transmits the EOM message to the predetermined destination by means of the thread 13 in a step S1134.

When the FCUH process 129 receives a message indicating normal reception from the destination in a step S1135, it sends to the SRM process 123 a transmission achievement message in a step S1136. The SRM process 123 receiving this message sends a normal end message to the ECS process 124 in a step S1137. Then, the ECS process 124 receiving this message sends a second page scan process completion message to the FCS process 127 in a step S1138. Then, the SRM process 123 receiving the transmission achievement message gives an instruction, according to instructions given, indicating that a stamp indicating transmission date/time, transmission source and so forth is sent to the destination, to the facsimile engine in a step S1139. Then, the ECS process 124 sends a job end message to the FCS process 127 in a step S1140. The client dispatcher in the FCS process 127 receives this message and thereby, facsimile transmission process on the entire original is finished.

Thus, according to the first embodiment of the present invention, the inter-process communications are achieved such that a client process such as each application process requires a service to a server process such as the ECS process, MCS process, SRM process or the like by means of a function call, and, also, messages are transmitted therebetween. Thereby, various services may be provided in various manners even in such a special configuration made of a combination of the application 130 and platform 120 as shown in FIG. 1.

Furthermore, the client dispatcher monitors for reception of the function returned value sent in response to service request by means of function call. Thereby, it is possible to easily achieve proper synchronization control among threads in each process. Accordingly, when only some modules of the application processes and control service processes should be changed/modified, it is not necessary to change an interface with any of the other processes as long as design for control concerning the function call and function returned value is appropriately made beforehand. Accordingly, function modification or the like can be made in a flexible manner for each application process or for each control service process.

Furthermore, parallel execution of processes can be achieved by means of applying a concept of threads, and also, another concept of function call and function returned value which has affinity with the concept of threads is also applied for synchronization control between threads in the inter-process communications. Accordingly, it is possible to minimize overhead required for switching of parallelly operating process, and to improve processing speed in providing composite services, i.e., providing various services in various ways.

The present applicant proposed an image process network system by Japanese laid-open patent applications Nos. 9-51398 and 9-91102, and a system configuration similar to that of the embodiment of the present invention shown in FIG. 1 of the present application is disclosed there. However, in these proposals of the present applicant, there is no disclosure of details of execution control described above by applying the concept of threads and also applying the concept of function call and function returned value in the above-described effective combination manner.

Figure 13:
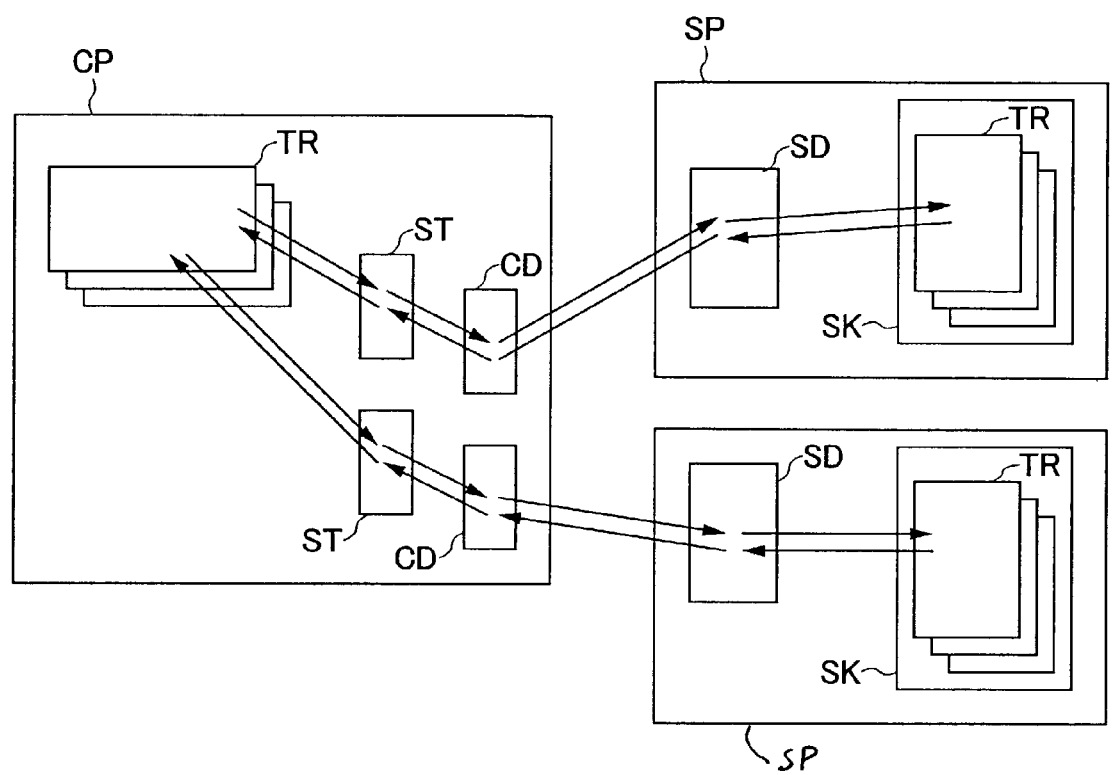
FIG. 13 shows a block diagram illustrating a system configuration as one example of embodying a process control system applicable to the composite machine shown in FIG. 1 built according to a second embodiment of the present invention.

FIG. 13 shows one example illustrating further details for achieving the above-mentioned first embodiment of the present invention. With reference to FIG. 13, how to build the above-described multi-thread function-call-manner process execution control system in the first embodiment of the present invention will now be described in terms of how to build the software program system thereof.

FIG. 13 corresponds to FIG. 2 described above. The client process CP includes the plurality of threads TR, and the client dispatcher CD while the server process SP also includes the plurality of threads TR and the server dispatcher SD. In the configuration shown in FIG. 13, a stub ST is provided between each thread TR and client dispatcher CD while a skeleton SK having particular coding made therein beforehand is provided for the server dispatcher SD and contains each thread TR. The function of the stub ST and skeleton SK will be described later.

By applying the concept of stub ST, it is possible to improve abstractness of programming on each thread TR while the stub interprets the code of each thread so as to properly perform a desired process of performing a specific function call, sending a specific message to the server dispatcher of a specific server process, or the like. Accordingly, it is easy to develop each thread TR without understanding the details of interface between respective processes, and, also, it is possible to avoid disclosing such details of the interface, system of the counterparts, and so forth to a third party which designs the threads of a particular application process/service control process.

By employing the scheme of the skeleton SK, a particular programmer should provide a description only an abstract of a process to be executed to be inserted into a predetermined space prepared in the skeleton. Accordingly, similar to the concept of the above-mentioned stub ST, the particular programmer who develops each particular process, for example, a process of image processing in the scanner engine or printer engine, a process of facsimile communications in the facsimile engine, or the like, should not recognize the details of interface with each of the other counterpart processes nor the systems thereof.

In other words, actually, each thread TR in one process cannot directly communicate with a thread in another process in the inter-process communications. For the purpose of communications between the threads in different processes, dispatch routine is provided, i.e., by means of the above-mentioned client dispatcher and server dispatcher, and also, as described above, by means of the above-described scheme using the concept of function call and function returned value. Furthermore, by providing the above-mentioned stub and skeleton system, each sub-vender programmer who develops each particular job process in the form of threads TR should not understand those matters concerning intermediate system needed for the above-described inter-process communications, but merely should create an abstract body part of each specific process.

Figure 14:
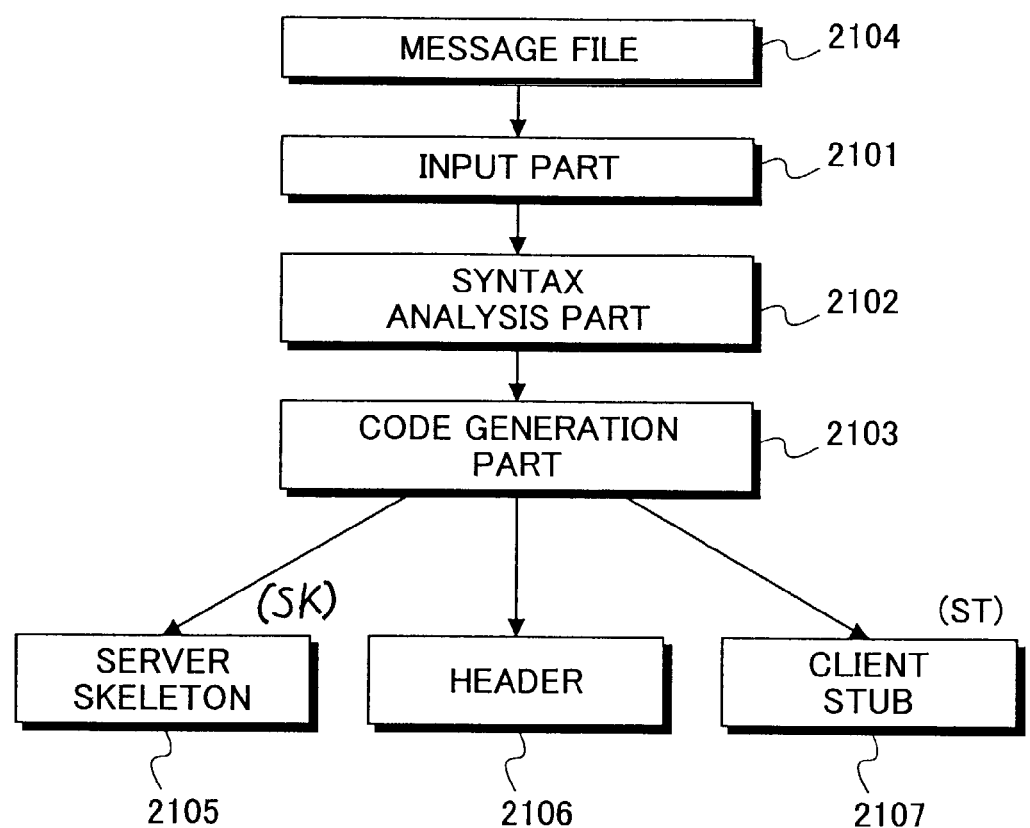
FIG. 14 shows a block diagram illustrating a functional block configuration of a stub generator according to the second embodiment of the present invention.

A specific method of building a software program system such as that of the first embodiment of the present invention will now be described. FIG. 14 shows a stub generator in a second embodiment of the present invention for automatically producing a client stub ST and a server skeleton SK to be used for building the process control system employing the inter-process communications scheme such as that shown in FIG. 1.

The stub generator in the second embodiment of the present invention shown in FIG. 14 includes an input part 2101 for inputting a message file 2104, a syntax analysis part 2102 which checks the syntax of the contents described in the input message file 2104, and a code generation part 2103 which generates a header 2106, a server skeleton (SK) 2105 and a client stub (ST) 2107 from the contents of the message file 2104, and stores them into a recording medium such as a hard disk drive.

The message file 2104 is a source file describing communication contents of the inter-process communications with a source code such as a well-known C programming language.

FIG. 16 illustrates an example of description of the message file 2104. As shown in the figure, the message file 2104 includes an include declaration 2201 declaring another message file, an include header described with C language; a message description 2202 describing messages transferred between a server process and a client process; and a function declaration 2203 declaring functions sent from the client process to the server process in a form of function call.

The messages described in the message description 2202 are those issued mainly for notification of event/message between the server process and client process. Specifically, in the message description 2202, each message includes a message name, a message ID, a message direction, and message contents.

The above-mentioned message direction may be, as mentioned above, any one of 'IN', 'OUT' and 'SELF'. 'IN' indicates a direction of the message from the client process to the server process; 'OUT' indicates a direction from the server process to the client process; and 'SELF' indicates a direction toward the own process.

The functions declared in the function declaration 2203 are those issued for giving requests such as a processing request, a setting request and so forth from the client process to the server process. In the function description 2203, for each function to be declared, only a function name, a function type and an argument are described, but no specific contents of the function are described there.

The client stub 2107 corresponding to that ST shown in FIG. 13 is a source file describing an issue of a function to be called by a client program (specifically, a thread) to the server process. As a result of compiling the client stub 2107 into a library and provide a linkage thereof with the client program, a function call from the client program is issued to the server process via the client stub 2107.

FIG. 17 illustrates an example of the client stub 2107 generated by the stub generator shown in FIG. 14. As shown in FIG. 17, the client stub 2107 includes a part for performing the function call which actually calls the relevant function handler (such as those 403 shown in FIG. 4 included in the server dispatcher) registered in the server skeleton 2105 corresponding to that SK shown in FIG. 13.

The server skeleton 2105 is a source file registering function handlers to be called by the client stub 2107 and message handlers (such as those 402 also shown in FIG. 4 included in the server dispatcher).

FIG. 18 illustrates one example of the server skeleton 2105 generated by the stub generator. As shown, the server skeleton 2105 registers the function handlers, i.e., Open_handler (a, b, c) 2211 and Close_handler (e, f, g) 2212 corresponding to the functions described in the client stub 2107 shown in FIG. 17. However, each function handler merely describes transfer of arguments but has a mounting description part 2213, 2214 for describing process contents left as a blank column/space. The amounting description part 2213, 2214 is filled by a program developer for the server program (actually, a thread) freely with the process contents/entity of the function to be called by the client program via the client stub 1107 (in other words, called by the client thread via the client dispatcher).

The header 2106 is a source file describing definitions, declarations and so forth common between the server skeleton 2105 and client stub 2107. FIG. 19 illustrates one example of the header 2106 generated by the stub generator shown in FIG. 14. As shown, the header 2106 includes include declaration 2201, message declaration 2231 i.e., message ID, message structure and so forth, function declaration 2203, function handler declaration 2232 and so forth.

Process of generating the server skeleton 2105, client stub 2107 and header 2106 by the stub generator according to the second embodiment of the present invention will now be described with reference to FIG. 15.

Figure 15:
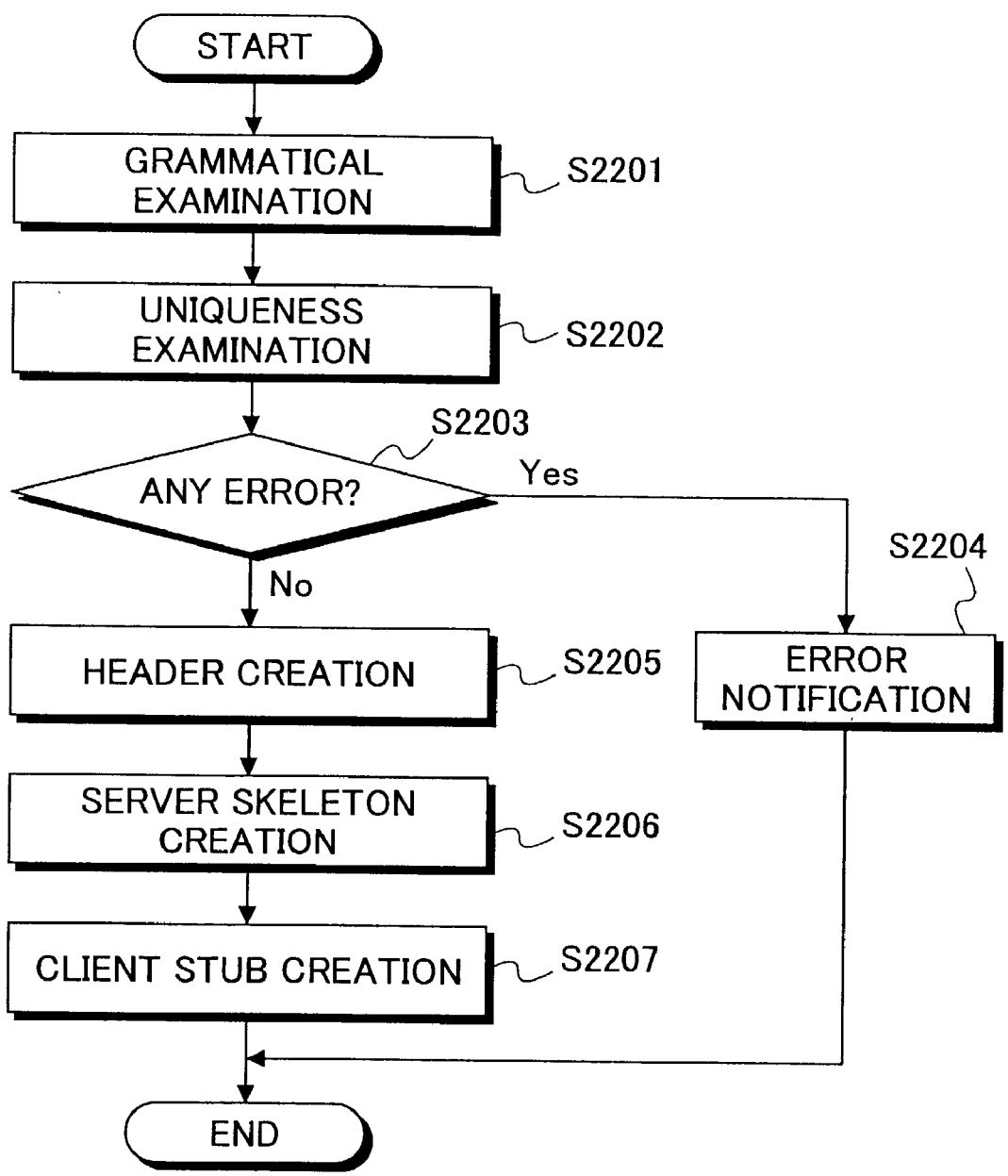
FIG. 15 shows an operation flow chart illustrating a process generating a server skeleton, a client stub and a header by means of the stub generator shown in FIG. 14.

As shown in FIG. 15, the syntax analysis part 2102 of the stub generator performs grammatical examination of the function declaration 2203, message definition 2202, include definition 2201, and C language description described in the message file 2104, in a step S2201. Furthermore, the syntax analysis part 2102 determines in a step S2202 as to uniqueness of the message ID and message name included in the message definition 2202.

Then, when grammatical error is found in the description of the function declaration, message definition and include definition, or any duplication is found in message ID or message name (Yes in a step S2203), a message indicating that an error occurs is notified to the user in a step S2204, and the current operation is finished.

When neither grammatical error nor duplication occurs (No in the step S2203), the code generation part 2103 generates the header 2106, server skeleton 2105 and client stub 2107 from the description contents of the message file 2104. Specifically, the include declaration 2201 and C language description are transcribed as they are to the header 2106, and, also, the message structure described in the message file 2104 is copied into the header 2106 in a step S2205.

Furthermore, the code generation part 2103 automatically creates the function handler name from the function declaration included in the message file 2104 (for example, for the function name 'abc', the function handler name 'abc handler' is obtained), and also, the thus-created function handler name is registered in the server skeleton. Then, in the process in the function handler, description of argument transfer is made, and also, issue of returned value area generation system call is described. Then, the above-mentioned mounting description part is left as a blank column in the description of the function handler, and, below the mounting description part, issue of respective system calls of returned value transmission and returned value area release are described, in a step S2206.

Further, the code generation part 2103 registers, for each function declaration described in the message file 214, the description of function name and arguments into the client stub 2107, and, in the function process description thereof, respective system calls of function call message generation call, function handler call and returned value release are described in a step S2207. It is noted that, in the function handler call, a configuration is made such that function returned value waiting system call for waiting the returned value of the issued function be internally issued.

After the client stub 2107, server skeleton 2105 and header 2106 are thus generated by the stub generator, a server object and a client object are compiled. A developer of a server program describes, by using an editor or the like, the process contents/entity to be executed by means of each function handler into the mounting description part (left as the blank column as mentioned above) in the description of the function handler in the server skeleton 2105. Then, the server skeleton 2105 thus supplemented with the process contents or process entity is compiled with the header 2106. Thus, the server stub object is completed.

Further, a server source file is created in which the function handlers registered in the server skeleton 2105 are declared, and, also, issue of system calls such as the message handler (such as that 402 in FIG. 4) performing transfer of messages described in the message file 2104 with the client process, the error handler (401) performing error processing, initialization of the server process, starting of the server dispatcher (204) and so forth is described. Then, the thus-created server source file is compiled, linkage with the above-mentioned server stub object is provided, and thus, the server program is completed.

On the other hand, the client stub 2107 is compiled with the header 2106, and, thus, the client stub object is created. Such a client stub object is created for each client process, and, the thus-created plurality of client stub objects are collected into a library.

Further, a client source file is created in which function issuance, function handler declaration, error handler (301 in FIG. 3) declaration, issue of system calls such as message handlers (302) performing transfer of the messages described in the message file 2104, client process initialization, client dispatcher starting and so forth are described. Then, the thus-created client source file is compiled, a linkage with the client stub library is provided, and, thus, the client program is completed.

FIGS. 20A and 20B illustrate a sequence performed in response to a function call made by the client program. It is noted that, although the server program and client program are actually object files in an executable form, they are shown by source codes in FIGS. 20A and 20B for the sake of illustration.

In FIGS. 20A and 20B, for example, in a client thread shown in FIG. 20B (for example, corresponding to the thread 1 shown in FIG. 9 performed by the copy application process 112), the Open function is called by the client program to the server program. In this case, the Open defined in the client stub object is called in a step S2701. Then, during the process of the Open process in the client stub object, a call for the function handler, i.e., the Open_handler to the server program is made in a step S2702 (in the above-mentioned example, corresponding to the call for the job open request function in the step S901 in FIG. 9).

Then, in the server program shown in FIG. 20A, the above-mentioned issue of call for the Open_handler is received. Then, the process entity (in a thread) described in the mounting description part in the Open_handler is executed in a step S2703 (corresponding to the predetermined copy job opening process performed by the ECS process 123). Then, a result of this execution is retuned to the client stab object as the function returned value in a step S2704. Then, in the client program shown in FIG. 20B, the next process is continued to (in the above-mentioned example, the copy application process 112 performs the job operation mode setting function call in the step S902).

It is noted that, although not mentioned in the sequence described above with reference to FIGS. 20A and 20B, the server dispatcher and client dispatcher perform predetermined operation for achieving particular data transfer between the respective threads actually, as described above with reference to FIG. 9, for example.

Thus, according to the stub generator in the second embodiment of the present invention, it is easy to produce the client stub 2107 and server skeleton 2105 as a result of function declaration being described in the message file 2104. Further, as the thus-produced server skeleton 2105 has the mounting description part thereof left as the blank column, a program developer can easily change the process contents/entity as is necessary by rewriting it. Thereby, it is possible to provide a flexibility in the process control system in the composite machine in which the process control system produced by means of the stub generator, and, thus, to provide a various functions in various manners in the composite machine. Furthermore, even in case another firm such as a third vendor takes a charge of development of the client program, as merely function calls for actual process entities to be performed should be described, and, thereby, the required inter-process communications will be achieved automatically in a concealed manner, the person who develops the client program should not understand the details of the internal communications protocols. Accordingly, it is possible to maintain the concealment of the communications protocols of the main manufacturer.

Furthermore, as the inter-process communications are achieved by means of the above-mentioned function call scheme, it is possible to achieve high-speed inter-process communications even in case parallel execution of jobs is achieved by means of threads. Furthermore, as required synchronization between threads can be achieved by means of the function of function returned values, it is not necessary to create a special program for the purpose of inter-thread synchronization. Accordingly, it is possible to effectively reduce the load burdened by the software program development.

A process of actually creating the server skeleton and client stub for a composite machine, such as the above-described composite machine according to the first embodiment of the present invention shown in FIG. 1 will now be described. FIG. 21 illustrates one example of message file of a client process for utilizing the functions of an ECS process such as the ECS process 124 shown in FIG. 1 regarding it as a server process. As shown in the figure, in the message file, message definition 2241 is made for messages of job handling, job execution enable/disable notification (message), job end notification (message), and so forth, and, also, function declaration 2242 is made for functions of job open request, job operation mode setting, job entry request, job start request, job close request, and so forth.

Then, as mentioned above, as the message file is input to the stub generator as shown in FIG. 14, the client stub and server skeleton are generated as shown in FIG. 22, and, also, the header is generated as shown in FIG. 23. As shown in FIG. 22, in the server skeleton SK, the function handlers for job open request 2251, job operation mode setting 2252, job entry request 2253, job start request 2254, job close request, and so forth are described. In the client stub ST, respective function handler calls therefor 2261, 2262, 2263 and 2264 are described. Furthermore, as shown in FIG. 23, in the header, messages for job handling, job execution enable/disable notification (message), job end notification (message), and so forth, are registered.

From the thus-generated client stub, server skeleton and header, the client program and server program are generated, as described above. For example, the client program for the copy application process 112 shown in FIG. 1 is produced, the source file made of the client stub ST such as that shown in FIG. 22 in which function calls for job open request, job operation mode setting request, job entry request, job start request, job close request are described is compiled into the client stub object. Further, as described above, the client program is produced, including linkage with the above-mentioned client stub object, and, then, it is compiled. Thus, the client program for the copy application process 112 is completed.

Thereby, the inter-process communications can be achieved between the copy application process 112 and ECS process 124, as shown in FIG. 9, in which the function calls of job open request, job operation mode setting request, job entry request, job start request, job close request, and so forth are performed. Furthermore, from the ECS process 124 to the copy application process 112, messages, i.e., job execution enable/disable notification (message), job end notification (message), and so forth, are sent in the inter-process communications.

Similarly, as another example of the inter-process communications between control service processes, the source file of an FCS process such as the FCS process 127 shown in FIG. 1 has function calls described therein, i.e., job open request, job operation mode setting request, job entry request, job start request, job close request and so forth, then, linkage with the client program is provided, and, thus, the client program for the FCS process 127 is completed. Thereby, the inter-process communications between the FCS process 127 and ECS process 124 such as those shown in FIG. 11 are achieved in which the function calls are made, i.e., job open request, job operation mode setting request, job entry request, job start request, job close request and so forth.

In case where the server skeleton and client stub are produced for utilizing, by the client process, the functions of an ECS process such as the ECS process 124 shown in FIG. 1 regarding it as the server process will now be described now. Also in this case, similarly to the case where the ECS process is regarded as the server process, the message file has message definition and function declaration described therein. In the case where the FCS process acts as the server process, declaring of function calls, i.e., transmission start request, transmission mode change request and so forth, is described, and, also, message definition for the scan parameter notification (message) and so forth is described.

Then, as mentioned above, as the message file is input to the stub generator, the client stub and server skeleton are generated, and, also, the header is generated. Similarly to the case where the ECS process is regarded as the server process, in the server skeleton, the function handlers for the above-mentioned transmission start request, transmission mode change request, and so forth, the functions of which are declared as mentioned above, are described. In the client stub, respective function handler calls therefor are described. Furthermore, messages for scan parameter notification (message), and so forth, are registered.

From the thus-generated client stub, server skeleton and header, the client program and server program are generated, as described above. For example, the client program for the ECS process is produced for unitizing the functions of the FCS process, the source file made of the client stub-in which function calls for transmission start request, transmission mode change request, and so forth are described is compiled into the client stub object. Further, as described above, the client program is produced, including linkage with the above-mentioned client stub object, and, then, it is compiled. Thus, the client program for the ECS process is completed.

Thereby, the inter-process communications can be achieved between the ECS process and FCS process, in which the function calls of transmission start request, transmission mode change request, and so forth are performed. Furthermore, from the FCS process to the ECS process, messages, i.e., scanner parameter notification (message), and so forth, are sent in the inter-process communications, as shown in FIG. 11.

In case where the server skeleton and client stub are produced for utilizing, by the client process, the functions of an MCS process such as the MCS process 128 shown in FIG. 1 regarding it as the server process will now be described now. Also in this case, similarly to the case where the ECS process is regarded as the server process, the message file has message definition and function declaration described therein. In the case where the FCS process acts as the server process, declaring of function calls, i.e., memory image information request, file generation request, page generation request, page information registration, page open request, page close request, page information request, page deletion request, file information registration, file close request, file open request, file deletion request, work area acquisition request, work area deletion request, divisional reading request, and so forth, is described, and, also, message definition for job end notification and so forth is described.

Then, as mentioned above, as the message file is input to the stub generator, the client stub and server skeleton are generated, and, also, the header is generated. Similarly to the case where the ECS process is regarded as the server process, in the server skeleton, the function handlers for the above-mentioned memory image information request, file generation request, page generation request, page information registration, page open request, page close request, page information request, page deletion request, file information registration, file close request, file open request, file deletion request, work area acquisition request, work area deletion request, divisional reading request and so forth, the functions of which are declared as mentioned above, are described. In the client stub, respective function handler calls therefor are described. Furthermore, messages for job end notification, and so forth, are registered.

From the thus-generated client stub, server skeleton and header, the client program and server program are generated, as described above. For example, in case the ECS process acts as the client process for the MCS process, for example, is produced for unitizing the functions of the MCS process, the source file made of the client stub in which function calls for memory image information request, file generation request, page generation request, page information registration, page open request, page close request, page information request, page deletion request, file information registration, file close request, file open request, file deletion request, work area acquisition request, work area deletion request, divisional reading request, and so forth are described is compiled into the client stub object. Further, as described above, the client program is produced, including linkage with the above-mentioned client stub object, and, then, it is compiled. Thus, the client program for the ECS process is completed.

Thereby, the inter-process communications can be achieved between the ECS process and MCS process in which the function calls for the memory information request and so forth for printer operation such as that shown in FIG. 5 are performed.

In case the scanner application process such as the scanner application process 114 shown in FIG. 1 acts as the client process for the MCS process, the source file made of the client stub in which function calls for memory image information request, file generation request, page generation request, page information registration, page open request, page close request, page information request, page deletion request, file information registration, file close request, file open request, file deletion request, work area acquisition request, work area deletion request, divisional reading request, and so forth are described is compiled into the client stub object. Further, as described above, the client program is produced, including linkage with the above-mentioned client stub object, and, then, it is compiled. Thus, the client program for the scanner application process is completed.

Thereby, the inter-process communications can be achieved between the scanner application process and MCS process in which the function calls for respective requests in scanner operation such as that shown in FIG. 7 are performed.

In another case the ECS process acts as the client process for the MCS process, the source file made of the client stub in which function calls for page generation request, page information registration, page open request, page close request, page information request, and so forth are described is compiled into the client stub object. Further, as described above, the client program is produced, including linkage with the above-mentioned client stub object, and, then, it is compiled. Thus, the client program for the scanner application process is completed.

Thereby, the inter-process communications can be achieved between the ECS process and MCS process in which the function calls for respective requests in scanner operation for a plurality of pages such as that shown in FIG. 7 are performed.

Thus, according to the second embodiment of the present invention, the inter-process communications between the control server processes or between the control service process and application process can be archived by means of the function call scheme. Accordingly, it is possible to achieve high-speed inter-process communications even in case parallel execution of jobs is achieved by starting a plurality of threads.

Furthermore, as proper synchronization between threads can be achieved by management of function returned values, it is not necessary to separately providing a synchronization process program. Thus, it is possible to effectively reduce the program development load.

A third embodiment of the present invention will now be described with reference to FIG. 24. In the third embodiment, as shown in the figure, a plurality of composite machines 3300a and 3300b are connected via a communications network 3340 such as a LAN, and, an application process of one composite machine acts as a client process while control service process of another composite machine acts as a server process, and provide a service to the application process of the first composite machine via the network.

Figure 24:
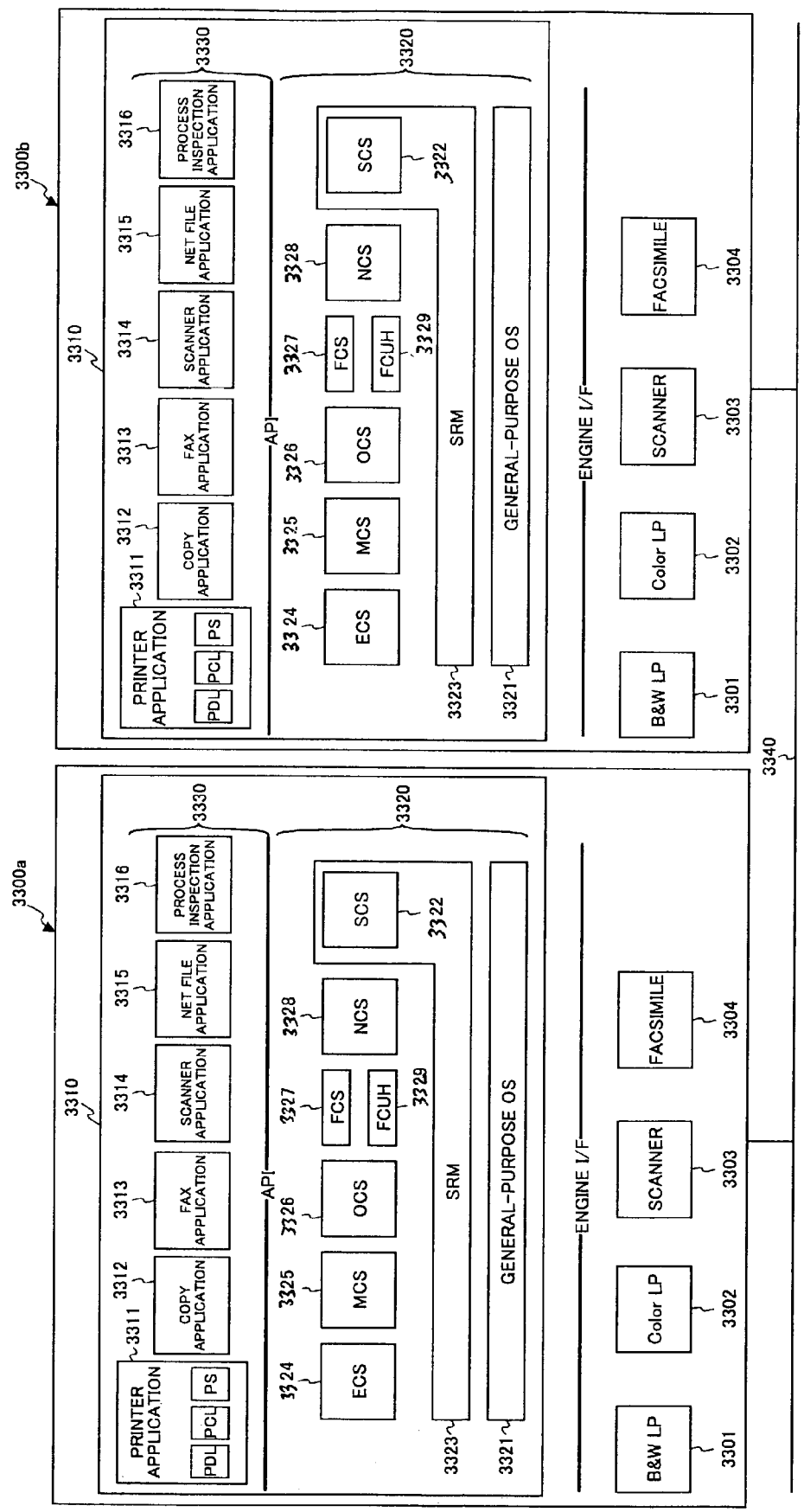
FIG. 24 illustrates a block diagram of composite machines according to a third embodiment of the present invention.

As shown in FIG. 24, each of the composite machines 3300a and 3300b has the same configuration as that of the composite machine in the first embodiment shown in FIG. 1, and duplicated description thereof is omitted. However, in the third embodiment, as mentioned above, via the network 3340, each of the application processes 3311 through 3314, and control service processes 3324, 3325, 3327 and 3328 can act as a client process with respect to each of the control services and SRM 3323 regarding it as a server process, and, also, can act as a client process with respect to each of the control service processes 3324, 3325, 3327 and 3328, which operates in another composite machine connected via the network 3340, regarding it as a server process.

Similarly, each of the control service processes 3324, 3325, 3327 and 3328, and SRM 3323 can act as a server process with respect to each of the application processes 3311 through 3314 and control processes 3324, 3325, 3327 and 3328, and, also, can act as a server process with respect to each of the application processes 3311 through 3314 and control processes 3324, 3325, 3327 and 3328, which operates in another composite machine connected via the network 3340.

For this purpose, the plurality of composite machines connected via the network can perform the inter-process communications between the different composite machines, i.e., function calls and message transfer, as if the respective composite machines are included in a single composite machine. Accordingly, the client dispatcher started in each client process monitors for reception of function returned values and for reception of messages in OUT direction also coming via the network. For this purpose, the format of each function call and the format of each message used in the inter-process communications between the different composite machines should have such as to provide information such as the network address or the like.

Similarly, the server dispatcher started in each server process monitors for reception of function calls and for reception of messages in IN direction even coming via the network. For this purpose, the function handler of each of the control service processes and SRM process should provide information such as the network address or the like so as to send the function returned values/messages to the client process operating in the other composite machine.

Figure 25:
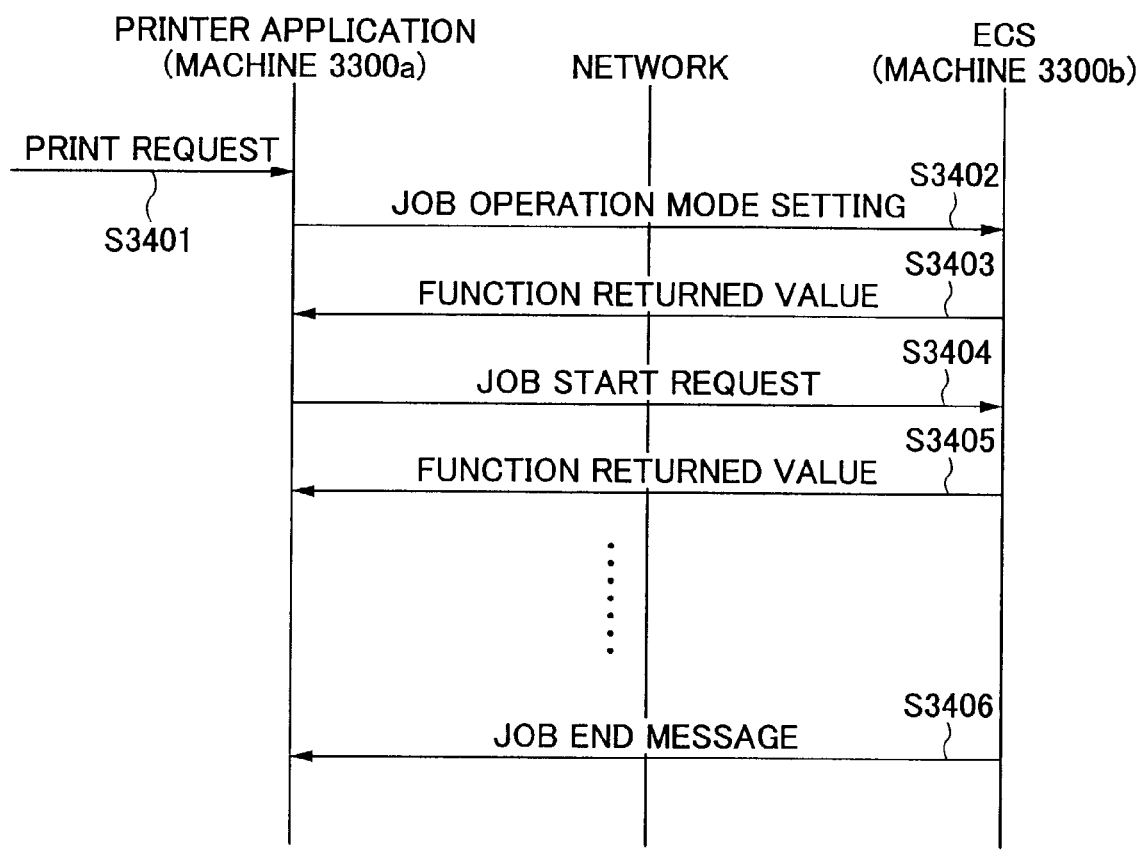
FIG. 25 illustrates a data communications sequence according to the third embodiment of the present invention shown in FIG. 24.

FIG. 25 illustrates data communications sequence for printer operation performed between printer application process 3311 and ECS process 3324 of the different composite machines 3300a and 3300b according to the third embodiment of the present invention.

When the printer application process 3311 in the composite machine 3300a receives a print request in a step S3401, similar to the case in the first embodiment described with reference to FIG. 5, a thread of the printer application process 3311 in the composite machine 3300a performs a job operation mode setting function call and a job start request function call in sequence to the ECS 3324 in the other composite machine 3300b in steps S3402 and S3404. In this case, the printer application process 3311 in the composite machine 3300a uses the network address of the other composite machine 3300b for these function calls.

The server dispatcher in the ECS process 3324 in the other composite machine 3300b receives these function calls via the network 3340, and, by means of respective function handlers, ECS 3324 performs the predetermined operation mode setting process and job start process for the printer job. Then, these handlers send respective function returned values to the first composite machine 3300a via the network 3340 in steps S3403 and S3405.

The client dispatcher in the printer application process 3311 in the first composite machine 3300a receives these returned values via the network 3340, and appropriately processes them as in the first embodiment. After that, the inter-process communications are performed among the ECS process 3324, MCS process 3325 and SRM process 3323 in the same second composite machine 3300b as in the first embodiment. Thereby, the printing process is performed by the composite machine 3300b.

After the printing process is completed in the composite machine 3300b, the ECS process 3324 therein sends the job end notification message to the printer application process 3311 in the first composite machine 3300a via the network 3340 by providing the network address of the composite machine 3300a in a step S3406. The client dispatcher in the printer application process 3311 in the composite machine 3300a receives the job end notification message and thus, the printer operation is finished.

Thus, according to the third embodiment, the inter-process communications are performed between the processes operates in the different composite machines via the network. Thereby, in response to the print request occurring in the composite machine, the actual printing process may be performed by the different composite machine. Accordingly, via the network, various functions are executable in various manners. For example, in case a composite machine having a print request occurring therein is already used by another job, and thereby, cannot directly perform the corresponding printing process, the printer application process in this machine responds to this situation, and thus, performs a process such as switching a destination of the function call from the ECS process of its own to the same of another machine connected via the network. Thus, it is possible to timely respond to the newly occurring request, and, thus, to improve the system usability.

Such inter-process communications between different composite machines can also be achieved for another job than the above-mentioned printer operation, i.e., scanner operation, copy operation, facsimile transmission operation and so forth. Furthermore, not only inter-process communications between application process and control service process in different machines but also inter-process communications between any other processes such as between control service process and SRM process, or the like, may be achieved between different machines.

Further, it is also possible that the inter-process communications are performed between different machines via the NCS. Specifically, the NCS 3328 in one composite machine once receives a function call or a message from any application process, the NCS provides the network address of another composite machine on the same network, and, thereby, sends the function call or message to the NCS operating in the other composite machine. In this configuration, each application process or control service process should not directly perform a process for providing the network address but by means of the NCS, and, thus, the independency in each module is improved. Accordingly, the composite machine's flexibility can be improved.

A fourth embodiment of the present invention will now be described. In the fourth embodiment, in the system configuration same as that in the third embodiment as shown in FIG. 24, a plurality of composite machines 3300a and 3300b are connected via a communications network 3340 such as a LAN, and, an application process of one composite machine acts as a client process while control service process of another composite machine acts as a server process, and provide a service to the application process of the first composite machine via the network.

As shown in FIG. 24, each of the composite machines 3300a and 3300b has the same configuration as that of the composite machine in the first embodiment shown in FIG. 1, and duplicated description thereof is omitted. However, in the fourth embodiment, as mentioned above, via the network 3340, each of the control service processes 3324, 3325, 3327 and 3328 can act as a client process with respect to any other one of the control services and SRM 3323 regarding it as a server process. Also, each of the control services and, also, can act as a client process with respect to each of the control service processes 3324, 3325, 3327 and 3328, which operates in another composite machine connected with the network 3340, regarding it as a server process.

Similarly, each of the control service processes 3324, 3325, 3327 and 3328, and SRM 3323 can act as a server process with respect to any other one of the control processes 3324, 3325, 3327 and 3328, and, also, can act as a server process with respect to each of the control processes 3324, 3325, 3327 and 3328, which operates in another composite machine connected via the network 3340.

For this purpose, the plurality of composite machines connected via the network can perform the inter-process communications between the different composite machines, i.e., function calls and message transfer, as if the respective composite machines are included in a single composite machine. Accordingly, the client dispatcher started in each client process monitors for reception of function returned values and for reception of messages in OUT direction. For this purpose, the format of each function call and the format of each message used in the inter-process communications between the different composite machines should have such as to provide information such as the network address or the like.

Similarly, the server dispatcher started in each server process monitors for reception of function calls and for reception of messages in IN direction. For this purpose, the function handler of each of the control service processes and SRM process should provide information such as the network address or the like so as to send the function returnee values/messages to the client process operating in the other composite machine.

Figure 26:
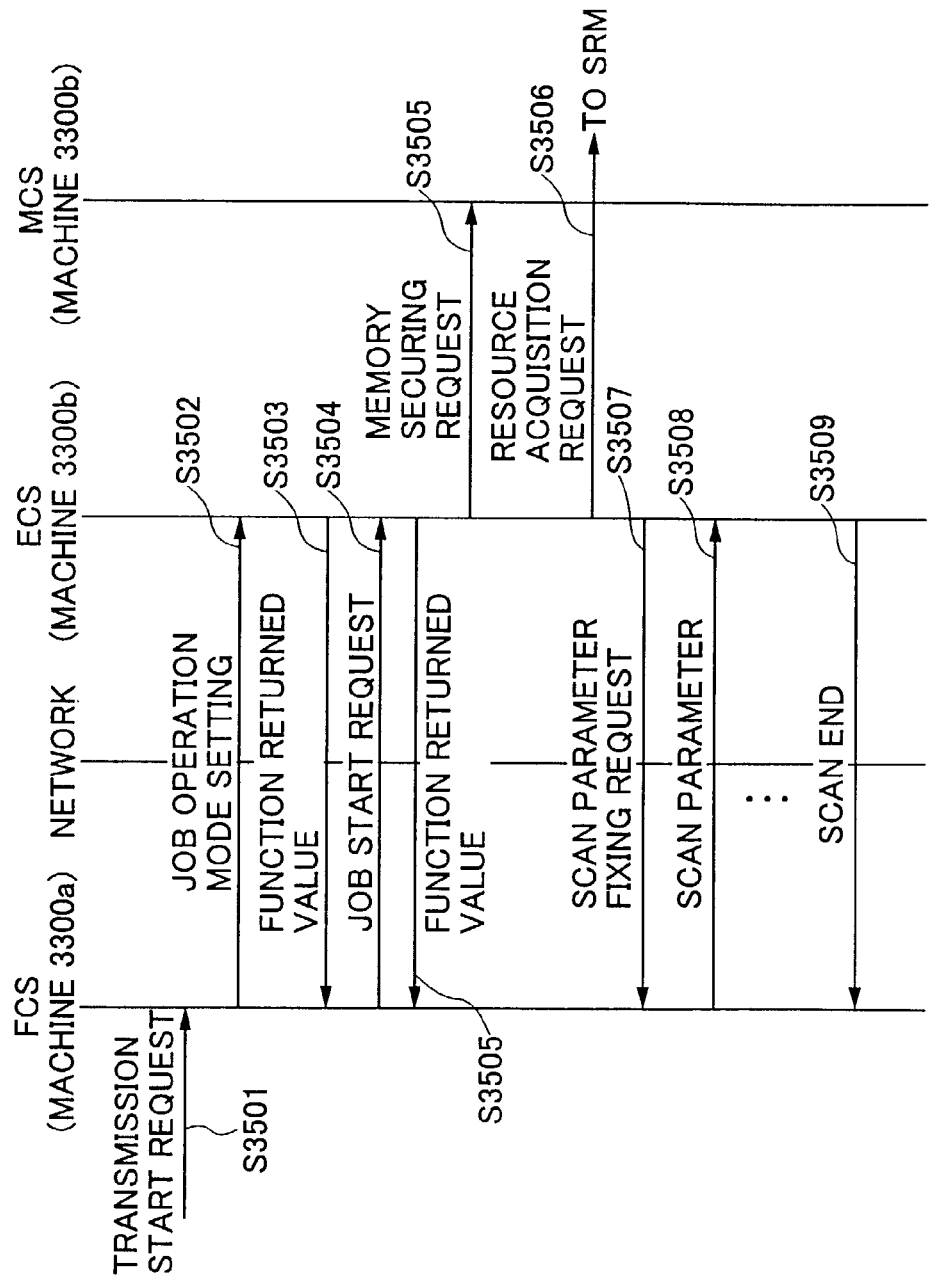
FIG. 26 illustrates a data communications sequence according to a fourth embodiment of the present invention.

FIG. 26 illustrates data communications sequence for printer operation performed between printer FCS 3327, ECS process 3324 and MCS 3325 of the different composite machines 3300a and 3300b according to the fourth embodiment of the present invention.

When the FCS process 3327 in the composite machine 3300a receives a transmission start request from the facsimile application process 3313 in the same machine 3300a in a step S3501, a thread in the FCS process 3327 in the same machine 3300a provides the network address of the other composite machine 3300b, and thereby, sends a job operation mode setting function call and a job start request function call in sequence in a step S3502 and S3504. Thereby, these function calls are sent to the ECS process 3324 in the other composite machine 3300b.

The server dispatcher in the ECS process 3324 of the machine 3300b receives these function calls, and the respective function handlers perform operation mode setting process and job start process for the printer job. Then, they send respective function returned values by providing the network address of the first composite machine 3300a in steps S3503 and S3505. The client dispatcher in the FCS process 3327 in the first composite machine 3300a processes these returned values as in the first embodiment appropriately.

Then, the ECS process 3324 in the machine 3300b sends a memory securing request function call to the MCS process 3325 in the same machine 3300b in a step S3505, and, also, sends a scanner engine resource acquisition request function call to the SRM process 3323 in the same machine 3300b in a step S3506. Thereby, as in the first embodiment, the MCS process 3325 and SRM process 3323 respond to these function calls appropriately.

After thus receiving the function returned value on the scanner engine resource acquisition function, the ECS process 3324 in the machine 3300b sends a scan parameter request message to the FCS process 3327 in the first machine 3300a by providing the network address of the machine 3300a via the network 3340 in a step S3507.

After receiving this message, the FCS process 3327 in the machine 3300a sends a predetermined scan parameter message to the ECS 3324 in the second machine 3300b by providing the network address thereof in a step S3508. The server dispatcher in the ECS process in the machine 3300b receives this message via the network 3340.

The processes performed in the machine 3300b after that are the same as those performed in the first embodiment during the facsimile transmission operation. Thereby, the predetermined facsimile transmission process is performed by the machine 3300b in response to the facsimile transmission start request given in the machine 3300a.

After the facsimile transmission is completed in the machine 3300b, the server dispatcher in the ECS process 3324 in the machine 3300b sends a scan end message to the FCS process 3327 in the machine 3300a by providing the network address thereof in a step S3509. The client dispatcher in the FCS process 3327 in the machine 3300b receives this message and thereby, the facsimile transmission operation is finished.

Thus, according to the fourth embodiment, the inter-process communications are performed between the control service processes operate in the different composite machines via the network. Thereby, in response to the facsimile transmission request occurring in the composite machine, the actual facsimile transmission process may be performed by the different composite machine. Accordingly, via the network, various functions are executable in various manners. For example, in case a composite machine having a facsimile transmission request occurring therein has its own facsimile engine being already used in another job and thus not be able to be used for the present job, the FCS process in this machine responds to this situation, and thus, performs a process such as switching a destination of the function call from the ECS process of its own to the same of another machine connected via the network. Thus, it is possible to timely respond to the newly occurring request, and, thus, to improve the usability.

Such inter-process communications between different composite machines can also be achieved for another job than the above-mentioned facsimile transmission operation, i.e., scanner operation, copy operation, print operation and so forth. Furthermore, not only inter-process communications between control service processes of ECS process and FCS process in different machines but also inter-process communications between any other control processes can be performed in different machines in the same manner.

Further, it is also possible that the inter-process communications are performed between different machines via the NCS. Specifically, the NCS 3328 in one composite machine once receives a function call or a message from any control service process, the NCS provides the network address of another composite machine on the same network, and, thereby, sends the function call or message to the NCS in the other composite machine. In this configuration, each application process or control service process should not directly perform a process for providing the network address, and, thus, the independency in each module is improved. Accordingly, the composite machine's flexibility can be improved.

Further, in each of the above-mentioned embodiments, specific functions/messages may not be limited to those described above, but any other functions/messages may be used by defining them.

Figure 27:
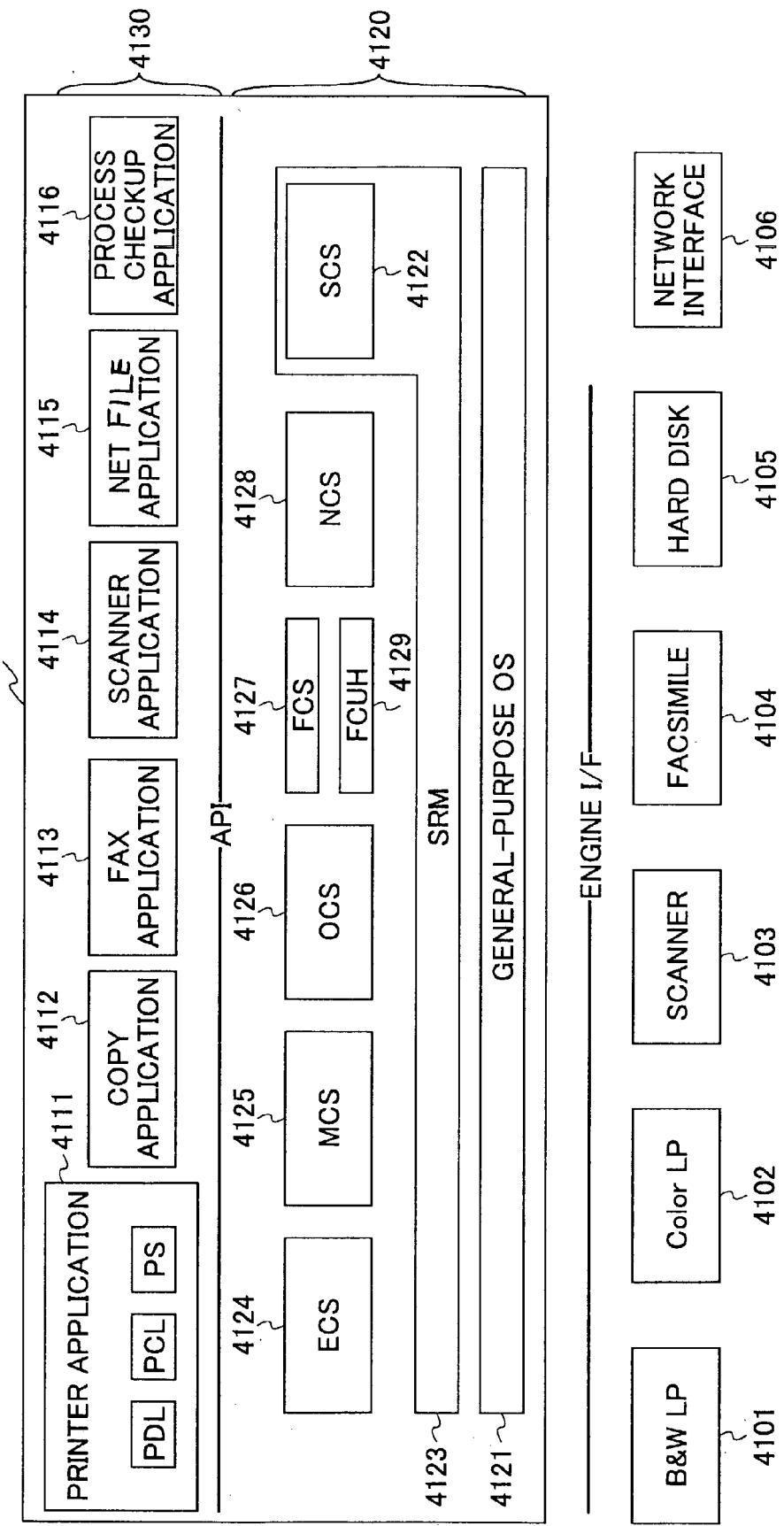
FIG. 27 shows a block diagram of a composite machine according to a fifth embodiment of the present invention.

A fifth embodiment of the present invention will now be described. FIG. 27 is a block diagram to show a configuration of an image forming apparatus (refereed to as a composite machine, hereinafter) in the fifth embodiment of the present invention. As shown in FIG. 27, the composite machine has hardware resources such as monochrome line printer 4101, a collar line printer 4102, a scanner 4103 and a facsimile machine 4104, a hard disk drive 4105, a network interface 4106, and a software configuration group 4110 including a platform 4120 and applications 4130.

The platform 4120 includes controls services each of which interprets an processing request from an application, and generates an acquisition request for a hardware resource; a system resource manager (SRM) 4123 which manages one or a plurality of hardware resources, and performs arbitration of the acquisition requests given by the control services; and a general-purpose OS 4121.

The control services include a plurality of service modules, and include an SCS (system control service) 4122, an ECS (engine control service) 4124, an MCS (memory control service) 4125, an OCS (operation panel control service) 4126, an FCS (facsimile control service) 4127, and an NCS (network control service) 4128. In addition, the platform 4120 includes an API (application program interface) which enables reception of processing requests from the applications 4130 by means of previously defined functions.

The general-purpose OS 4121 is a general-purpose operating system of UNIX, and performs parallel execution of respective sets of software of the applications 4130 regarding them as processes.

The SRM 4123 performs control of the system and management of the resources in cooperation with the SCS 4122, performs arbitration according to requests from an upper layer which uses hardware resources such as engines such as a scanner part and a printer part, a memory, a HDD file, a host I/O (centronics I/F, network I/F, IEEE1394 I/F, RS232C I/F, and so forth), and so forth.

Specifically, the SRM 4123 determines whether or not a requested hardware recourse can be use now (not used by another request), and, sends information to the upper layer when it can be used now. Further, in response to a request from the upper layer, the SRM 4123 produces a usage scheduling for hardware resources, and, according thereto, executes directly requested tasks (for example, paper transportation operation, image formation operation, memory acquisition operation, file generation operation and so forth by the printer engine, file generation).

The SCS 4122 performs application management, operation device control, system data display, LED display, resource management, and interrupt application control. The ECS 124 controls engines of hardware resources, i.e., the monochrome line printer (B & W LP) 4101; color line printer (Color LP) 4102, scanner 4103, and facsimile machine 4104.

The MCS 4125 performs acquisition/release of image memory, usage of the hard disk drive (HDD), compressing/decompressing of image data, and so forth. The OCS 4126 is a module controlling a control panel by which information is communicated between an operator of the image forming apparatus and the main frame control unit.

The FCS 4127 provides API from each application layer of a system controller to perform facsimile transmission/reception operation by means of PSTN/ISDN network, registration of/reference to various sets of facsimile data managed in a BKM (backup SRAM), facsimile reading operation, facsimile reception printing operation, composite transmission/reception operation, and so forth. In the FCS 4127, an FCU handler 4129 that is a sub-process (FCUH) is started. This FCUH 4129 controls a device driver of the facsimile engine in a case of facsimile transmission/reception by an instruction from the FCS 4127.

The NCS 4128 includes a group of modules providing services which can be in common used by each application which needs the network I/O, performs distribution of various data received from the network through respective protocols into corresponding applications, and performs intermediate processing for transmission of data into the network.

The applications 4130 include a printer application 4111 for the printers applying page description language (PDL), PCL and Post Script (PS), a copy application 4112 for copying operation, a facsimile application 4113 for facsimile transmission/reception operation, a scanner application 4114 for scanning operation, a net file application 4115 for a network file, and a process checkup application 4116 for process checkup.

Each of these respective control services, SRM 4123 and respective applications is an object having one or a plurality of methods, and, by starting the object, which then operates on the general-purpose OS 4121 as the respective process. In each process, a plurality of threads are started, under control of the general-purpose OS, CPU occupation times of these threads are switched, and thereby, parallel execution thereof is achieved. Thus, in comparison to a case where another parallel execution scheme in which processes are switched so that the parallel execution is achieved, the processing speed in parallel execution can be improved.

Figure 28:
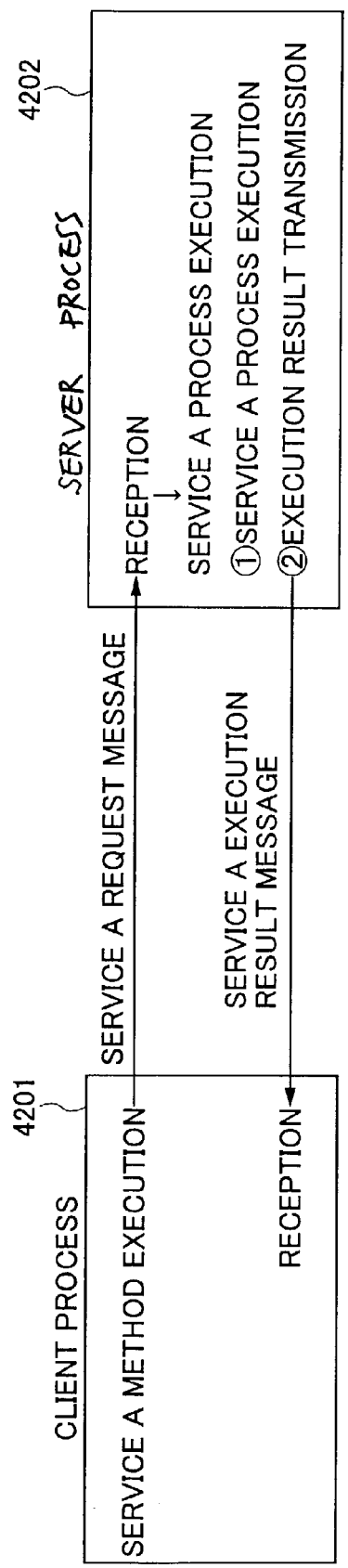
FIG. 28 shows a block diagram illustrating a relationship between the client process and server process according to the composite machine shown in FIG. 27.

These application processes and control service processes transfer messages therebetween through the inter-process communications achieved by means of execution of methods. FIG. 28 illustrates a relationship between a server process 4202 and a client process 4201 both operate in the composite machine shown in FIG. 27. The server process 4202 means a process which provide a service to the client process 4201 in response to a request therefor. The client process 201 is a process which has a service provided by the server by sending a request therefor to the server process.

In the above-described composite machine in the fifth embodiment of the present invention shown in FIG. 27, each of the application processes of the above-mentioned copy application 4112, printer application 4111, scanner application 4114, facsimile application 4113 and so forth, processes of control services such as ECS 4124, MCS 4125, FCS 4127, NCS 4128 and so forth acts as the above-mentioned client process. On the other hand, also each of the processes of these control services and a process of the SRM 4123 acts as the above-mentioned server process 4202. In other words, the process of the application acts as the client process 4201 when each application has a service provided by the respective control service, while the control service acts as the server process 4202.

In addition, in case requesting and providing are performed between these control services, the control service requesting a provision of a service acts as the client process, while the control service having the request given and providing the service in response thereto acts as the server process 4202. Similarly, the process of any application, the process of any control service, and SRM process may act as either the server process 4202 or the client process 4201. Thus, in case any of these process requests another to provide a service, the former one acts as the client process while the latter one acts as the server process.

Each of the processes of the applications, control services and SRM 4123 has a plurality of threads operate therein. As each process has the plurality of threads which can operate independently from each other, the process can act as the client process when it requests one process to provide a service for one thread, while, at the same time, the same process can act as the server process when it has a request to provide a service from a process for another thread. Similarly, each process can act simultaneously as server processes serving a plurality of processes as client processes, while it can act simultaneously as client processes having services provided by a plurality of server processes.

Further, as shown in FIG. 28, the client process 4201 executes a method of transmitting a service request message from a thread therein in order to request the server process 4202 to provide a service. The server process 4202 receiving this message executes a service execution method. This method is a method of executing the service requested by the client process 4201, and, then, sending the execution result in a form of an execution result message to the client process 4201.

In the example shown in FIG. 27, in order to receive a service A, the client process 4201 performs a service A request method, and sends a server A request message to the server process 4202. Then, the server process 4202 receives this message, and executes a service A execution method. By the execution of this service A execution method, ① process of service A is executed, and, then, ② the execution result of the service A is sent as a service A execution result message to the client process 4201. Thus, the inter-process communications between the client process 4201 and server process 4202 are achieved by the series of processes of transmission of service request message through method execution, and service provision and execution result transmission also through method execution.

Methods defined in each of the objects of the above-mentioned application processes and control service processes are listed below:

Printer Application Process:

Methods:
  Job operation mode setting request;
  Job start request;

Copy Application Process:

Method:
  Job open request;
  Job operation mode setting request;
  Job start request;

Facsimile Application Process:

Method:
  Transmission start request;
  Transmission mode change request;

Scanner Application Process:

Method:
  Job open request;
  File generation request;
  Job operation mode setting request;
  File open request;
  File close request;

ECS:

Method:
  Memory image information acquisition request:
  Memory securing request;
  Resource acquisition request;
  Job operation mode setting;
  Job start;
  Job open;
  Job close;

MCS:

Method:
  Memory securing request;
  Memory image information acquisition request:
  File generation;
  File open;
  File close;

FCS:

Method:
  Job operation mode setting request;
  Job start request;
  Scan parameter fixing;
  Next page information setting request;

SRM:

Method:
  Scan feed-in process execution request;
  Feed-in start request;
  Feed-in end request;
  Stamp execution request;
  Memory acquisition;
  Resource acquisition;

As shown above, for each object, generally, a request method for sending a service request message in order to require the server process 4202 to provide a service in case of acting the client process; and also, a service execution method for operating as the server process 4202 in response to reception of the service request message from the client process 4201, and then, sending the execution result message to the requiring client process are defined.

For example, for the object of the ECS process 4124, as the request methods, memory image information acquisition request method, memory securing request method, resource acquisition request method and so forth are registered. On the other hand, as the service execution methods, job operation mode setting method, job start method, job open method, job close method and so forth are registered. These job operation mode setting method, job start method, job open method, job close method are executed in response to reception from the client process the job operation mode setting request message, job start request method, job open request method, and job close request method, respectively.

For the object of printer application process 4111, as the request methods, job operation setting method, job start request method, and so forth are registered. Furthermore, for objects other than those shown above, i.e., those of the other control service processes, SRM 4123, and other application processes, the request methods and service execution methods are registered similarly.

Figure 29:
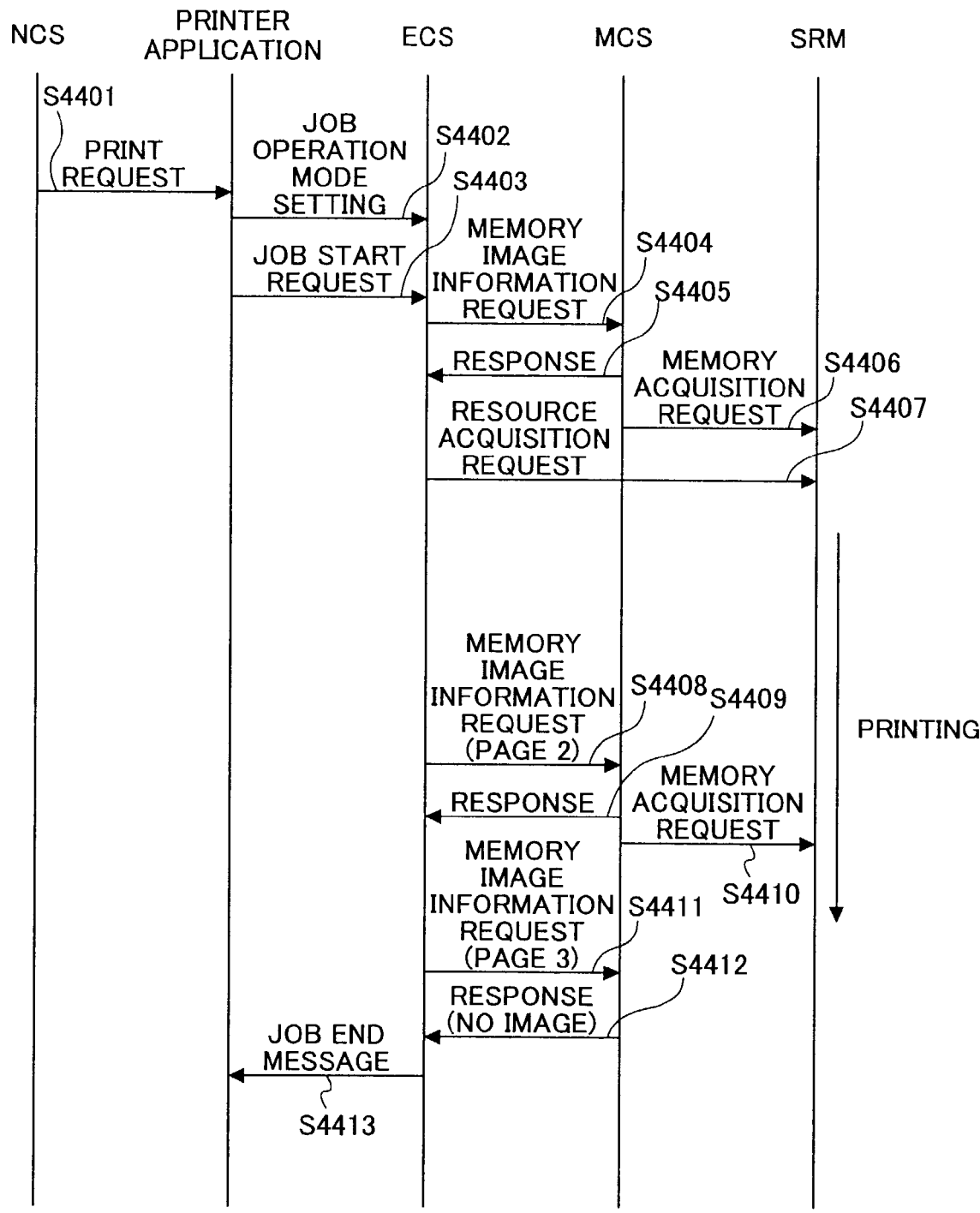
FIG. 29 shows a data communications sequence in printing operation performed in the composite machine shown in FIG. 27.

The above-mentioned inter-process communications in scanner operation, copy operation and facsimile operation actually performed in the composite machine according to the fifth embodiment of the present invention will now be described specifically. At first, the infer-process communications on the printer application 4111, ECS 4124, MCS 4125, and SRM 4123 in the printer operation will now be described. FIG. 29 illustrates data communications sequence between respective process of the printer application 4111, ECS 4124, MCS 4125, and SRM 4123 performed when the printer operation is done in the composite machine according to the fifth embodiment of the present invention.

The printer application process 4111, ECS process 4124, MCS process 4125 and SRM process 4123 operate in the composite machine, and these processes are generated at the starting of the composite machine. Although only processes used in the printer operation are shown, actually other application processes and other control service processes are also generated at the starting of the composite machine.

The printer application process 4111 is started at the starting of the composite machine, and, a plurality of threads start in this process. The printer application process 4111 acts as a server process with respect to the ECS process 4124 regarding as the client process. In the printer operation, the ECS process 4124 acts as the server process with respect to the printer application process 4111 regarding as the client process, and also, it acts as a client process with respect to the MCS process 4125 and SRM process 4123 regarding as server processes, respectively.

The MCS process 4125 acts as a server process with respect to the ECS process 4124 regarding as a client in the printer operation, and also, it acts as a client process with respect to the SRM process 4123 regarding as a server process.

In the printer operation, the SRM process 4123 acts as a server process with respect to the ESC process 4124 or MCS process 4125 regarding as a client process.

As shown in FIG. 29, when a print request is given by a host such as a PC via the centronics I/F, USB I/F, network I/F, or the like, this print request is received by the NCS process, and is transferred to the printer application process in a step S4401. The printer application process generates a new print job in response thereto, and performs a job operation mode setting request method, and sends a job operation mode setting message to the ESC process 4124 in a step S4402. The above-mentioned job operation mode is a mode including a group of parameters required for operating the scanner, plotter, finisher and so forth, and defining job operation conditions generated according to printer conditions such as printing paper size, printing number of pages, a paper feeding tray number, and so forth.

In the ECS process 4124, the job operation mode setting request message is received from the printer application process, and a job operation mode setting method is executed thereby. Then, the above-mentioned job operation mode is set on the printer job, and then, the execution result message thereof is sent to the printer application process 111.

The printer application process 111 receives the execution result message from the ECS process 124, and, in order to make a job starting request, it executes a job start request method and sends a job start request message to the ECS process 4124 in a step S4403.

In the ECS process 4124, the job start request message from the printer application process is received, a job start request execution method is started, and the execution result message thereof is sent to the printer application process 4111. The printer application process 4111 thus receives the execution result message from the ECS process 4124.

Then, the ECS process 4124 executes a memory image information request method and transmits a memory image information request message to the MCS process 4125 so as to obtain printing data stored in the memory in a step S4404. The MCS process 4124 receives the memory image information request message from the ECS process 4124, and then starts a memory image information method. Then, by execution of the memory image information method, the image data stored in the memory is obtained, and the image data is sent to the ECS process 4124 in a step S4405. The ECS process 4124 receives the image data from the MCS process 4125. The processes of transmission of the memory image information request message and reception of the image data in response thereto are repeated until the printing page is completely processed in steps S4408 and S4409.

On the other hand, in the MCS process 4125, after transmission of the image data to the ECS process 4124, a memory acquisition request method is executed, and a memory acquisition request message is sent to the SRM process so as secure the image memory in a step S4406. The SRM process 4123 receives the memory acquisition request message from the MCS process 4125, thus starts execution of a memory acquisition method, acquires through the execution of the memory acquisition method the image memory for the printing operation, and then, transmits the execution result message to the MCS process 4125. The MCS process 125 receives the execution result message.

The ECS process 4124, after receiving the printing data for the first page from the MCS process 4125, executes the resource acquisition request method, and sends a resource acquisition request message to the SRM process so as to acquire the printer engine resource in a step S4407. The SRM process 4123 receives the resource acquisition request message from the ECS process 4124, starts execution of the resource acquisition method, secures by means of the execution of the resource acquisition method the printer engine, and then transmits the execution result message to the ECS process 4124. The ECS process 4124 receives this message.

When the ECS process 4124 receives in a step S4412 a reply of 'no image' as a message in response to the memory image information request message in a step S4411, it determines that printing of all the printing data has been completed, and thus transmits a job end message to the printer application process 4111 in a step S4413. The printer application process receives this message, and, thus, the printing is finished.

Figure 30:
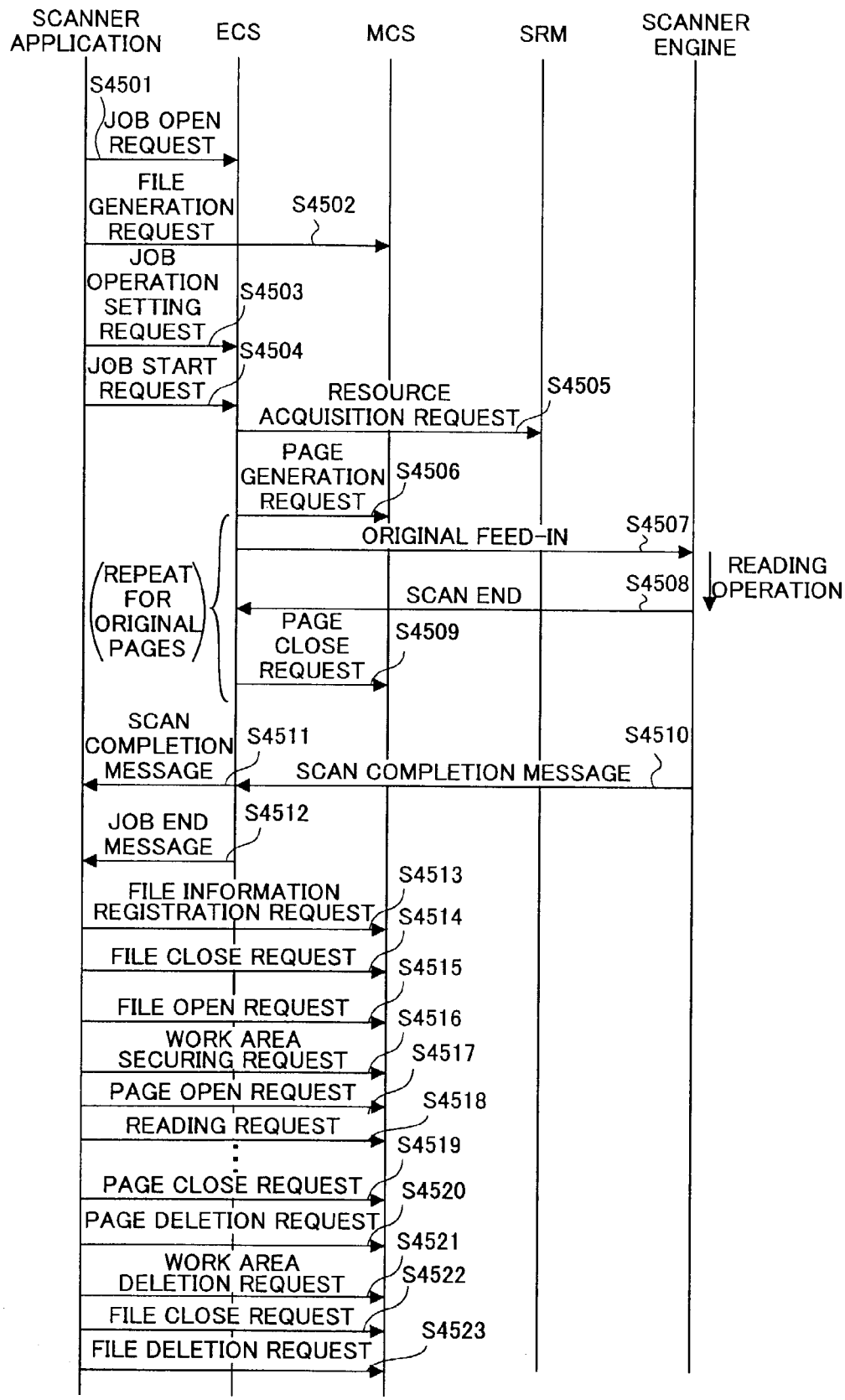
FIG. 30 shows a data communications sequence in scanner operation performed in the composite machine shown in FIG. 27.

Concerning the scanner operation performed in the composite machine in the fifth embodiment of the present invention, the inter-process communications performed among the scanner application process, ECS process MCS process and SRM process will now be described. FIG. 30 illustrates data sequence performed in the composite machine when the scanner operation is performed between the respective processes of the scanner application, ECS, MCS and SRM.

In the composite machine, the scanner application process 4114, ECS process 4124, MCS process 4125 and SRM process 4123 operate, and these processes are generated at a time the composite machine is started. Although only the processes used in the scanner operation are shown, other application processes/control service processes may also be generated at the time of starting of the composite machine.

The scanner application process 4114 is started at the time of starting of the composite machine, and, a plurality of threads operate in the process. The scanner application process 4114 acts as a client process with respect to the ECS process 4124 regarding it as a server process.

The ECS process 4124 acts as a server process with respect to the scanner application process 4114 regarding it as a client process at a time of scanner operation. Also, it acts as a client process with respect to the MCS process 4125 and SRM process 4124 regarding them as server processes, respectively.

The MCS process 4125 acts as a server process with respect to the scanner application process 4114 and ECS process 4124 regarding it as a client processes, respectively, during the scanner operation.

Then SRM process 4123 acts as a server process with respect to the ECS process 4124 regarding as a client process.

As shown in FIG. 30, when a scan request is given to the scanner application process 4114, the scanner application process 114 generates a new scanner job, and, executes a job open request method in a step S4501 and sends a job open request message to the ECS process 4124. Further, the scanner application process, simultaneously, executes a file generation request method in a step S4502 and sends a file generation request message to the MCS process 4125.

The ECS process 4124 receives the job open request message from the scanner application process 4114, and starts execution of the job open method. Then, the execution of the job open method opens the job, and, then, sends the execution result message to the scanner application process 4114.

On the other hand, the MCS process 4125 receives the file generation request message from the scanner application process 4114, and, through execution of the file generation method, generates a file for temporarily storing scanned image data in the hard disk. Then, the MCS process 125 sends the execution result message to the scanner application process 4114.

The scanner application process 4114 receives the execution result message responding to the job open request message from the ECS process 4124, and, also, receives the execution result message responding to the file generation request message, simultaneously. Then, the scanner application process 4114, in order to set a job operation mode, executes a job operation mode request method and sends a job operation mode request message to the ECS 4124 in a step S4503.

The ECS process 4124, receiving the job operation mode setting request message from the scanner application process, sets, by means of execution of a job operation mode setting method, the above-described job operation mode on the scanner job. Then it sends the execution result message to the scanner application process 4114.

The scanner application process 4114 receives this message, executes a job start request method and sends a job start request message to the ECS process 4124 in a step S4504. The ECS process 4124 receives this message, executes a predetermined job start process by means of execution of the job start method, and sends the execution result message to the scanner application process 4114. The scanner application process 4114 receives this message.

At this time, the ECS process 4124, in order to acquire the resource of scanner engine, executes the resource acquisition request method and sends a resource acquisition request message to the SRM process 4123, in a step S4505. In parallel, the ECS process 4124, in order to secure a memory area for storing a scanned image for each page, executes the page generation request method in a step S4506, and sends a page generation request message to the MCS process.

The SRM process 4123 receives the resource acquisition request message, and thus, executes the resource acquisition method so as to acquire the scanner engine, and then, sends the execution result message to the ECS process 4124. The MCS process 4125 receives the page generation request message, and executes the page generation method so as to secure a memory area for one page, open the page, and then, sends the execution result message to the ECS process 4124.

The ECS process 4124 receives these respective execution result messages on the page generation request message and resource acquisition request message. Thus, the ECS process 4124 transmits an original feed-in instruction message to the scanner engine in a step S4507, and, thereby, reading of the original document by the scanner is started. After a page of original document is thus read, the scanner engine sends a scan completion message to the ECS process 4124, in a step S4508. The ECS process receives this message, executes a page close request method, and sends a page close request message to the MCS process 4124 in a step S4509.

The MCS process 4125, receiving the page close request message, executes the page close method so as to close the page of image opened on the memory, and sends the execution result message to the ECS process 4124.

The ECS process 4124 receives this message. Then, the ECS process 4124 repeats the above-described processes in the steps S4506 through S4509 from the page generation request method execution through the page close request method execution. When the scan of the final page of the original document is finished, the ECS process 4124 has a scan process completion message sent from the scanner engine in a step S4510. Accordingly, the ECS process 4124 transfers this scan completion message to the scanner application process 4114 in a step S4511, and also, sends a job end message thereto in a step S4512.

The scanner application process 4114 receives the scan completion message and job end message from the ECS process 4124. On the other hand, the scanner application process 4114 executes the file information registration request method and sends a file information registration request message to the MCS process 4125 in a step S4513.

The MCS process 4125, receives the file information registration request message, executes the file information registration method for the temporarily generated file storing all the scanned image, file information such as a file name, storage address, and so forth, and sends the execution result message to the scanner application process.

When receiving this message, the scanner application process 4114 executes the file close request method and sends a file close request message to the MCS process 4125 in a step S4514. The MCS process 4125 receives this file close request message, and executes the file close method so as to close the file of the scanned image, and sends the execution result message to the scanner application process 4114. By receiving this message, the scanner application process 4114 finishes the present scan process.

Then, the scanner application process 4114 performs the following process so as to read out the thus-stored scanned image. First, it executes the file open request method so as to send a file open request message for opening the file of the scanned image, the work area securing request method so as to sends the corresponding message for securing a work area, and executes the page open request method so as to send the corresponding message to the MCS process 4125, in sequence in steps S4515 through S4517.

The MCS process 4125 receives the above-mentioned file open request message, work area securing request message and page open request message in sequence, and executes the respective execution methods to perform a scanned image file opening process, a work area securing process, and a page opening process, thus returning the relevant execution result messages to the scanner application process. The scanner application process then receives these execution result messages in sequence.

The scanner application process 4114 executes a reading request method and sends the corresponding message for reading the image data from the scanned image file in a step S4518. Then, the scanner application process executes a page close request method and sends the corresponding request message to the MCS process in a step S4519.

The MCS process 4125, after the page opening process is finished, with reception of the reading request message from the scanner application process 4114, executes the reading method so as to read image data from the scanned image file, and sends the execution result message to the scanner application process together with the read image data. The scanner application process 4114 receives the execution result message on the reading request message, executes the next request method, and then, receives the execution result message in the same manner.

The MCS process 4125, after the last reading request process is finished, executes the page close method in response to the request message, so as to close the opened page data, thus returning the execution result message to the scanner application process. Thereby, the scanner application process 4114 executes a page deleting request method, a work area deleting request method, a file close request method, and a file deleting request method, so as to send the respective request messages, in sequence in steps S4520 through S4523. By receiving these request messages, the MCS 4125 executes the respective execution methods so as to perform a page data deletion process, a work area deletion process, a scanned image file closing process, a scanned image file deletion process, respectively, and returns the respective execution result messages to the scanner application process 4114. The scanner application process 4114 receives these execution result messages, and thus, finishes the scanned image reading process.

Copy operation performed in the composite machine in the fifth embodiment of the present invention will now be described with reference to FIG. 31.

Figure 31:
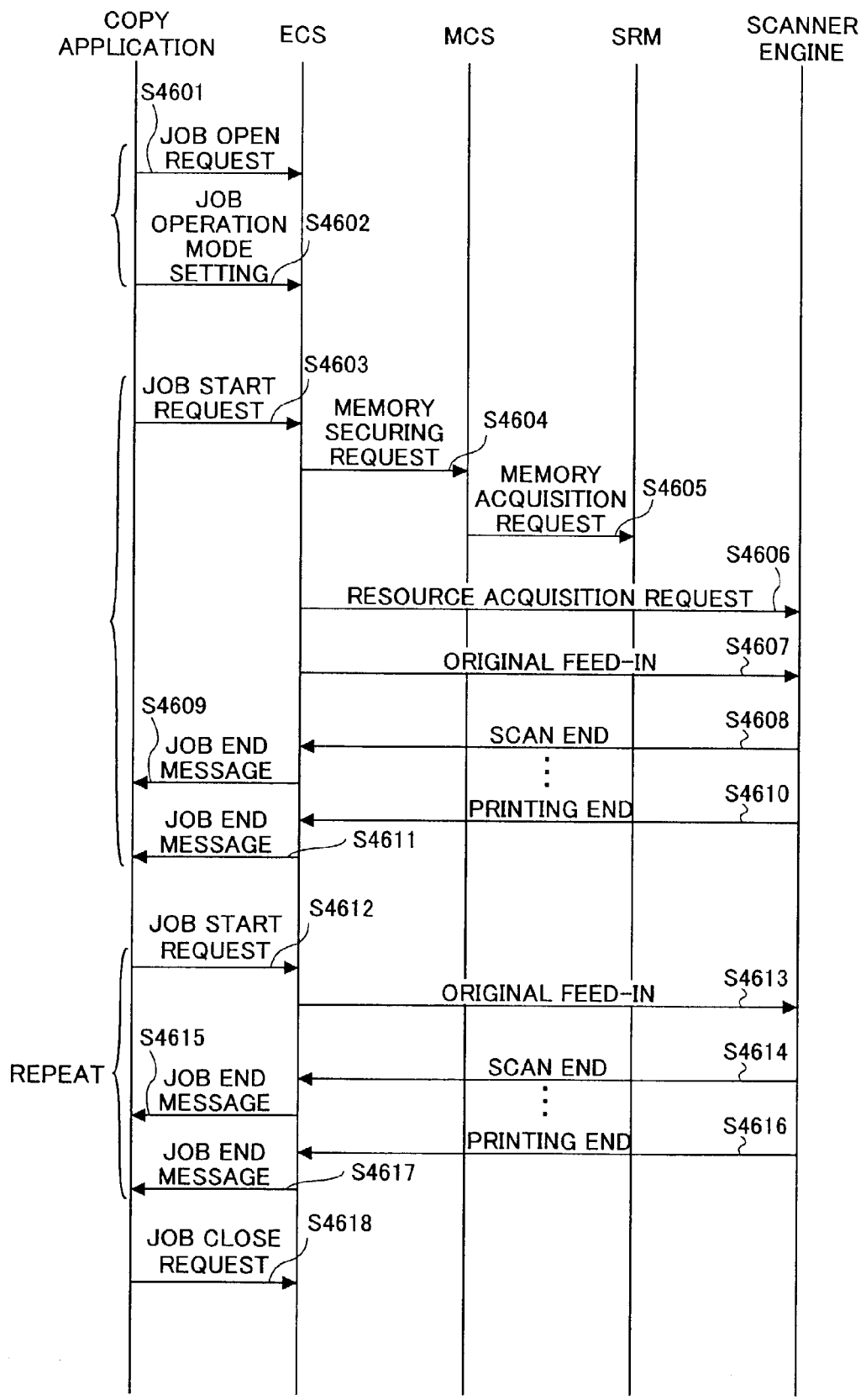
FIG. 31 shows a data communications sequence in copy operation performed in the composite machine shown in FIG. 27.

As shown in FIG. 31, the copy application process 4112, ECS process 4124, MCS process 4125 and SRM process 4123 operate, and are generated at a time of starting of the composite machine. Although FIG. 31 shows only processes used in the copy operation, other application processes and control service processes may also operate and started at the time of starting of the composite machine, actually, there.

In the copy application process 4112, the copy application process 4112 acts as a client process with respect to the ECS process 4124 regarding it as a server process.

The ECS process 4124 acts as a server process with respect to the copy application process 4112 regarding as a client process, and also, acts as a client process with respect to each of the MCS process 4125 and SRM process 4123 regarding as a server process.

The MCS process 4125 acts as a server process with respect to the ECS process 4124 regarding as a client process during the copy operation, and, also, acts as a client process with respect to the SRM process regarding as a server process.

The SRM process 4123 acts as a server process with respect to each of the ECS process and MCS process regarding it as a client process.

The copy application process 4112 executes a series of methods such as a job open request method, a job operation mode, setting method and a job close request method; and a file close request method.

The ECS process executes a memory securing request method, a resource acquisition request method, and an original feed-in method.

The MCS process executes a memory acquisition request method.

However, such methods are only for example, and, may be determined in another way for each particular program.

As shown in FIG. 31, when a copy request is given, the copy application process 4112 generates a new job, and executes the job open request method so as to issue the corresponding job open request message in a step S4601.

The ECS process 4124 receives this job open request message from the copy application process 4112, and thereby, executes the job open method so as to open the copy job, and then, sends the execution result message to the copy application process 4112.

The copy application process 4112 receives this message and executes the job operation setting request method and issues the job operation setting request message to the ECS process 4124 in a step S4602. On the other hand, it executes the job start request method and issues the job start request message to the ECS process 4124 in a step S4603. The ECS process 4124 receives this job operating mode setting request message from the copy application process 4112 and executes the job operation mode setting method so as to set the above-described operation mode on the copy job, and sends the execution result message to the copy application process 4112. On the other hand, it also receives the job start request message, and executes the job start method so as to perform a predetermined job start process, and sends the execution result message to the copy application process 4112.

The copy application process 4112 receives these execution result messages in response to the job operation mode setting request message and job start request message from the ECS process 4124.

The ECS process 4124 then executes a memory securing request method in a step S4604 and issues the memory securing request message indicating a required memory size to the MCS process 4125 so as to secure the memory to store a scanned image. In parallel, it executes a resource acquisition request method and issues the resource acquisition request message in a step S4606 for acquiring the resources of scanner engine and printer engine to the SRM process 4123.

After receiving the memory securing request message, the MCS process 4125 executes the memory securing method so as to secure the required size of area in the memory, and sends the execution result message to the ECS process 4124. On the other hand, SRM process 4123 receiving the resource acquisition request message, thus executes the resource acquisition method so as to acquire the scanner engine and printer engine, and sends the execution result message to the ECS process 4124.

The ECS process 4124 receives the execution result message in response to the memory securing request message from the MCS process 4125 and also receives the execution result message in response to the resource acquisition request message from the SRM process 4123. As the ECS process 4124 thus acquires the printer engine and scanner engine on the copy job, performs a predetermined original feed-in process on the scanner engine in a step S4607, and, thus, an original scanning process in the copy operation starts.

When finishing the original scanning process, the scanner engine sends a scanning end message to the ECS process 4124 in a step S4608, and the printer engine starts printing of the scanned image. Then, after finishing the printing of the scanned image, the printer engine sends a printing end message to the ECS process 4124 in a step S4610.

When the ECS process 4124 receives the scanning end message, it sends a job end message indicating the scanning end to the copy application process 4112, in a step S4609. Similarly, when it receives the printing end message from the printer engine, it sends the job end message indicating printing end to the copy application process 4112 in a step S4611.

The copy application process 4112 receives these two kinds of job end messages, and thus, issues the respective job end messages. Thereby, copy process on one page of the original is finished.

In case a plurality of pages of original are copied, the ECS process 4124 further executes the job start request method in a step S4612, and, thereby, the ECS process 4124, MCS process 4125, SRM process 4123, scanner engine and printer engine perform processes the same as those described above in steps S4613 through S4616. After all the pages of original are copied, and the last job end message is received by the copy application process 4112 in a step S4617, the copy application process executes the job close request method and issues the job close request message to the ECS process 4124 in a step S4618.

The ECS process 4124 receives this job close request message, and executes the job close method so as to close the opened copy job, and sends the execution result message to the copy application process 4112. The copy application process 4112 receives this message, and thus, the copy operation finishes.

Figure 32:
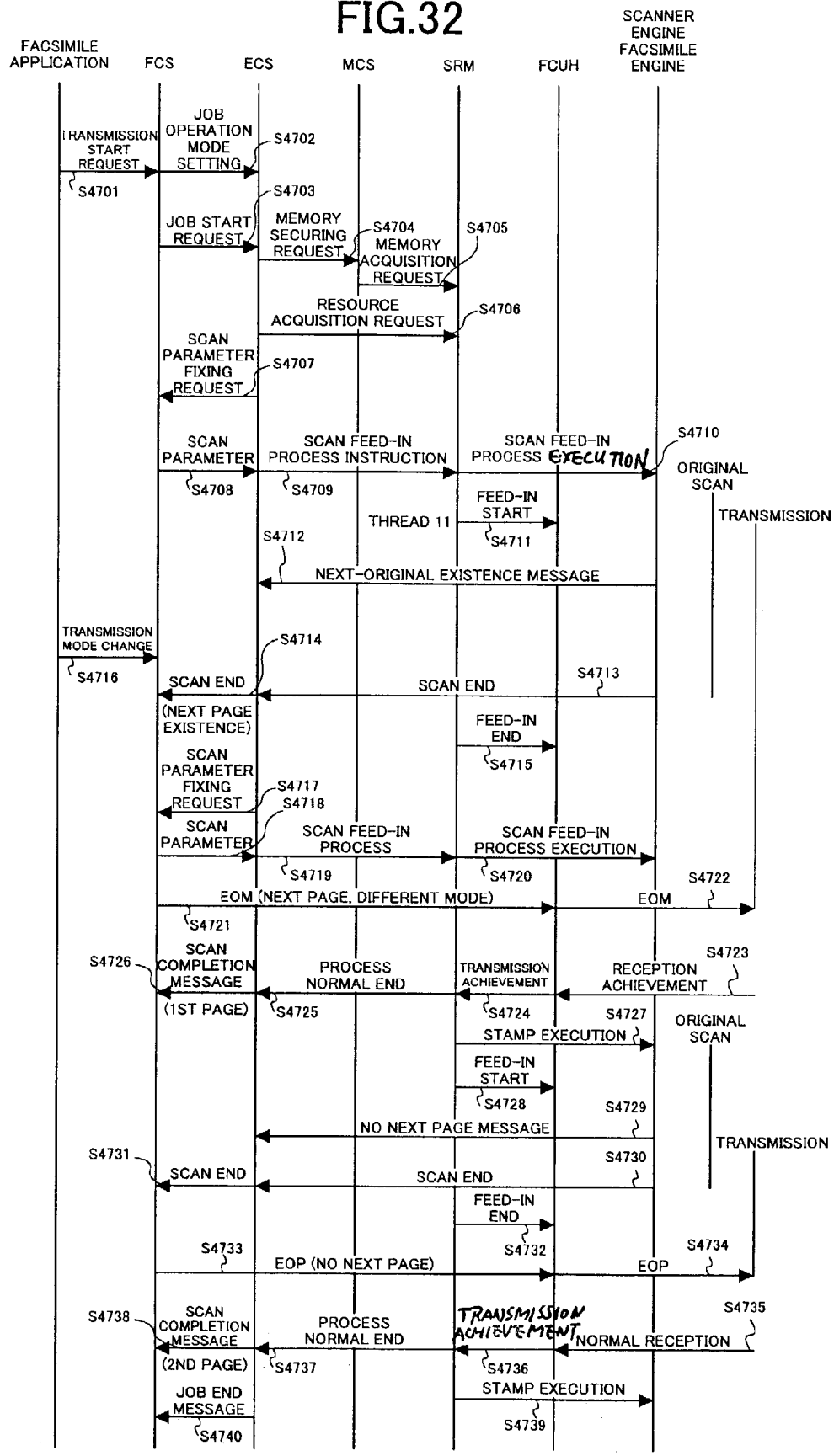
FIG. 32 shows a data communications sequence in facsimile transmission operation performed in the composite machine shown in FIG. 27.

With reference to FIG. 32, facsimile transmission operation performed in the composite machine in the fifth embodiment of the present invention will now be described.

As shown in FIG. 32, in the composite machine, the facsimile application process 4113, FCS process 4127, ECS process 4124, MCS process 4125, SRM process 4123 and FCUH process 4128 operate, and are started at a time of the composite machine is started. However, other than these processes, other application processes and control service processes may also be started at the same time.

The facsimile application process 4113 acts as a client process with respect to FCS process 4127 regarding it as a server process.

The FCS process 4127 acts as a server process with respect, to the facsimile application process 4113 regarding it as a client process, and, also, acts as a client process with respect to the ECS process 4124 and FCUH process 4129 regarding them as server processes.

The FCUH process 4129 is a sub-process of the FCS process 4127, and acts as a server process with respect to the SRM process 4123 and FCS process 4127 regarding them as client processes.

The ECS process 4124 acts as a server process with respect to the FCS process 4127 regarding as a client process, and also, acts as a client process with respect to the MCS process 4125 and SRM process 4123 regarding them as server processes.

The MCS process 4125 acts as a server process with respect to the ECS process 4124 regarding it as a client process, and, also, acts as a client process with respect to the SRM process regarding it as a server process.

The SRM process 4123 acts as a server process with respect to the ECS process and MCS process regarding them as client processes, and, also, acts as a client process with respect to the FCUH process 4129 regarding it as a server process.

As shown in FIG. 32, when a facsimile transmission request is given, the facsimile application process 4113 generates a new facsimile transmission job, and executes the transmission start request method and issues the message therefor to the FCS process 4127 in a step S4701. The FCS process receives this message, and starts a transmission start method, and then executes the job operation mode setting request method, and issues the message therefor to the ECS process 4124 in a step S4702.

The ECS process 4124 receives the job operation mode setting request message from the FCS process 4127, and executes the job operation mode setting method so as to set on the facsimile transmission job the above-described operation mode, and sends the execution result message to the FCS process 4127.

The FCS process 4127 receives this message, and thus, executes the job start request method and issues the message therefor to the ECS process 4124 in a step S4703. The MCS 4125 receives this job start request message, executes the job start method so as to execute the memory securing request method and issues the message therefor to the MCS 4125 in a step S4704, and also, executes the resource acquisition request method so as to issue the message therefor to the SRM 4123 in a step S4706. Processes performed by the MCS process 4125 and SRM process 4123 in response to these request messages, and processes performed by the ECS process 4124 in response to receiving the respective execution result messages are the same as those described above on the copy operation, and duplicate description thereof is omitted.

The ECS process 4124 receives the execution result message of resource acquisition method, and then, sends a scanner parameter fixing request message to the FCS process 4127 in a step S4707. The scanner parameter indicates a scanning resolution, i.e., fine, normal or the like, original size, and so forth. The FCS process 4127 receives this scanner parameter fixing request message and sends a predetermined scanner parameter to the ECS process 4124 as a message in a step S4708.

The ECS process 4124 receives the scanner parameter, and sends a scan feed-in process generation instruction message to the SRM process 4123 in a step S4709. The SRM process 4123 responds to this scan feed-in process generation instruction message and generates a scan feed-in process, and executes it in a step S4710. Then, it sends an original feed-in start message to the FCUH process 4129 in a step S4711. The FCUH process 4129 receives this message, and thereby, an original feed-in process is started, and, thus, scanning of the original and transmission of the thus-scanned image to a predetermined destination are started.

Upon the start of scanning of the original, a next-page original detection message indicating whether or not a next page of the original exists is sent to the ECS process from the scanner engine. In the example of FIG. 32, a next-page existence message is sent at this time in a step S4712. Then, when scanning of the current page of the original is completed, the scanning end message is sent to the ECS process 4124 from the scanner engine in a step S4713. The ECS process 4124 sends the received scanning end message to the FCS process 4127 together with the indication of the next-page original existence in a step S4714. On the other hand, after the scanning of the current page of the original is finished, the SRM process 4123 gives a feed-in termination instruction to the FCUH process 4129 in a step S4715, and then, the original feed-in operation is terminated.

At this time, if the facsimile application process 4113 executes the transmission mode change request method so as to issue the message therefor to the FCS process 4127 in a step S4716, the ECS process 4124 sends the scanner parameter fixing request message to the FCS process 4127. In response thereto, as described above, the FCS process 4127 sends the scanner parameter to the ECS process 4124 in a step S4718. The ECS process 4124 receives this message, gives an instruction for execution of a next-page scan feed-in process to the SRM process 4123, which then executes the same in steps S4719 and S4720.

After facsimile transmission to the predetermined destination on the first page is finished, the FCS process 4127 sends the EOM message indicating that a next page exits in a different transmission mode to the FCUH process 4129 in a step S4721. The FCUH process 4129 receiving this message transmits the EOM message to the predetermined destination in a step S4722.

When the FCUH process 4129 receives a message indicating normal reception from the destination in a step S4723, it sends to the SRM process 4123 a transmission achievement message in a step S4724. The SRM process 4123 receiving this message sends a normal end message to the ECS process 4124 in a step S4725. Then, the ECS process 4124 receiving this message sends a first page scan process completion message to the FCS process 4127 in a step S4726. Then, the SRM process 4123 receiving the transmission achievement message gives an instruction, according to instructions given, indicating that a stamp indicting transmission date/time, transmission source and so forth is sent to the destination, to the facsimile engine in a step S4727.

The SRM process 4123 sends an original feed-in start message to the FCUH process 4129 for start of feed-in of the second page in a step S4728. The FCUH process 4129 receives this message, and thereby, the original feed-in process is started, and, thereby, scanning of the second page of original and transmission thereof are started.

Upon the start of scanning of the original, a next-page original detection message indicating whether or not a next page of the original exists is sent to the ECS process from the scanner engine. In the example of FIG. 32, a next-page absence message is sent to the ECS process at this time in a step S4729. Then, when scanning of the current page of the original is completed, the scanning end message is sent to the ECS process 4124 from the scanner engine in a step S4730. The ECS process 4124 sends the received scanning end message to the FCS process 4127 together with the indication of the next-page original absence in a step S4731. On the other hand, after the scanning of the current page of the original is finished, the SRM process 4123 gives a feed-in termination instruction to the FCUH process 4129 in a step S4732, and then, the original feed-in operation is terminated.

After facsimile transmission to the predetermined destination on the second page is finished, the FCS process 4127 sends the EOM message indicating that no next page exits in a different transmission mode to the FCUH process 4129 in a step S4733. The FCUH process 4129 receiving this message transmits the EOM message to the predetermined destination in a step S4734.

When the FCUH process 4129 receives a message indicating normal reception from the destination in a step S4735, it sends to the SRM process 4123 a transmission achievement message in a step S4736. The SRM process 4123 receiving this message sends a normal end message to the ECS process 4124 in a step S4737. Then, the ECS process 4124 receiving this message sends a second page scan process completion message to the FCS process 4127 in a step S4738. Then, the SRM process 4123 receiving the transmission achievement message gives an instruction, according to instructions given, indicating that a stamp indicating transmission date/time, transmission source and so forth is sent to the destination, to the facsimile engine in a step S4739. Then, the ECS process 4124 sends a job end message to the FCS process 4127 in a step S4740. The FCS process 4127 receives this message and thereby, facsimile transmission process on the entire original is finished.

Thus, according to the fifth embodiment of the present invention, the inter-process communications are achieved such that a client process such as each application process requires a service to a server process such as the ECS process, MCS process, SRM process or the like by means of execution of a request method, and, also, messages are transmitted therebetween. Thereby, various services may be provided in various manners even in such a special configuration made of a combination of the application 4130 and platform 4120 as shown in FIG. 27.

Further, each of the application processes, control service processes and SRM process is an object having methods. Accordingly, when only some modules of the application processes and control service processes should be changed/modified, it is not necessary to change an interface with any of the other processes as long as the interface is provided beforehand such that a module acting as the server process 4202 has a method executing a service process in response to reception of a request message, and, also, a module acting as the client process 4201 has a method of issuing a service request message, and, thereby, provision of services and data between them can be achieved. Accordingly, function modification or the like can be made in a flexible manner for each application process or for each control service process.

Further, as each of the application processes, control service processes and SRM process is thus the object having methods, it is possible to ensure concealment of data in each object. Thus, even in case another firm such as a third vendor takes a charge of development of each application, it is possible to maintain the concealment of the contents of the control services.

FIG. 13, described above, also shows one example illustrating further details for achieving also the above-mentioned fifth embodiment of the present invention. With reference to FIG. 13, how to build the above-described multi-thread function-call-manner process execution control system in the fifth embodiment of the present invention will now be described in terms of how to build the software program system thereof.

FIG. 13 corresponds to FIG. 28 described above. The client process CP includes the plurality of threads TR, and a client dispatcher CD while the server process SP includes the plurality of threads TR and a server dispatcher SD. In the configuration shown in FIG. 13, a stub ST is provided between each thread TR and client dispatcher CD while a skeleton SK having particular coding made therein is provided between the server dispatcher SD and each thread TR. The function of the stub ST and skeleton SK is same as that described above with reference to FIG. 13 beforehand. The functions of the client dispatcher CD and server dispatcher SD are same as those described above in the description for the first embodiment.

Thus, the above-described fifth embodiment in which each process is made of an object having methods may be embodied also by means of the concept of client dispatcher and server dispatcher, and, also, by means of the function call scheme. Accordingly, in applying the concept described above with reference to FIG. 13 beforehand to the fifth embodiment, the inter-process communications are achieved in the following manner: Execution of each service request message and issuance of the message therefor is achieved by performing of a corresponding function call in the client process, and, also, execution of a service method in response to reception of the request message is achieved by the function handler which then actually executing the corresponding process in the server process. In each process of the inter-process communications, the client dispatcher and server dispatcher perform the message dispatch control function so as to achieve appropriate message transfer in the inter-process communications and thereby appropriate process execution.

By applying the concept of stub ST, as described above, it is possible to improve abstractness of programming on each thread while the stub interprets the code of each thread so as to properly perform a desired process of performing a function call so as to execute a specific service request method, sending a specific message to a specific server process, or the like, also in the case of the fifth embodiment. Accordingly, it is easy to develop each method without understanding details of interface between respective processes, and, also, it is possible to avoid disclosing such details of the interface, system of the counterparts, and so forth to a person who designs methods of a particular application process/service control process.

As to the skeleton SK, a particular programmer should provide a description only an abstract of a process to be executed to be inserted into a predetermined space prepared in the skeleton. Accordingly, similar to the concept of the above-mentioned stub ST, the particular programmer who develops each particular process, for example, a process of image processing in the scanner engine or printer engine, a process of facsimile communications in the facsimile engine, or the like, should not recognize the details of interface with each of the other counterpart processes nor the systems thereof.

In other words, each method in one process cannot directly transfer a message with a method in another process in the inter-process communications. For the purpose of transfer the messages between methods of different processes, dispatch routine is provided, i.e., by means of the above-mentioned client dispatcher and server dispatcher, and also, as described above, by means of the above-described scheme using the concept of function call and function returned value. Furthermore, by providing the above-mentioned stub and skeleton system, each sub-vender programmer who develops each particular job process in the form of threads TR should not understand those matters concerning intermediate system needed for the above-described inter-process communications, but merely should create an abstract body part of each specific process.

A specific method of building the software program system of the fifth embodiment of the present invention is substantially the same as in the case of building the software program system in the first embodiment described above, and duplicated description is omitted.

A sixth embodiment of the present invention will now be described. In the sixth embodiment, a function of agent is utilized.

Figure 33:
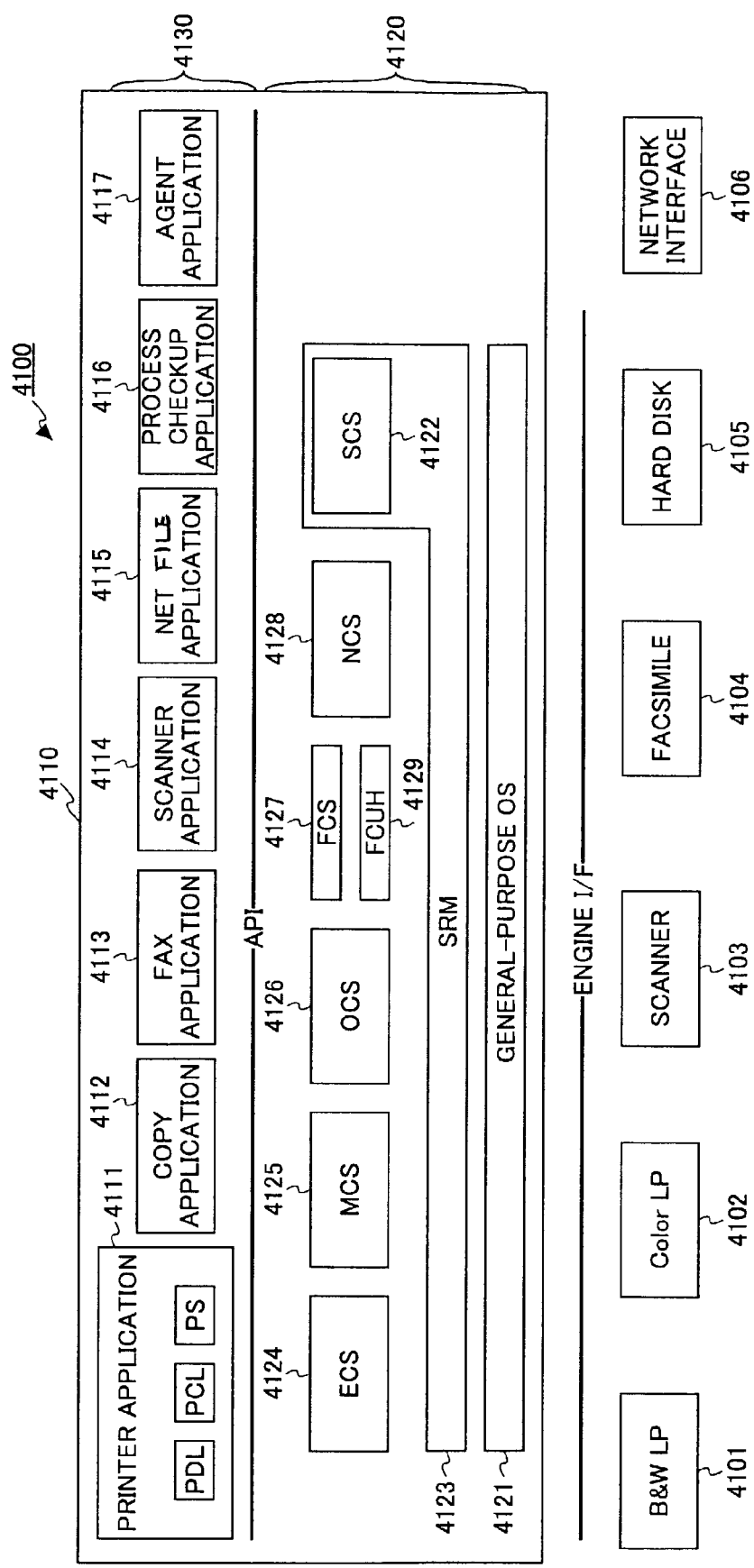
FIG. 33 shows a block diagram of a composite machine according to a sixth embodiment of the present invention.

FIG. 33 shows a composite machine 4100 in the sixth embodiment of the present invention. As shown in FIG. 33, according to the sixth embodiment, different from the above-described fifth embodiment, an agent application 4117 is provided in the application layer 130. Other than this point, the sixth embodiment is the same as the fifth embodiment, and duplicated description of the other configurations is omitted. The composite machine 4100 according to the sixth embodiment is connected to a communications network such as a LAN via the network interface 4106.

The agent application 4117 is an application which interprets the contents of an agent received via the network and executes the thus-interpreted contents. The agent means a software program which autonomously determines the environment of its own as an agent of the user, operates actively, or moves via the network. By using the function of agent, it is possible to effectively reduce the load burdened by the network, or it is not necessary to always occupy the network. Furthermore, it is possible to effectively perform successive processes. As the agent application 4117, a telescript engine which interprets telescript commands may be applied, for example.

Specifically, the agent application 4117 receives the agent sent from another composite machine, or a personal computer via the NCS 4128, and, when the contents thereof include one or a plurality of service requests, it selects control services/applications required for providing the required services, and, then, gives the respective service requests thereto. Furthermore, the agent application 4117 examines the composite machine 4100 as to whether or not the required applications/control services operate normally. Then, when they do not operate normally, or all of them are not included in the own machine, the agent application 4117 autonomously searches the network for another composite machine, and sends the same agent to the thus-searched-for composite machine. In the composite machine to which the agent is thus sent, also the agent application 4117 included therein performs selection of applications/control services required for providing the required services, and, also, examines as to whether or not they operate normally there. Accordingly, as long as the relevant applications/control services included in the composite machine do not operate normally again, the agent moves among the composite machines in sequence in the network.

The above-mentioned applications/control services required for providing the required service mean the printer application 4111, ECS 4124, MCS 4125 and SRM 4123 in case the required service is a printing service required by a print request, for example.

The inter-process communications performed by the composite machine 4100 according to the sixth embodiment utilizing the above-mentioned agent function will now be described. The inter-process communications performed among the processes within the composite machine are performed through message transfer achieved by means of execution of methods by the objects as in the above-described fifth embodiment.

Figure 34:
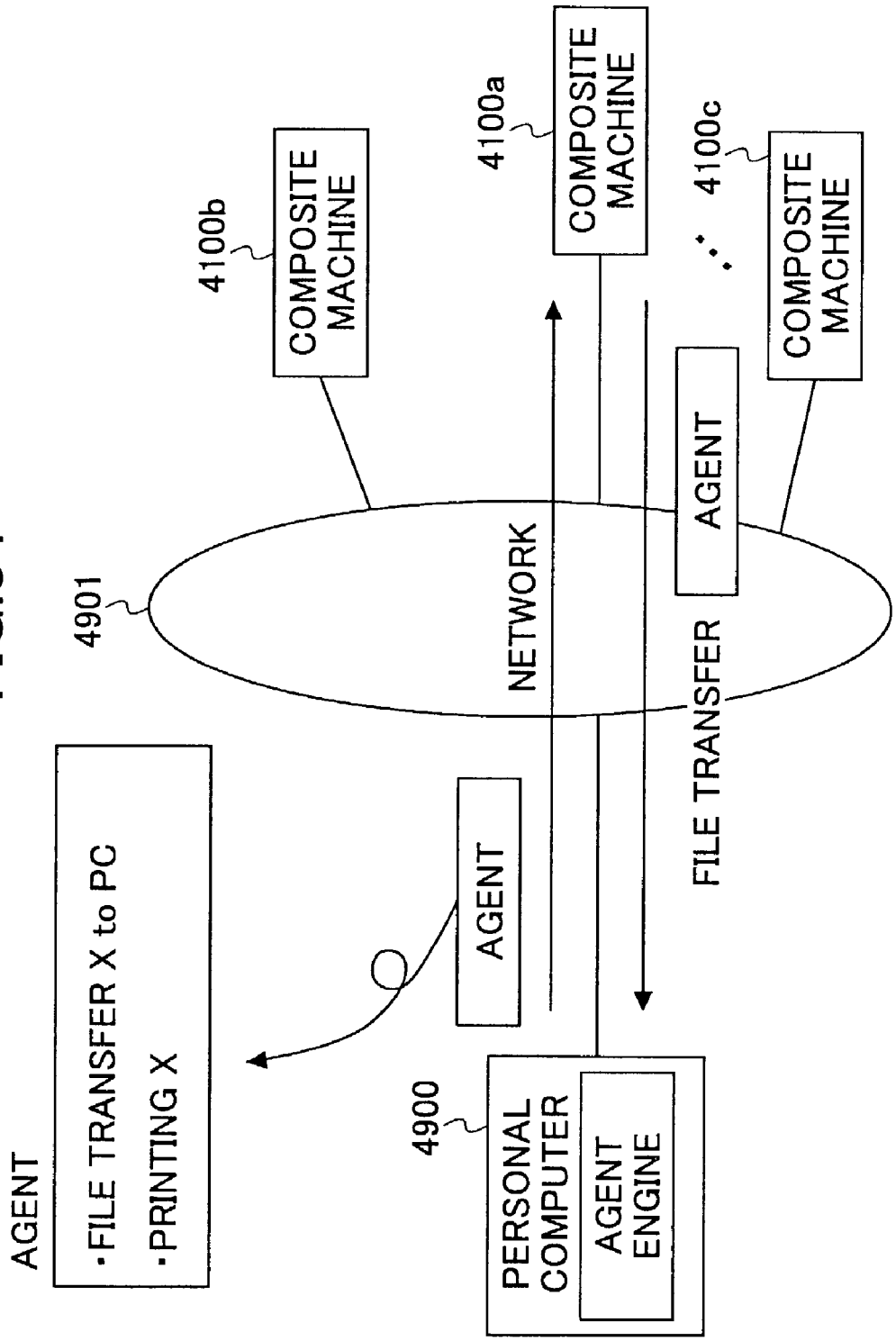
FIG. 34 illustrates a data communications between a personal computer and the composite machine according to the sixth embodiment of the present invention.
Figure 36:
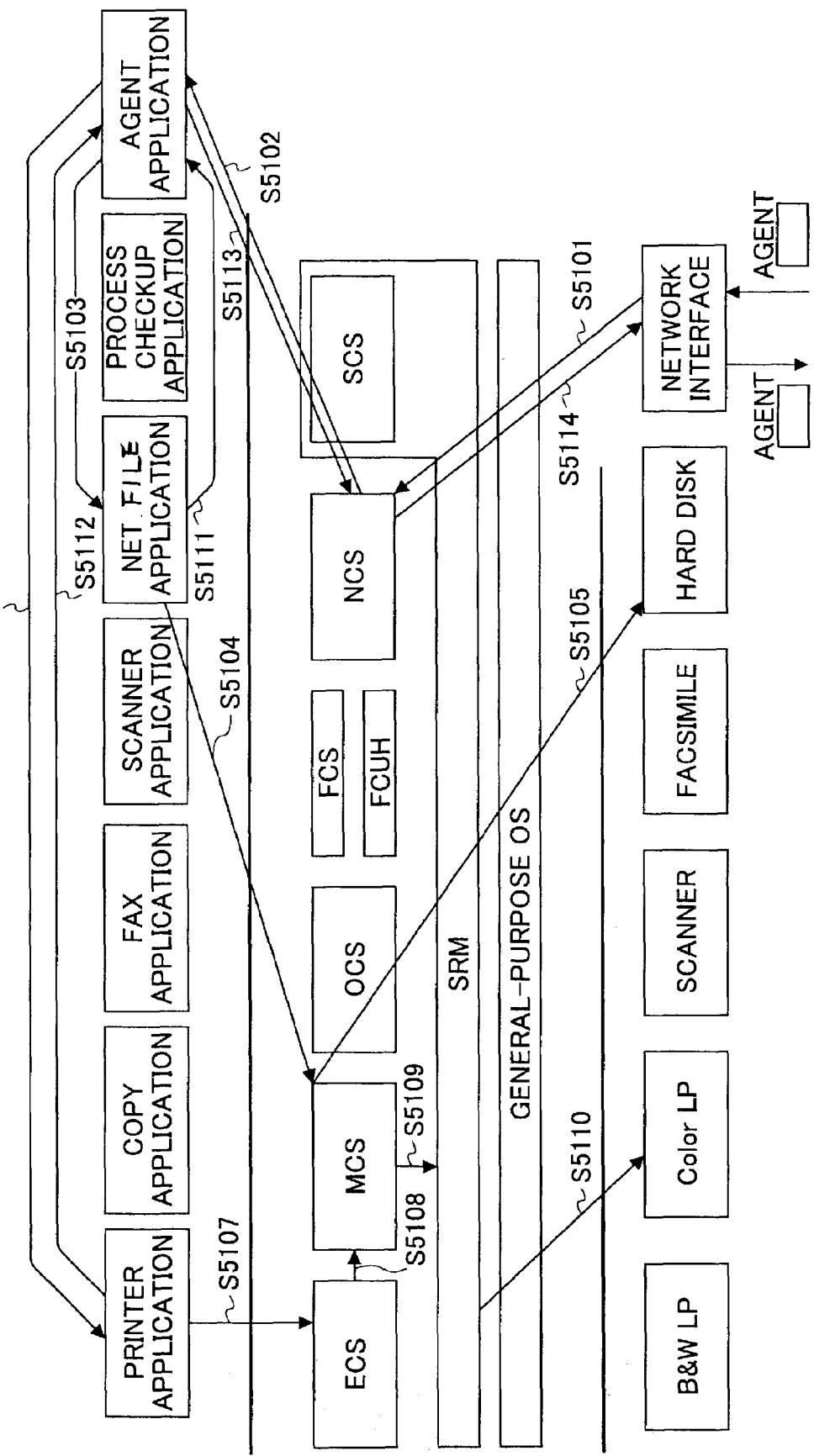
FIG. 36 shows a block diagram of the composite machine shown in FIG. 33, for illustrating data communications among respective processes therein.

FIG. 34 illustrates message transfer performed between a personal computer of a user and the composite machine using the above-mentioned agent function. FIG. 36 illustrates message flow of inter-process communications performed in the composite machine 4100a shown in FIG. 34. As shown in FIG. 34, the personal computer 4900 and a plurality of composite machines 4100a, 4100b, 4100c, . . . , are connected together via a communications network 4901 such as a LAN. Each of the composite machines 4100a, 4100b, 4100c, . . . , has the same configuration as that shown in FIG. 33. Further, the personal computer 4900 includes an agent engine 4902 which transmits the agent. The agent application 4117 included in each of the composite machines 4100a, 4100b, 4100c, . . . , also acts as the agent engine.

As shown in FIG. 34, the agent is sent out from the agent engine 4902 of the person computer 4900 to the composite machine 4100a. This agent may have a plurality of service requests described therein. The agent gives instructions to the composite machine which receives the agent such as to require the composite machine to execute these service requests successively. In the example shown in FIG. 34, the agent has two service requests, i.e., 'file transfer X to PC' and 'print X' described therein. The former means transfer of a file X to the personal computer, while the latter means printing of the file X. Accordingly, this agent gives instructions to the composite machine to which the agent is sent such as to request it to execute these processes.

In a step S5101, the composite machine 4100a receives this agent at the NCS 4128, and then, it is sent to the agent application 4117 therein in a step S5102.

The agent application 4117 responds to the contents of this agent so as to select the network file application 4115 and MCS 4125 required for the file transfer operation. Further, the agent application 4117 also selects the printer application 4111 and ECS 4124 required for the printing operation.

Then, the agent application 4117 sends a service request to the network file application 4115 so as to request it to transfer the file X stored in the hard disk 4105 to the personal computer 4900 in a step S5103. The network file application 4115 receiving this request then accesses the hard disk drive 4105 via the MCS 4125 in steps S5104 and S5105, reads out the file X therefrom, and temporarily store the read-out file contents into a memory. Then, the net file application 4115 sends the execution result message to the agent application 4117 in a step S5111.

Further, the agent application 4117 sends a request to the printer application 4111 so as to require it to print out the thus-read contents of the file X by means of the monochrome printer 4101 or color printer 4102 in a step S5106. In response to this request, the printer application 4111 performs the inter-process communications with the ECS 4124, MCS 4125, and SRM 4123 according to the procedure described in the description of the fifth embodiment for the printing operation in the steps S5107, S5108 and S5109, and thus prints out the file X in a step S5110. Then, the printer application 4111 sends the execution result message to the agent application 4117 in a step S5112.

Then, the agent application 4117 sends the agent having the two execution result messages attached thereto and the file X temporarily stored in the memory to the personal computer 4900 through the network via the NCS 4128 in steps S5113 and S5114.

Figure 35:
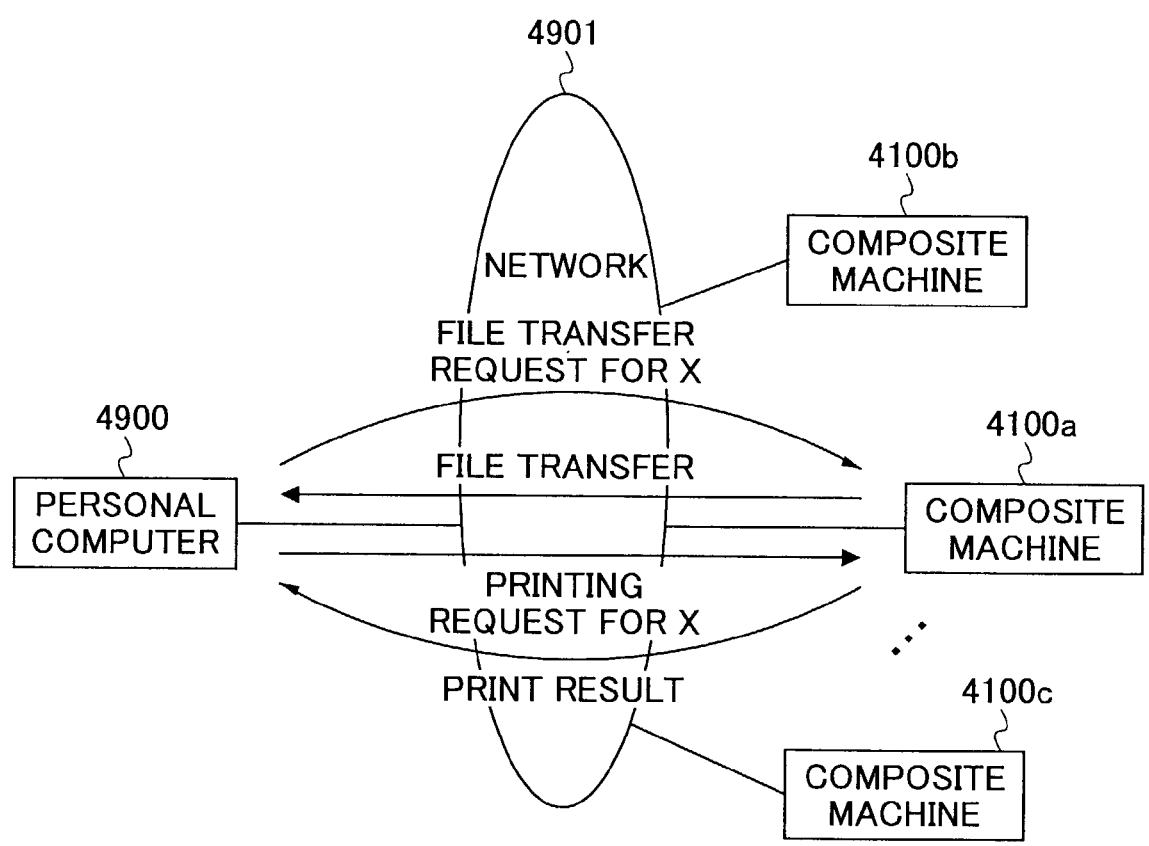
FIG. 35 illustrates a data communications between a personal computer and the composite machine corresponding to FIG. 34 but without using an agent function according to the present invention.

A case where the agent application 4117 were not used in this case will now be considered with reference to FIG. 35. In such a case, as shown in the figure, the user should send two requests, i.e., 'a file X transfer request' and 'a file x print request', separately, to the composite machine 4100a from the personal computer 4900. Also, as the responses thereto would be sent back to the personal computer 4900, not only effective service provision would not be given but also the number of access operations to the network would be increased into four.

In contrast thereto, by utilizing the agent as shown in FIG. 34, the user should merely provide the two requests, i.e., file transfer request and file print request through the only one agent. Thereby, the agent application 4117 autonomously determines the necessary control services so that the desired services can be provided efficiently. Accordingly, the number of access to the network can be reduced to two, i.e., for the first service request and the last execution result report and file transfer. Thus, the load burdened by the network can also be effectively reduced.

Figure 37:
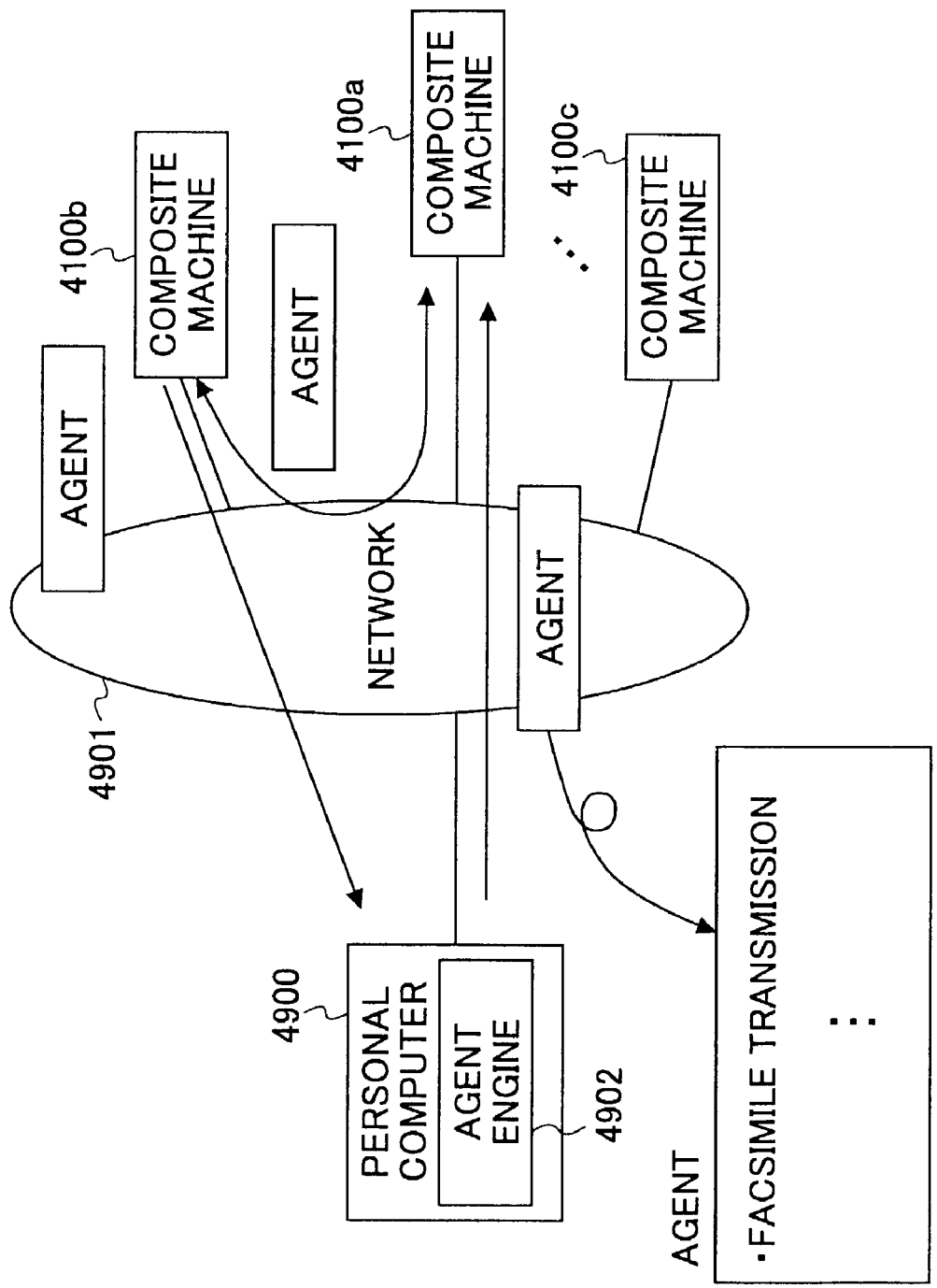
FIG. 37 illustrates a data communications sequence in another example between a personal computer and the composite machine according to the sixth embodiment of the present invention.

FIG. 37 illustrates a case of another example in which a plurality of composite machines, each having the agent function, connected via the network perform the inter-process communications utilizing the agent thereamong.

As shown in FIG. 37, the system configuration is the same as that shown in FIG. 34 described above. However, in this case shown in FIG. 37, the agent has the service request command, i.e., 'facsimile transmission' described therein. Accordingly, the composite machine 4100a first receives the agent examines whether or not the own machine can perform a facsimile transmission operation. When it is possible, the machine 4100a executes the facsimile transmission job. However, when it is not possible, the machine 4100a transfers the same agent into the other machine 4100b or 4100c, according to the basic function of the agent application 4117 described above.

Although only one service request command is described in the agent in the above-mentioned example, a plurality of service request commands can be described in the single agent. In such a case, for the plurality of service request commands, the process same as that described above is performed in sequence.

Further, it is also possible that the agent has not only the entity service request commend but also addresses of the composite machines to which the agent will be subsequently transferred, i.e., 'network address of the machine 4100a, network address of the machine 4100b, network address of the machine 4100c, . . . ', and, thus, the sequence in which the agent is transferred may be described thereto. In such a case, when the service request cannot be executed by the machine 4100a, the agent is autonomously transferred to the machine 4100b, and, then, to the machine 4100c, . . . .

The agent may be sent out to the composite machine 4100a as a result of the agent engine 4902 in the personal computer 4900 executes a telescript command of GO command, for example.

The composite machine 4100a receives this agent at the NCS 4128, and sends it to the agent application 4117. The agent application 4117 interprets the contents of this agent, and examines whether or not the respective processes, i.e., the facsimile application 4113, FCS 4127, ECS 4124, MCS 4125 and SRM 4123 operate normally therein. Specifically, for example, the agent application 4117 determines that each process operates normally when it responds to an access given by the agent application 4117, normally.

Then, in case these processes needed for the facsimile operation operate normally, the agent application select these processes, and sends the facsimile transmission request to the facsimile application 4113. In this case, the processes the same as those described above for the facsimile transmission operation in the fifth embodiment are performed in the same way.

However, when it is determined that any one of these processes needed for the facsimile transmission operation has a trouble, the following process is performed, for example. Assuming the ECS process 4124 has a trouble, the agent application 4117 attaches information, i.e., the name of the process having the trouble, the own network address and so forth to the agent. Then, searching for a composite machine via the network, and, then, the agent application 4117 transmits the agent to the composite machine (4100b in the example of FIG. 37) which has been found out first.

The composite machine 4100b receives the agent at the agent application 4117 thereof, and, then, same as in the case in the machine 4100a, the agent application 4117 interprets the contents of the agent. Then, the agent application 4117 examines whether or not the ECS process 4124, MCS process 4125 and SRM process 4123, which are the process described in the information attached to the received agent as that having the trouble, and the processes which are called by this troubled process. Then, when these processes, i.e., ECS 124, MCS 125 and SRM 123 operate normally there, the agent application 4117 in the machine 4100b attaches this information to the agent and sends it to the machine 4100a.

When receiving the agent, the agent application 4117 in the machine 4100a selects the facsimile application 4113 and FCS 4127 in the own machine 4100a, and also, as for the ECS 4124, MCS 4125 and SRM 4123, it selects those in the machine 4100b. Thereby, the entity facsimile transmission operation is performed actually by the machine 4100b having the ECS process 4124 operating normally.

After the selection of processes is finished in the machine 4100a, the facsimile transmission process is executed a follows. As shown in FIG. 39 illustrating the flow of information in the inter-process communications between the composite machines 4100a and 4100b, the agent application 4117 in the machine 4100a sends the facsimile transmission request message to the facsimile application 4113 in the own machine 4100a in a step S5400. The facsimile application 4113 receiving this request message executes the transmission start method, and sends out the transmission start request message to the FCS 4127 in a step S5401.

After the FCS 4127 in the machine 4100a receives this message and executes the transmission start method, it attaches the job operation mode request message to the agent. Then, the agent is sent out by means of the agent application 4117 to the network address of the machine 4100b in a step S5402. Thereby, the job operation mode setting request message is sent to the machine 4100b according to the network address thereof.

The machine 4100b receives the agent at the agent application 4117, and transfers the job operation mode setting request message attached to the agent to the ECS 4124 of its own in a step S5403. The ECS process 4124 in the machine 4100b receives the operation mode setting request message, executes the job operation mode setting method, thus, performs the operation mode setting for the printer job, and then, attaches the execution result message to the agent, which is then sent to the machine 4100a by means of the agent application 4117 in a step S5404.

The machine 4100a receives the agent at the agent application 4117 of its own, and transfers the execution result message attached to the agent to the FCS process 4127 in the own machine 4100a in a step S5405. The FCS process 4127 receives this message, and thus, executes the job start request method so as to attach the job start request message therefor to the agent, which is then sent to the machine 4100b by means of the agent application 4117 in a step S5406.

The machine 4100a receives the agent at the agent application 4117, and transfers the job start request message attached thereto to the ECS process 4124 in a step S5407. The ECS process 4124 in the machine 4109a receives this message, thus executes the job start method, and thus performs starting process on the printer job. Then, it attaches the execution result message to the agent, which is then sent to the machine 4100a by means of the agent application 4117 in a step S5408.

Then, in the machine 4100a, the agent sent from the other machine is received by the agent application 4117, and the execution result message attached thereto is transferred to the FCS process 4127 in a step S5409.

On the other hand, in the machine 4100b, the ECS process 4124 executes the memory securing request method so as to issues the memory securing request message to the MCS process 4125 in the own machine 4100b in a step S5410. Further, in order to acquire the resource of the scanner engine, it also executes the resource acquisition request method so as to issue the resource acquisition request message to the SRM process 4123 in the own machine 4100b in a step S5411. The processes performed in the respective MCS 4125 and SRM 4123 in respond to receiving these request messages are the same as those described above in the description of the fifth embodiment, and the duplicated description thereof is omitted.

After receiving the execution result message for the resource acquisition, the ECS process 4124 in the machine 4100b executes the scan parameter fixing request method so as to attach the scan parameter fixing request message to the agent, which is sent to the machine 4100a by means of the agent application 4117 in a step S5412.

This agent is received by the agent application 4117 in the machine 4100a, which then transfers the scan parameter fixing request message attached to the agent to the FCS process 4127 in the own machine 4100a in a step S5413. The FCS process 4127 receiving this message thus executes the scan parameter fixing method, and thus, attaches the scan parameter message to the agent, which is then sent back to the machine 4100b by means of the agent application 4117 in the own machine 4100a in a step S5414. In the machine 4100b, the agent is received by the agent application 4117, and is then transferred to the ECS process 4124 in the own machine 4100a in a step S5415.

The inter-process communications to be performed after that are those performed within the machine 4100b, and are same as those for the facsimile transmission operation described above on the fifth embodiment. Thereby, based on the facsimile transmission start request made in the machine 4100a, the actual facsimile transmission is performed by the machine 4100b.

After the scan and facsimile transmission process is finished in the machine 4100b, the ECS process 4124 in the machine 4100b attaches the scan end report message to the agent, which is then sent to the machine 4100a by mean of the agent application 4117 in a step S5416. The agent is received by the agent application 4117 in the machine 4100a, and the scan end report message attached thereto is transferred to the FCS process 4127 in the machine 4100a in a step S5417.

Then, in the machine 4100a, the execution result of the facsimile transmission is attached to the agent, which is then sent to the machine 4100b by means of the agent application 4117 in the machine in a step S5418 The agent application 4117 in the machine 4100b receiving this agent, which is then sent to the personal computer 4900 by the same agent application 4117 in a step S5419. As a result of the agent being received by the personal computer 4900, the facsimile operation is finished.

Other than the above-described case in which the necessary processes operate normally in the machine 4100b, in another case where also the necessary processes in the machine 4100b have trouble, the agent application 4117 in the machine 4100b transfers the agent to the machine 4100c, and, then, in the machine 4100c, the same process as the process described above in the machine 4100b is performed.

Further, other than the above-described case where the ECS process 4124 has a trouble, in another case where another control service process or application process has a trouble, or is absent there, a similar process is performed. In such a case, a composite machine having the control services but not having application except the agent application 4117 may do well similarly in the case described above according to the present invention.

Figure 38:
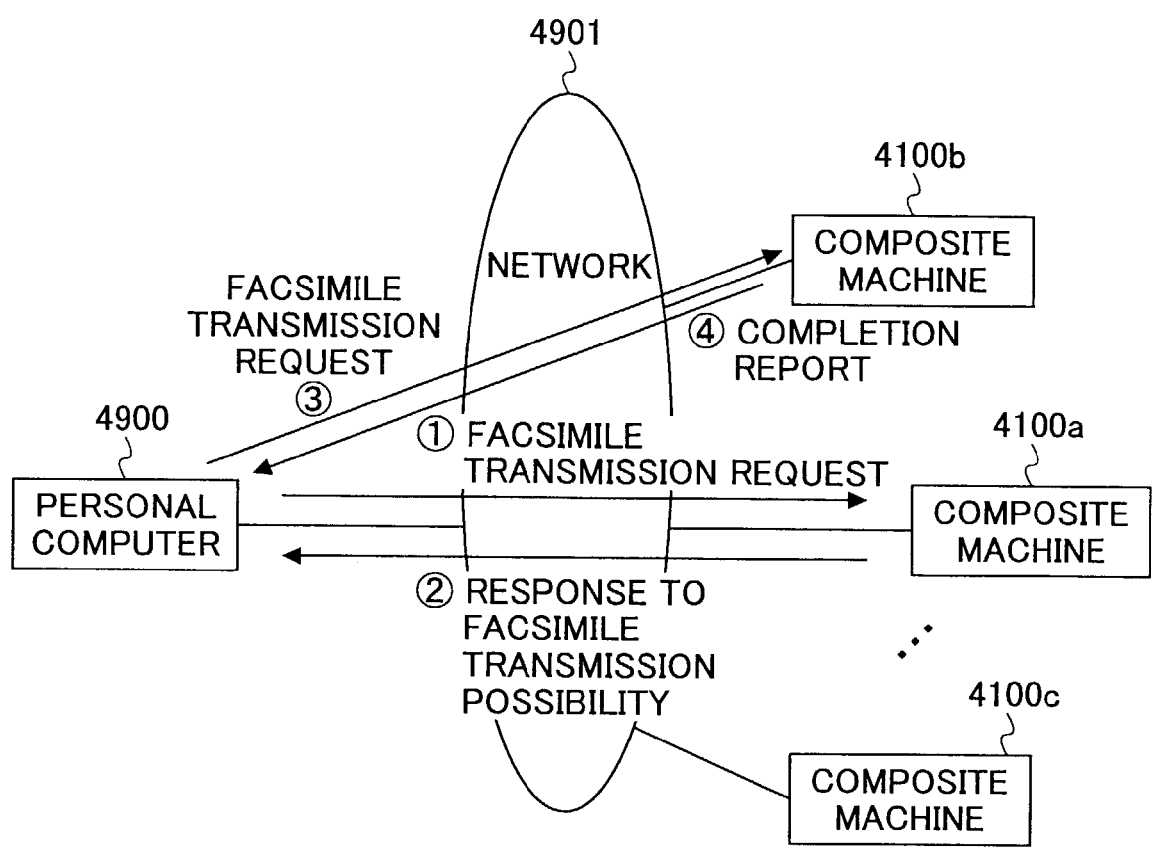
FIG. 38 illustrates a data communications sequence between the personal computer and composite machine corresponding to FIG. 37 but without using the agent function according to the present invention.

FIG. 38 illustrates a case where the agent application 4117 were not utilized. In such a case, ① when the user sent the facsimile transmission request to the composite machine 4100a from the personal computer 4900, and the ECS 4124 or the like necessary for the facsimile transmission operation had a trouble, ② a message indicating facsimile transmission disableness would be sent back to the personal computer 4900. Accordingly, ③ the user should make the facsimile transmission request to another composite machine 4100b. When the machine 4100b had no trouble in the necessary processes for the facsimile transmission, the facsimile transmission would be performed there properly, and then, ④ the completion report would be sent to the personal computer 4900. However, when the machine 4100b also had a trouble for the facsimile transmission, the user should further search for another composite machine for requiring it to perform the facsimile transmission. Accordingly, the operation which the user should perform would become very complicated. Furthermore, when the facsimile transmission request were performed repeatedly by the personal computer 4900, the network 4901 would be occupied between the personal computer 4900 and machine 4100a/4100b/4100c/, . . . Thereby, the load borne by the network 4901 would be increased much.

In contrast thereto, the agent and agent application 4117 are utilized as described with reference to FIG. 37 according to the present invention, the user merely should send the agent having the facsimile transmission request described therein to the composite machine 4100a. Thereby, even when the machine 4100a has a trouble such as not be able to perform the facsimile transmission operation by itself, the agent application 4117 autonomously searches for the composite machine which can perform the relevant facsimile transmission operation as described above through the network 4901, and, thus, the machine performs the relevant facsimile transmission operation. Accordingly, the load borne by the user of the personal computer 4900 can be effectively reduced. Furthermore, the number of access to the network 4901 from the person computer 4900 and composite machines can be effectively reduced to two, i.e., the first service request transmission and the last completion report.

Although the above-described fifth and sixth embodiments apply the agent application 4117, such a process as to perform the same agent function may alternatively be provided in the control service layer. In such a case, an agent control service or the like other than the existing control services may be provided, or further alternatively, a thread for performing the above-mentioned agent process may be provide in an existing service process such as the SCS 4122 or the like.

Furthermore, the contents of the agent described above are only for example, and, thus, any description may be made there depending on a configuration/function of the particular composite machine, and/or the configuration of the network to be applied. Furthermore, the format of description in the agent may be any one depending on the agent engine in the personal computer 4900, the type of the agent application 4117 and so forth.

Further, the present invention is not limited to the above-described embodiments, and variations and modifications may be made without departing from the basic concepts of the present invention.

The present application is based on Japanese priority applications Nos. 2001-257045 and 2001-290168, filed on Aug. 27, 2001 and Sep. 21, 2001, respectively, the entire contents of which are hereby incorporated by reference.

What is claimed is:

1. An image forming apparatus, comprising:
a hardware resource configured to perform an image processing operation, the hardware resource comprising one of a printer, scanner and facsimile;
a plurality of application processes configured to perform image processing operations; and
a control process, which is separate from the plurality of application processes, configured to control the hardware resource based on an instruction received from one of the plurality of application processes,
the control process comprising,
a client module configured to initiate a thread corresponding to a function, and to generate a corresponding function call using a stub; and
a server module configured to receive a function call corresponding to a thread initiated at another process, and to generate a response to the received function call.

2. The image forming apparatus of claim 1, wherein at least one of the plurality of application processes comprises:
a client module configured to initiate a thread corresponding to a function, and to generate a corresponding function call using a stub.

3. The image forming apparatus of claim 1, wherein the control process comprises:
a skeleton module configured to process the received function call corresponding to the thread initiated at another process prior to generating a response to the received function call.

4. The image forming apparatus of claim 1, further comprising:
a module configured to perform a syntax analysis on received source code corresponding to a function call to be created, the module further configured to output a stub, and a skeleton corresponding to the function call represented by the source code.

5. The image forming apparatus of claim 1, wherein the plurality of application processes comprises:
at least one of a printer application, copy application, facsimile application, and scanner application.

6. The image forming apparatus of claim 1, wherein the control process comprises:
one of a system control service, engine control service, memory control service, operation panel control service, facsimile control service, and network control service.

7. A method of inter-process communications in an image forming apparatus, comprising the steps of:
initiating a thread corresponding to a function at one of a plurality of application processes,
wherein the plurality of application processes are configured to perform image processing operations, and
a control process, which is separate from the plurality of application processes, is configured to control one of a printer, scanner and facsimile of the image forming apparatus based on an instruction received from one of the plurality of application processes;
generating a function call corresponding to the function using a stub;
receiving, at the control process, a function call corresponding to a thread initiated at the one of the plurality of application processes; and
generating a response to the received function call.

8. The method of claim 7, wherein the step of generating a response, comprises:
applying the received function call to a skeleton module prior to generating a response to the received function call.

9. The method of claim 7, wherein the receiving step further comprises:
receiving the function call at a server dispatcher at the second control process.

10. The method of claim 7, further comprising the step of:
sending the generated function call to the second control process via a client dispatcher from the one of a plurality of application processes.

11. The method of claim 7, wherein:
the plurality of application processes comprises at least one of a printer application, copy application, facsimile application, scanner application, and a net file application.

12. The method of claim 7, wherein:
the first and second control processes comprise at least one of a system control service, engine control service, memory control service, operation panel control service, facsimile control service, and network control service.

13. A computer program product comprising a computer storage medium storing a computer program code mechanism which when executed by a computer, causes the computer to perform a method for inter-process communications in an image forming apparatus, comprising the steps of:
initiating a thread corresponding to a function at one of a plurality of application processes,
wherein the plurality of application processes are configured to perform image processing operations, and
a control process, which is separate from the plurality of application processes, is configured to control one of a printer, scanner and facsimile of the image forming apparatus based on an instruction received from one of the plurality of application processes;
generating a function call corresponding to the function using a stub; receiving, at the control process, a function call corresponding to a thread initiated at the one of the plurality of application processes or the first control process; and
generating a response to the received function call.

14. The computer program product of claim 13, wherein the step of generating a response, comprises:
applying the received function call to a skeleton module prior to generating a response to the received function call.

15. The computer program product of claim 13, wherein the receiving step further comprises:
receiving the function call at a server dispatcher at the second control process.

16. The computer program product of claim 13, further comprising the step of:
sending the generated function call to the second control process via a client dispatcher from the one of a plurality of application processes.

17. The computer program product of claim 13, wherein:
the plurality of application processes comprises at least one of a printer application, copy application, facsimile application, scanner application, and a net file application.

18. The computer program product of claim 13, wherein:
the first and second control processes comprise at least one of a system control service, engine control service, memory control service, operation panel control service, facsimile control service, and network control service.

* * * * *